United States Patent [19]
Scofield et al.

[11] Patent Number: 5,644,643
[45] Date of Patent: Jul. 1, 1997

[54] CHUTE FOR USE WITH AN ANIMAL EVALUATION SYSTEM

[75] Inventors: Wayne W. Scofield, Piedmont; Mark A. Engelstad, Rapid City, both of S. Dak.

[73] Assignee: C-Scan, LLC, Minneapolis, Minn.

[21] Appl. No.: 647,221

[22] Filed: May 9, 1996

Related U.S. Application Data

[60] Division of Ser. No. 262,234, Jun. 20, 1994, Pat. No. 5,576,949, which is a continuation-in-part of Ser. No. 238,979, May 6, 1994, Pat. No. 5,483,441, which is a continuation of Ser. No. 753,428, Aug. 30, 1991, abandoned.

[51] Int. Cl.⁶ .................................................. G06K 9/00
[52] U.S. Cl. ......................................... 382/110; 119/840
[58] Field of Search .................................. 382/100, 110, 382/286, 312, 318; 348/89, 135, 137; 119/840, 841, 842, 843; 193/2 R

[56] References Cited

U.S. PATENT DOCUMENTS

| | | | |
|---|---|---|---|
| 3,762,818 | 10/1973 | Johnson et al. | 356/120 |
| 3,877,818 | 4/1975 | Button et al. | 356/186 |
| 3,902,811 | 9/1975 | Altman et al. | 356/156 |
| 3,930,991 | 1/1976 | Gillespie | 209/3 |
| 4,089,608 | 5/1978 | Hoadley | 356/156 |
| 4,232,334 | 11/1980 | Dyson | 358/93 |
| 4,413,279 | 11/1983 | Görl | 358/107 |
| 4,745,472 | 5/1988 | Hayes | 356/107 |
| 4,783,833 | 11/1988 | Kawabata et al. | 382/22 |
| 4,788,429 | 11/1988 | Wilson | 250/363 S |
| 4,939,574 | 7/1990 | Petersen et al. | 358/93 |
| 5,134,661 | 7/1992 | Reinsch | 382/1 |
| 5,140,988 | 8/1992 | Stouffer et al. | 128/660.01 |
| 5,208,747 | 5/1993 | Wilson et al. | 364/413.25 |
| 5,483,441 | 1/1996 | Scofield | 364/400 |
| 5,576,949 | 11/1996 | Scofield et al. | 364/401 |

*Primary Examiner*—Andrew Johns
*Attorney, Agent, or Firm*—Kinney & Lange, P.A.

[57] ABSTRACT

The present invention evaluates an animal to determine characteristics or traits thereof. The invention evaluates the animal as it moves through first and second scenes that correspond to different first and second fields of view.

6 Claims, 28 Drawing Sheets

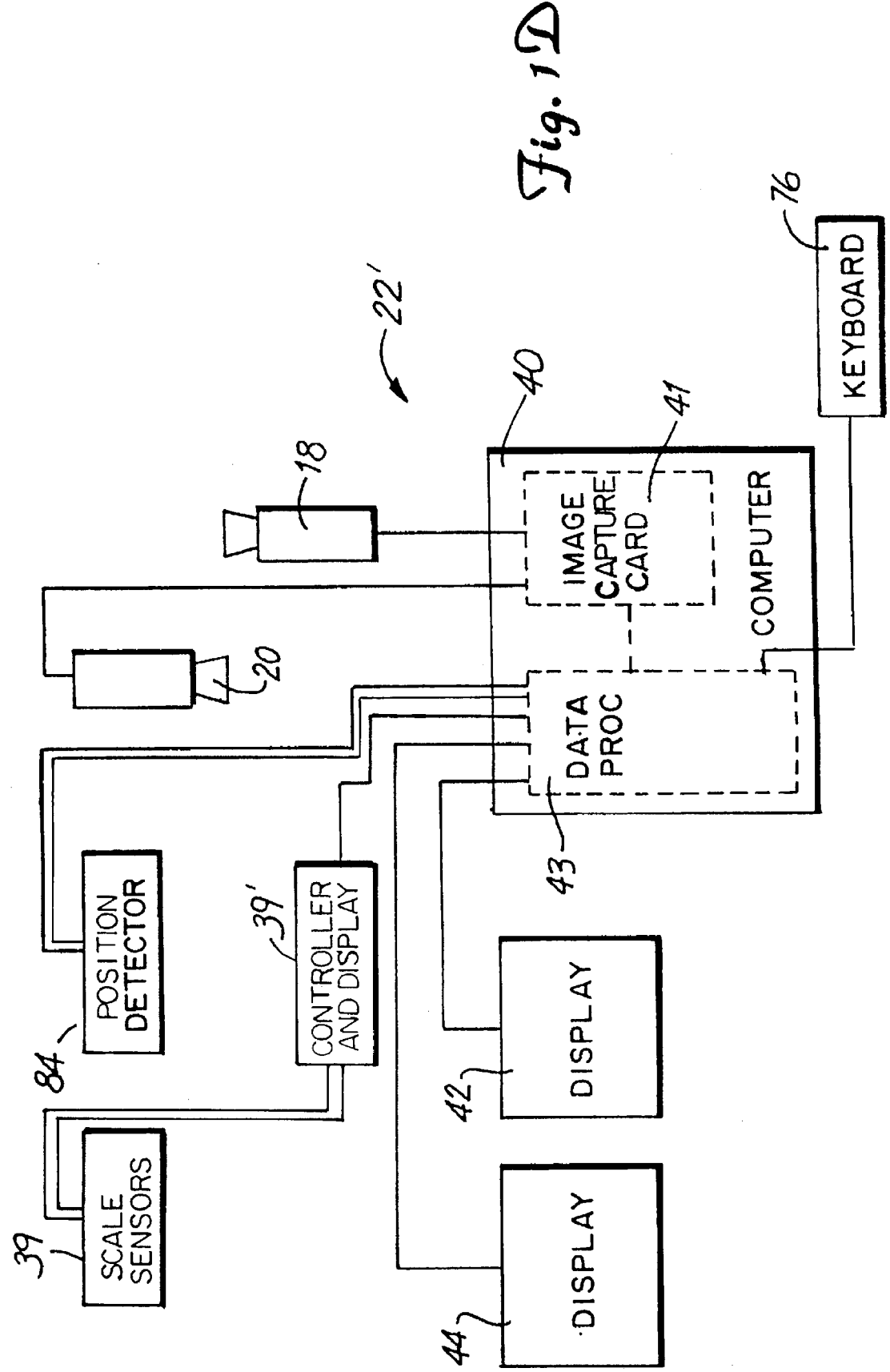

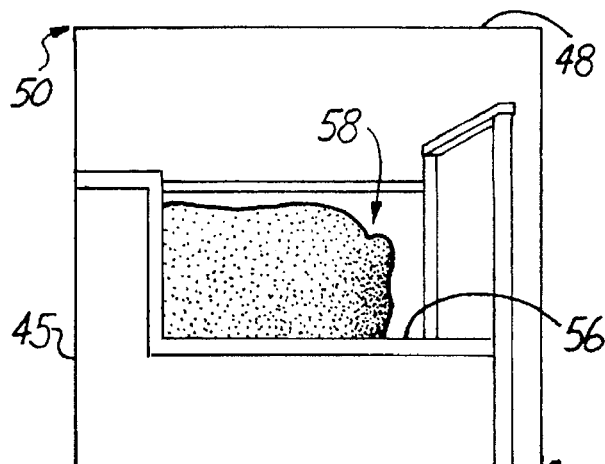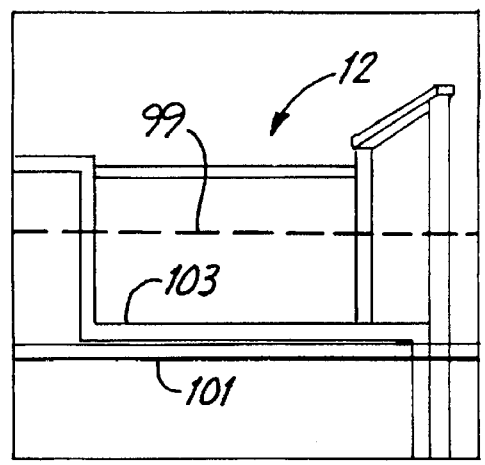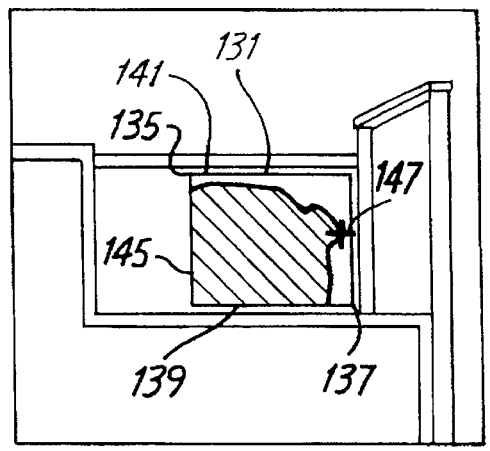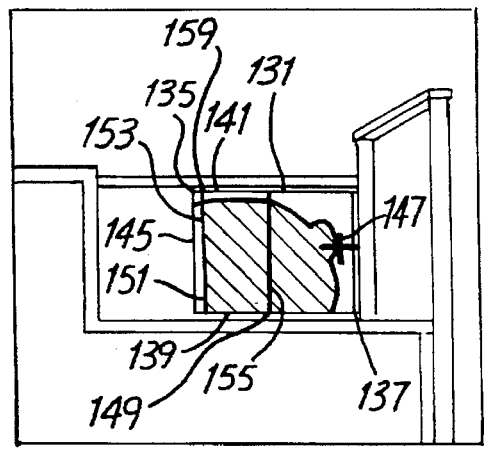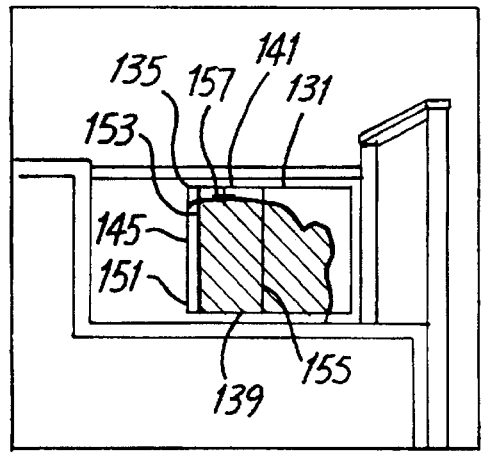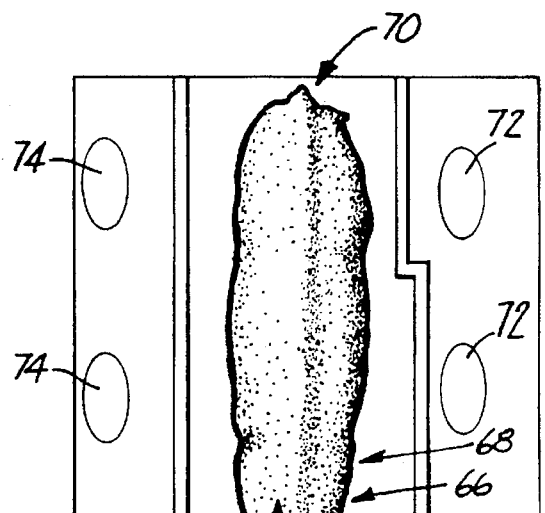

CHUTE FOR USE WITH AN ANIMAL EVALUATION SYSTEM

This is a division of application Ser. No. 08/262,234, filed Jun. 20, 1994, U.S. Pat. No. 5,576,949, which is a continuation-in-part of application Ser. No. 08/238,979, filed May 6, 1994, U.S. Pat. No. 5,483,441, which is a continuation of application Ser. No. 07/753,428, filed Aug. 30, 1991, now abandoned.

BACKGROUND OF THE INVENTION

The present invention relates generally to a system for evaluating the economic potential of selected animals and, more particularly, to an animal evaluation system that permits an animal being evaluated to move during evaluation rather than being relatively immobilized.

For a number of years, those concerned with animal husbandry, such as farmers, ranchers and the like, have attempted to evaluate the physical characteristics of animals, such as beef cattle, in order to monitor growth and to select those animals with economically favorable traits. Such traits include, among others, the animal's ability to produce meat, milk and other products of a certain type and quality, the animal's ability to convert feed into viable carcass yield, i.e. production efficiency, and the animal's ability to reproduce.

The physical characteristics of a particular animal are generally known to be dependent upon, among other factors, the type and quantity of hormones found within the animal. Hormones are chemical messengers produced by endocrine glands providing secretions directly into the bloodstream which are transported to other parts of the body where they exert a direct effect on peripheral tissues or either stimulate or inhibit other organs or glands. These hormones regulate such important internal processes as growth, muscle development, age of maturity, levels of metabolism, fertility and pregnancy. For example, in beef cattle, the combination of growth hormones and male sex hormones (testosterone) provide for development and enlargement of the muscle systems in the "fore quarters" or "shoulder" area while the combination of growth hormones and female sex hormones (estrogen) provide for the development and enlargement in the muscle system in the "rear quarters" or more commonly referred to as "stifle" area.

Thus, hormones affect much of an animal's general physical characteristics and so contribute significantly to the animal's economic value. Consequently, research has been conducted to determine, isolate and identify specific hormones appearing in, and the levels of such hormones within, an animal's bloodstreams at particular times and their corresponding bodily effects. This research, however, remains largely incomplete due in part to difficulties in isolating the concentrations and specific types of hormones in an animal's bloodstreams and, given the complex interdependent nature of hormones, difficulties in correlating such presence and quantities with corresponding effects upon present body composition or upon future body composition or both with respect to carcass yield and the animal's ability to reproduce.

Although quantitative correlations between hormone production and physical characteristics of an animal have been difficult to obtain, correlations do appear to exist between muscoskeletal development and certain reproduction and carcass traits of that animal because all depend on the hormone production of the animal though in complex and differing ways. When combined with other physiological measurements such as height and length of the animal's body at given points, correlations between various animal body structures exist.

Physical evaluation of animals has heretofore commonly involved manually measuring specific physical dimensions of such animals and comparing these measurements to averaged values from other animals of a similar kind. In the past, this method involved restraining the animal in an appropriate stanchion, pen or cage so that a technician having a measuring device such as a measuring tape could measure various dimensions of the animal's body. This method, however, has been largely unsuccessful due in large part to unavoidable inconsistencies and inaccuracies in measurements taken by technicians because of the animal's shifting of position between measurements and different techniques among technicians.

Recently, image recording systems have been used to obtain physical measurements. In a typical system of this kind, an animal is relatively immobilized by the confines of a chute, not much larger than the animal, in front of a first video camera for recording one side of the animal, and below a second video camera for recording the top side of the animal. Specific skeletal reference points, such as the hook corner of the pelvic bone, the thurl joint which is where the femur bone and the pelvic bone connect, the outermost portion of the stifle and the point of the shoulder are then located by a technician and identified on the animal with reference markers placed on the animal at those locations. The front camera is then activated to record the side profile of the animal and, once this side profile has been recorded, the top camera is activated to record the top profile. A computer then analyzes the video images to provide linear and angular measurements between the reference points for comparison with other animals of similar kind.

Although arguably more accurate than measurements taken by hand, such an image recording measurement system is of insufficient accuracy in providing measurement data on which accurate predictions of animal body compositions can be made. Specifically, in such an image recording system, the measurements remain substantially dependent upon the measuring technician's performance upon the consistent and accurate placement of reference markers upon the animal. This system also does not favorably accommodate for animal posture shifts. In a further shortcoming, the required relative immobilization of the animal during the imaging process prevents rapid sequential measurements of animals in any particular group being measured. Thus, there is a desire for more accurate animal measurement and evaluation, and a system for providing same.

SUMMARY OF THE INVENTION

The present invention provides an arrangement to evaluate animals to determine characteristics or traits thereof. The animal is evaluated in the arrangement as it moves through first and second scenes that correspond to different first and second fields of view. A first scene evaluation image representation of an image of the first scene is acquired at a selected time and a second scene evaluation image representation of an image of the second scene is acquired at substantially the same selected time. Each scene evaluation image representation includes portions that correspond to an animal image portion and a remainder image portion which is defined by excluding the respective animal image portion. Contrasting backgrounds can be provided in these scenes that contrast with the visual appearance of the animal such as by being of a different color or a different pattern, and these backgrounds may be provided in a chute that guides the direction of forward movement of animals through the first and second scenes.

After acquiring the first and second scene evaluation image representations, corresponding first and second evaluation image segregation representations are constructed. The first and second evaluation image segregation representations segregate portions that correspond to at least a part of the first and second scene image animal image portions from portions that correspond to the first and second scene image remainder image portions. This segregation may be accomplished by finding a border portion therebetween serving to segregate these portions. Such a border portion can be located by sensing differences in the representations of the animal portions and the background portions represented therein such as due to color differences between the two or to pattern differences between the two. If the background pattern is periodic, spectral decomposition of these portions will provide substantial transform value differences therebetween which can be detected to locate a border portion therebetween. With the defining of such border portions, a plurality of selected parameters are ascertained. The plurality of selected parameters form selected animal indicia that are used to evaluate the animal.

BRIEF DESCRIPTION OF THE DRAWINGS

FIG. 1D shows in block diagram form a portion of the animal evaluation system of the present invention shown in FIG. 1B;

FIGS. 2A through 2E illustrate various reconstructed scene image portions acquired by, and in some instances manipulated with, the animal evaluation system of FIGS. 1A and 1C in a first scene setting;

FIGS. 3A through 3I illustrate various reconstructed scene image portions acquired by, and in some instances manipulated with, the animal evaluation system of FIGS. 1A and 1C in a second scene setting;

FIGS. 4A through 4K, 5A and 5B together show the evaluation process for a subject animal using the animal evaluation system of FIGS. 1A and 1C.

DETAILED DESCRIPTION OF THE PREFERRED EMBODIMENTS

Figure 1A:
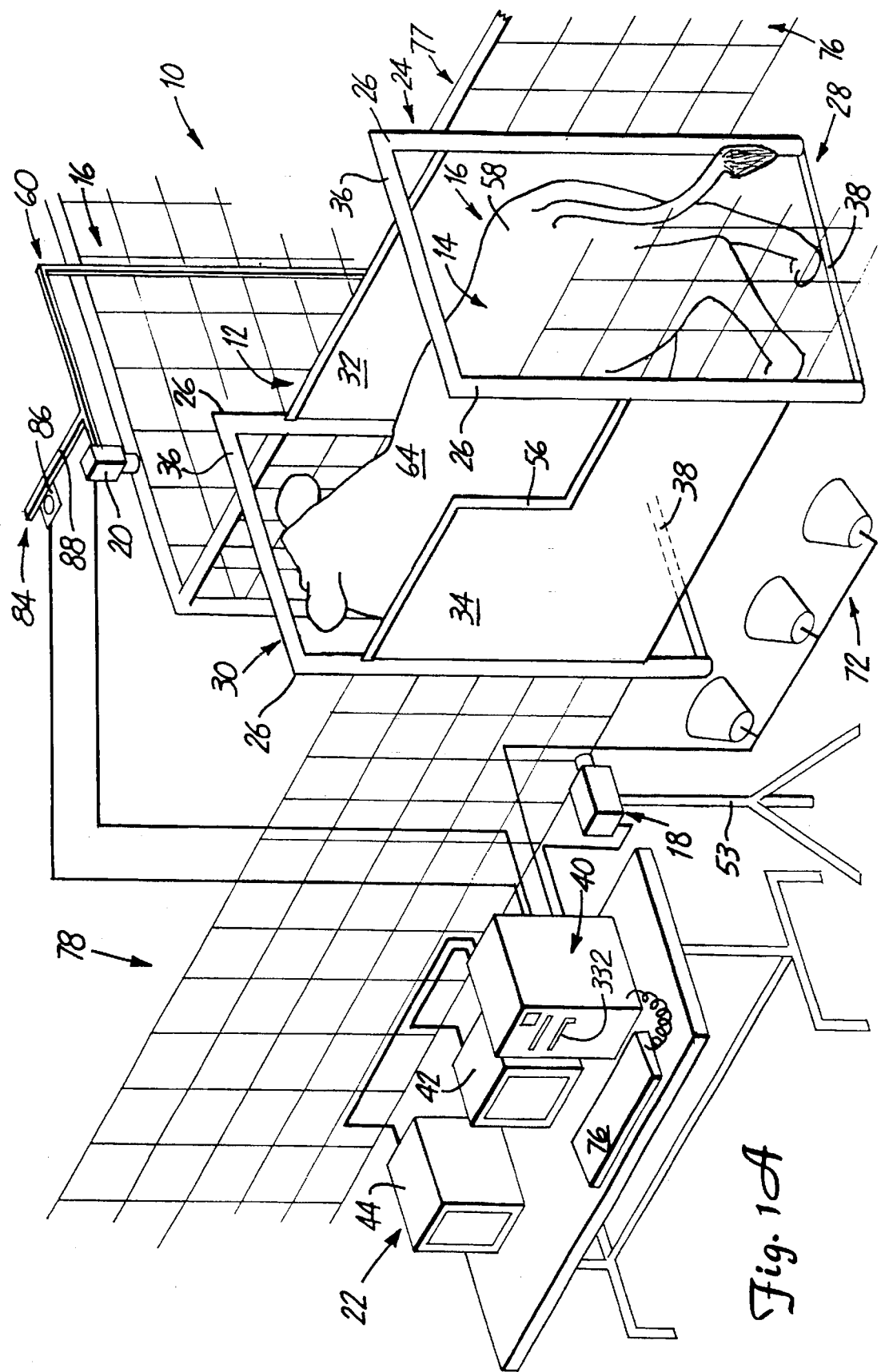
FIG. 1A illustrates pictorially an animal evaluation system embodying the present invention.

The animal evaluation system of the present invention is illustrated in FIG. 1A generally as, 10. The animal evaluation system 10 includes a chute, 12, with a relatively narrow passageway, 16, for continuing the path of an animal to be evaluated, 14, such as a cow or a steer, to pass within the field of view of an image recording apparatus. The image recording apparatus includes two video cameras, 18, and, 20, placed adjacent chute 12 and pointed to capture light from two different scenes therein along two corresponding lines of sight essentially perpendicular to one another, a side view scene and a top view scene. Cameras 18 and 20 are operated to acquire, at a selected moment, contemporaneous or substantially simultaneous profile scene image representations of portions of animal 14 along these two essentially perpendicular lines of sight to provide corresponding video data to a processing and analysis station, generally designated, 22, as animal 14 walks through passageway 16 in chute 12. Processing and analysis station 22 receives the video data in each frame, or sampling period, for the two contemporaneously taken profile scene image representations, one image scene each from image video cameras 18 and 20, and determines accurately therefrom selected physical outline measurements or parameters of animal 14 that are used to form selected animal indicia that in turn are used to establish and predict, specific characteristics of animal 14.

Chute 12 comprises a rectangular support frame, 24, having four vertical support columns, 26. A rear side wall, 32, and a front side wall, 34, are attached to the vertical support columns 26 to define an entrance location, 28, and an exit location, 30. Lateral frame support members, 36, and, 38, located at the upper and lower ends, respectively, of vertical support columns 26 at both the entrance location 28 and the exit location 30, provide lateral support to chute 12 and separate rear side wall 32 from front side wall 34 by an appropriate distance such that the longitudinal extent of animal 14 is oriented generally parallel with the longitudinal extent of passageway 16 when therein. Cameras 18 and 20 are placed adjacent chute 12 such that portions of animal 14 are within the field of view of cameras 18 and 20 simultaneously.

Figure 1B:
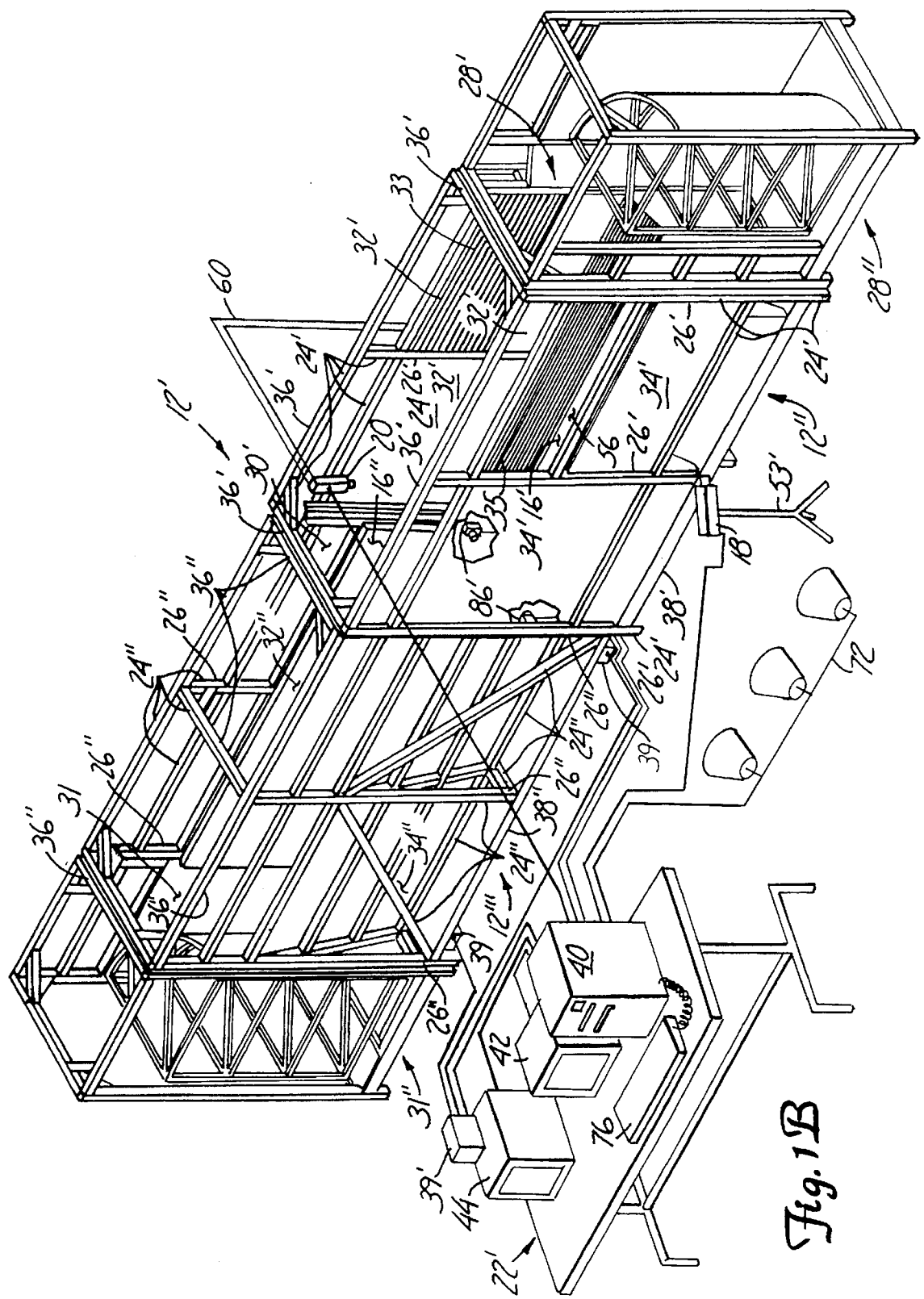
FIG. 1B illustrates pictorially an alternative animal evaluation system embodying the present invention.

An alternative chute arrangement, 12', is shown in FIG. 1B involving double chutes, a scanning chute, 12", and a weighing chute, 12'". Scanning chute 12" comprises a rectangular support frame, 24', having six vertical support columns, 26'. A rear side wall, 32', having an upper right portion thereof presenting a horizontal facing optical background pattern, 33, of about two feet in height and four feet in length, and a from side wall, 34', are attached to the vertical support columns 26' to define an entrance location, 28', controlled by an entrance "barrel" gate, 28", and an exit location, 30', which is also the entrance location for weighing chute 12'". Horizontal facing optical background pattern 33 extends between the right two support columns 26' supporting rear wall 32'. Lateral and parallel upper frame support members, 36', located at the upper ends of vertical support columns 26' at and between both entrance location 28' and exit location 30', and floor member, 38', provide lateral support to scanning chute 12" and aid in maintaining the separation forming a relatively narrow passageway, 16', between rear side wall 32' and front side wall 34' by an appropriate distance such that the longitudinal extent of an animal (not shown) is oriented generally parallel with the longitudinal extent of passageway 16' when therein. The appropriate separation distance in the instance of scanning chute 12" is increased over that of chute 12 of FIG. 1A by the widths of two downwardly and inwardly slanted, substantially vertically facing, optical background pattern shelves, 35, located about 18 in. above floor 38'. Shelves 35 are each just under a foot in width in extending the length of scanning chute 12" (about eight feet), and each slants inwardly and downwardly by about 25°.

Horizontal facing optical background pattern 33 and the pattern on substantially vertical facing optical background pattern shelves 35 are chosen to be relatively large feature spatial patterns, surface texture patterns, colors, or the like, which will always contrast with any animal expected to be scanned and measured which, for cattle, may typically be either a black color, an off-white color, a brown color, a reddish brown color, or some combination thereof on a spotted animal. In the background patterns shown here, alternating white and black lines extending in the direction of scanning chute 12", i.e. horizontal lines, have been used. These have been provided by a sheet of white polyvinylchloride in which grooves of one-half in. width are made separated by one-half in. spacings therebetween. These grooves have been filled with black polyvinylchloride strips that are solvent cemented therein to form one-half in. black horizontal strips. The resulting surface can be washed easily and is quite durable against impacts, abrasions and the like. Shelves 35 are slanted to aid in having debris and liquids roll, slide or run off therefrom, and must be quite strong if large animals are scanned as they will on occasion get at least partially up on these shelves. The dimensions of the chute and the positioning of the background patterns will change with the species of animal to be scanned, e.g. larger for cattle but smaller for sheep or swine.

Cameras 18 and 20 are placed adjacent scanning chute 12" with again two different lines of sight such that portions of an animal and portions of horizontal facing optical background pattern 33 are within the field of view of camera 18 simultaneously with portions of that animal and portions of substantially vertically facing optical background pattern shelves 35 being within the field of view of camera 20. The slanting of shelves 35 also counters to some extent the placement of camera 20 over the center of scanning chute passageway 16' rather than directly over the shelves. Here too, cameras 18 and 20 are operated to acquire, at a selected moment, contemporaneous or substantially simultaneous profile scene image representations of portions of animal 14 along these two essentially perpendicular lines of sight to provide corresponding video data to an alternative processing and analysis station, generally designated, 22', as the animal walks through passageway 16' in scanning chute 12". Processing and analysis station 22' again receives the video data in each frame, or sampling period, for the two contemporaneously taken profile scene image representations, one image scene each from image video cameras 18 and 20, and determines accurately therefrom selected physical outline measurements or parameters of animals in such image scenes that are used to form selected animal indicia that in turn are used to establish, and predict, specific characteristics of animal 14.

Weighing chute 12'" is also formed by a rectangular support frame, 24", having six vertical support columns, 26" and both a rear side wall, 32", and a front side wall, 34", attached to the vertical support columns 26' to define common scanning chute exit, and weighing chute entrance, location 30'. These walls also define a weighing chute exit location, 31, controlled by an exit "barrel" gate, 31". Lateral and parallel upper frame support members, 36", located at the upper ends of vertical support columns 26" at and between both entrance location 30' and exit location 31, and floor member, 38", provide lateral support to weighing chute 12'" and aid in maintaining the separation forming a relatively narrow passageway, 16", between rear side wall 32" and front side wall 34" by an appropriate distance such that the longitudinal extent of an animal is oriented generally parallel with the longitudinal extent of passageway 16" when therein. Floor member 38" is arranged with a pair of load bar scale sensors, 39, for weighing an animal while in weighing chute 12'" to provide an electronic output signal to a scale controller and display arrangement, 39', which provides a digital output signal indicating the weight measured.

Cameras 18 and 20 are video cameras of conventional design each having, as its image acquisition element, a charge coupled (CCD) device. Such charge coupled devices, herein also referred to individually as a "CCD", comprise a plurality of light sensors arrayed in a matrix or grid pattern. The average intensity of light impinging upon each light sensor over a sampling period is converted to a representative analog electric signal, a succession of which forms the video data to be provided to processing and analysis stations 22 or 22'.

Figure 1C:
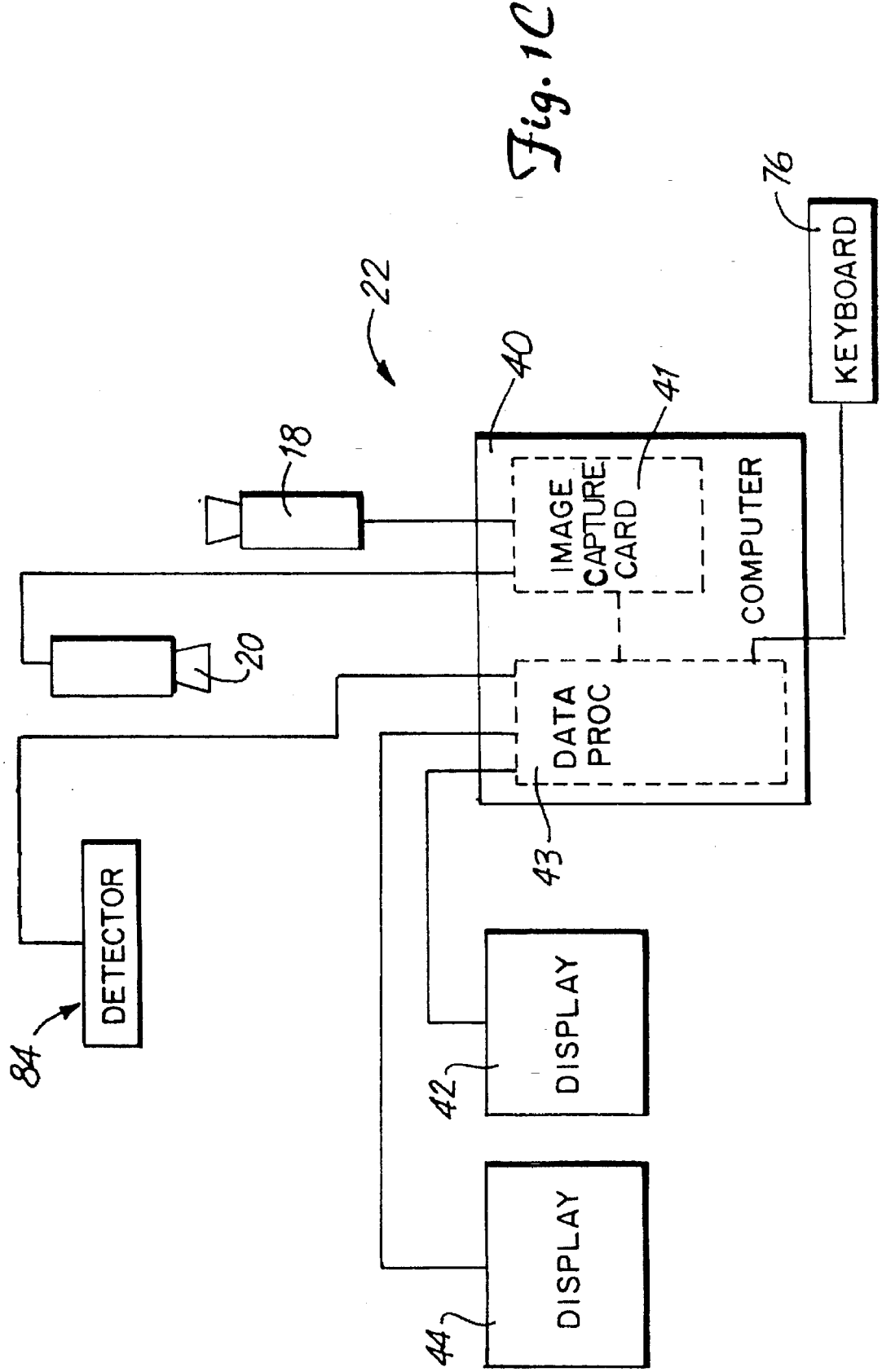
FIG. 1C shows in block diagram form a portion of the animal evaluation system of the present invention shown in FIG. 1A.

Referring to FIG. 1C, processing and analysis station 22 includes a computer means, 40, having an image video data receiving and storage system, such as a "frame grabber", or image capture, card, 41, of conventional design that receives the analog video data signals for a sampling period and converts these analog electric signals to corresponding digital binary data upon an appropriate command from a control unit and data processing means, 43. The digital video data representing the contemporaneous scene images acquired from cameras 18 and 20 are stored in random access memory (RAM) located on the image capture card 41 with the binary value of each byte (8 bits) in RAM representing the average intensity of light that impinged upon the corresponding light sensitive sensor of the CCD during the selected sampling period. The range of possible stored intensity values, $2^8=256$, are known as "gray levels" wherein the absence of light has a decimal value of 0 (black) and the greatest amount of light has a decimal value of 255 (white).

Data processing means 43, digitally processing the scene image representation video data of the stored scene images in image capture card 41, segregates portions thereof corresponding to at least part of the first and second scene image animal image portions from other portions thereof corresponding to those portions not including the animal image portions. From these segregated scene image representations, data processing means 43 ascertains values of a plurality of selected parameters that in turn are used to form selected animal indicia. The selected animal indicia are used to estimate a value for a selected animal trait or characteristic. A conventional keyboard, 76, is connected to computer means 40 to provide for operator control.

FIG. 1D shows an alternative processing and analysis station 22' block diagram which is shown to have components similar to those of system 22 except for the addition of scale sensors 39 and the connection thereof through controller and display arrangement 39' to computer 40 at processing means 43. Although processing means 43 is configured similarly for each of stations 22 and 22', the software differs somewhat in each since different digital image processing techniques are used in the computers for each station to segregate the scene image portions.

Figure 1E:
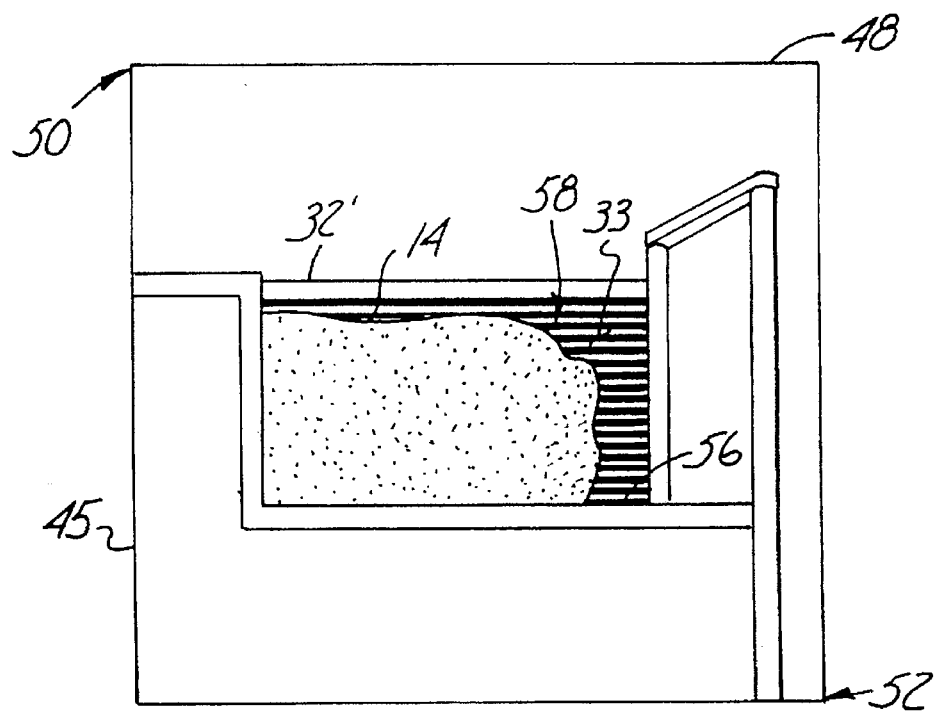
FIGS. 1E and 1F illustrate reconstructed scene image portions acquired by the animal evaluation system of FIGS. 1B and 1D in first and second scene settings, respectively.

The stored scene image representations are used as the display basis for a pair of video monitors or displays, 42 and 44, to reconstruct the corresponding scene images thereon at each of stations 22 and 22'. The reconstructed scene images approximate the original scene images, which correspond to the original scenes, through a grid or matrix pattern of picture elements, commonly referred to as "pixels", arranged in columns and rows in correspondence with the light sensitive elements on the corresponding CCD. Reconstructed scene images for the arrangement of scanning chute 12" and station 22' are illustrated in FIG. 1E based on a scene image captured by camera 18, and in FIG. 1F based on a scene image captured by camera 20. Each pixel in either of these two scene images is referenced as a coordinate pair (X,Y) with the first number, X, in FIG. 1E, for instance, representing the number of pixels in a row, or succession of pixel columns, from a left border edge, 45, of the reconstructed scene of that figure while the second number, Y, in each coordinate pair represents the number of pixels in a column, or succession of pixel rows, from an upper border edge, 48, of that reconstructed scene. The intersection of these two borders in the upper left corner, 50, of this pixel matrix has coordinates (0,0), and the diagonally opposite, or lower right corner, 52, has coordinates $(X_{MAX}, Y_{MAX})$ wherein $X_{MAX}$ equals the total number of columns in the reconstructed scene image displayed, and $Y_{MAX}$ equals the total number of rows in the reconstructed scene image displayed. Typical values are pixel counts of 512 and 480 for the sides of the pixel array representing a scene image occurring on the CCD of one of cameras 18 or 20 to thus provide 245,760 pixels for that image each having 256 possible gray levels.

Reconstructed scene images for the arrangement of chute 12 and station 22 are illustrated in FIGS. 2A through 2E based on a scene image captured by camera 18, and in FIGS. 3A through 3I based on a scene image captured by camera 20. Referring to FIG. 2A, by way of example, each pixel is again referenced as a coordinate pair (X,Y) with the first number, X, representing the number of pixels in a row, or succession of pixel columns, from left border edge 45, while the second number, Y, in each coordinate pair represents the number of pixels in a column, or succession of pixel rows, from upper border edge 48. Upper left corner 50 of this pixel matrix again has coordinates (0,0) and lower right corner 52 again has coordinates $(X_{MAX}, Y_{MAX})$ wherein $X_{MAX}$ equals the total number of columns in the reconstructed scene image display and $Y_{MAX}$ equals the total number of rows in the reconstructed scene image display.

Referring back to FIG. 1A, camera 18 is placed on a suitable support means, such as a tripod device, 53, with the camera having its longitudinal axis aligned perpendicularly to an opening, 56, provided in front side wall 34. Similarly, in FIG. 1B, camera 18 is placed on a suitable support means, such as a tripod device, 53', with the camera having its longitudinal axis aligned perpendicularly to opening 56 provided in front side wall 34'. Thus, camera 18 is able to acquire a scene image representation of at least that portion of a side profile of an animal appearing to it in opening 56. The scene image acquired by camera 18 during a sampling period in which animal 14 is properly positioned in passageway 16' in scanning chute 12", or in passageway 16 in chute 12, comprises the upper rear portion of the animal's hind quarter, 58, the image of which is projected on the lens of camera 18 through opening 56 as illustrated in the reconstructed scene images of FIGS. 1E or 2A.

Camera 20 is located above passageway 16' in scanning chute 12" on a support member, 60, either secured to rear side wall 32' or on a free standing tripod device similar to that of tripod 53' or, in the alternative arrangement, above passageway 16 in chute 12 on support member 60 either secured to rear side wall 32 or on a free standing tripod device similar to that of tripod 53. The axis of camera 20 is aligned perpendicular to the floor of chute 12' and over the centerline of passageway 16', or aligned perpendicular to the floor of chute 12 and over the centerline of passageway 16. Camera 20 acquires a scene image of at least a portion of the back, 64, of animal 14 as illustrated in the reconstructed images of FIGS. 1F or 3A. Back or top profile portion 64 extends from a point, 66, forward of the animal's shoulders, 68, rearward to include the animal's rearmost point, 70.

Figure 1F:
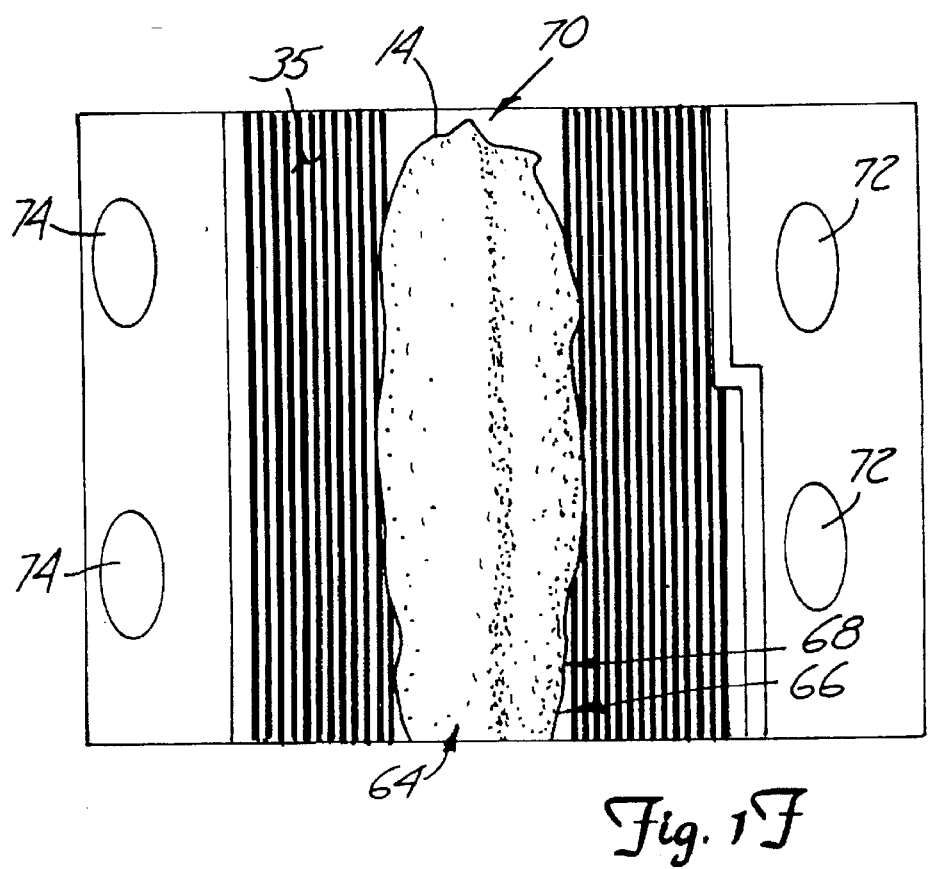

Suitable lighting means are provided to assure enough light is reflected to cameras 18 and 20 such as portable lights, 72, illustrated pictorially in FIG. 1B, and in FIG. 1A, together with lighting means, 74, not shown in these two figures, but which is shown schematically in FIG. 1F and in FIGS. 3A through 3I, along with lighting means 72, as ovals indicating areas of higher light intensity. Lights 74 illuminate animal 14 and either scanning chute 12", along opposite sides of passageway 16', or chute 12 along opposite sides of passageway 16.

All components of evaluation system 10 are portable allowing the evaluation system to be set up in any convenient location. As illustrated in FIG. 1A for chute 12, the chute is typically positioned in a gateway, 77, between two animal collection pens, 76 and 78. Pens 76 and 78 may reside indoors, such as in a barn, or outdoors, such as in a field or stockyard. Power is supplied to evaluation system 10 from either conventional 110 volt line current or alternatively from a generator, not shown.

Detection of animal 14 within passageway 16 of chute 12 is provided by an animal position detection means, 84. In this embodiment, animal position detection means 84 includes an ultrasonic transducer, 86, attached to a support member, 88, that in turn is secured perpendicularly to support member 60 to parallel passageway 16. Ultrasonic transducer 86 is positioned above passageway 16 such that when the desired portions of the body of animal 14 are simultaneously within the fields of view of camera 18 and camera 20, an output signal is provided therefrom to data processing means 43 in computer 40 as illustrated in FIG. 1C. That signal, in turn, initiates image capture card 41 to direct the contemporaneous capture and storage of the video data provided by video cameras 18 and 20 in the current sampling periods of each scene corresponding to the two profile scene images falling on the lens of those cameras.

As illustrated in the preferred embodiment of FIG. 1A, ultrasonic transducer 86 is positioned near exit location 30 such that when the head of animal 14 is detected, the animal's rear quarter 58 is located adjacent opening 56 and in front of camera 18 as illustrated in the reconstructed scene image of FIG. 2A, while main body 64 of animal 14, as illustrated in the reconstructed scene image of FIG. 3A, is located opposite camera 20. Storing the video data from the two contemporaneous or substantially simultaneous scene image representations taken of the scenes along the two different lines of sight, permits accurate physical measurements of animal 14 while that animal moves through chute 12 from pen 76 to pen 78 without the need for mobilizing animal 14 within chute 12.

In a similar manner, animal 14 is detected within passageway 16' by animal position detection means 84 which is now located just above floor member 38' at the height of the lower part of the legs of animal 14 because of the use of a different kind of a detector. In the embodiment here, animal position detection means 84 includes a photocell arrangement, 86', attached to the scanning chute side walls, the light transmitter to rear side wall 34' and the light receiver to front side wall 32' with a cable connecting it to computer 40. Photocell arrangement 86' is positioned to transmit a beam of light from transmitter to receiver across passageway 16' such that when the desired portions of the body of an animal to be measured are simultaneously within the fields of view of camera 18 and camera 20, an output signal is provided therefrom to data processing means 43 in computer 40 as illustrated in FIG. 1D. That signal, in turn, initiates image capture card 41 to direct the contemporaneous capture and storage of the video data provided by video cameras 18 and 20 in the current sampling periods of each scene corresponding to the two profile scene images falling on the lens of those cameras.

As illustrated in the embodiment shown in FIG. 1B, photocell transducer arrangement 86' is positioned near common scanning chute exit, and weighing chute entrance, location 30' such that when the front legs of an animal are detected by interrupting the photocell light beam, the animal's rear quarter 58 is located adjacent opening 56 and in front of camera 18 as illustrated in the reconstructed scene image of FIG. 1E, while main body 64 of animal 14, as illustrated in the reconstructed scene image of FIG. 1F, is located opposite camera 20. Storing the video data from the two contemporaneous or substantially simultaneous scene image representations taken of the scenes along the two different lines of sight, permits accurate physical measurements of animal 14 while that animal moves through chute 12' without the need for immobilizing animal 14 within chute 12'.

Thus, various height and width measurements of animal 14 can be obtained from the contemporaneous scene image representations made as that animal moves through either of chute 12 and 12' or changes position therewithin. In the ensuing positional or configurational changes, or both, individual muscles of muscle groups are either extended or contracted in a corresponding sequence necessary to accomplish such movement. The flexion and extension of these individual muscles causes corresponding interdependent changes in longitudinal and lateral profile dimensions thereof, and so in any measurements contemporaneously taken of that muscle group. That is, the animal's hips and shoulders flex, its legs are first together and then apart, and the animal's back as a result moves up and down.

However, the relationships between these muscle groups and other musculoskeletal parameters, such as hip height and selected body length, remain substantially unchanged despite the changes occurring in both the muscle group profile dimensions and the musculoskeletal parameters during such motions and reconfigurations. Thus, acquiring selected animal body parameters, using perpendicular scene image representations of the animal made contemporaneously, provides a consistent basis for an accurate estimate of the animal's muscle configurations, and other related body structures, whatever the animal's configuration may have been at the time of such acquisition. Because of the interdependence of animal profile dimensions during motions or reconfigurations, this basis would be lost if the scene image representations were taken sufficiently separated in time from one another.

Although the present invention acquires selected parameters of the animal contemporaneously such that the basis is not lost or eliminated due to position changes of the animal, animal passage through chute 12 should not be at a rate greater than that of a walk. This is so because as the animal walks the weight of the animal is distributed on three of its legs in a succession of any one of four combinations. When the animal increases its rate to that of a canter, the weight of the animal alternates between distribution upon two legs to distribution on three legs which may result in less accurate measurement data. Even then, the animal may be moving at a rate up to 20 feet a second so that an accuracy of measure of one inch would require that successive scene images be completely captured within four milliseconds of one another. Since typical camera scan times over the scene on the CCD are from 17 to 33 milliseconds in duration, waiting for a completed image capture on one of cameras 18 and 20 before beginning capture on the other would not come close to providing such accuracy.

Figure 4A:
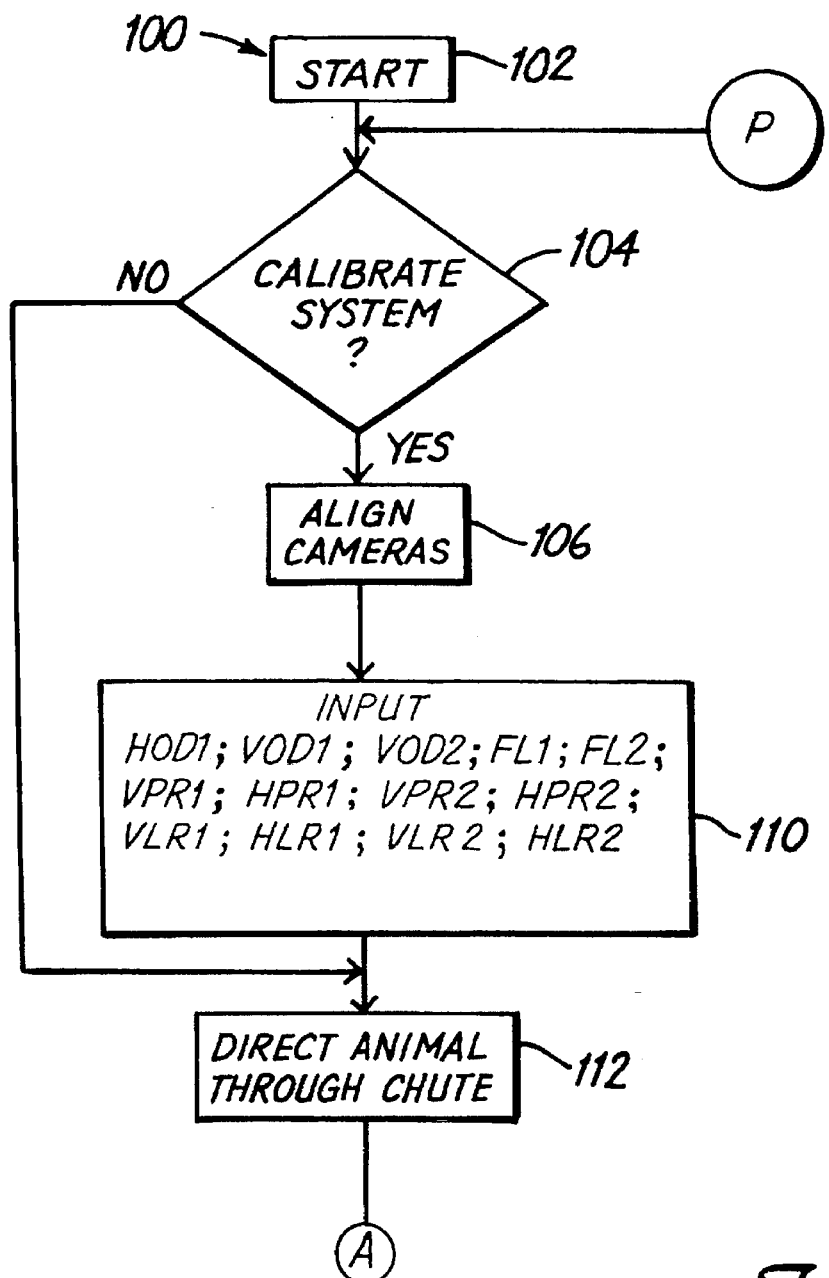

Operation of evaluation system 10 of FIG. 1A follows the steps shown in a procedure, 100, of FIGS. 4A through 4K, 5A and 5B. Referring to FIG. 4A, a block, 102, labeled "START", indicates the beginning of procedure 100 and represents activation of evaluation system 10 by an operator wherein appropriate power is supplied to cameras 18 and 20, lights 72 and 74 (if required), ultrasonic transducer 86 and processing and analysis station 22.

Next, as represented by a decision diamond, 104, if system operation rust requires alignment of cameras 18 and 20 with chute 12 to obtain the selected scene images or initialization of system parameters to be described below, computer means 40 generates an appropriate message on, for example, monitor 42 to instruct the operator to align the cameras. Procedural flow then continues to blocks 106 and 110.

Block 106 represents the step of aligning the cameras. Camera 18 is aligned having its axis essentially perpendicular to opening 56 to provide a reconstructed scene image on monitor 42 that corresponds to the scene image falling on the lens of camera 18 that substantially encompasses opening 56 of chute 12 as illustrated in the reconstructed image of FIG. 2B. A horizontal line, 101, is then superimposed upon this reconstructed image and camera 18 is further adjusted such that horizontal line 101 is positioned substantially parallel to a predetermined image representation of a horizontal edge, 103, of chute 12.

Camera 20 is aligned in a similar manner. Camera 20 is aligned having its axis essentially perpendicular to the open top through of chute 12 to provide a reconstructed scene image on monitor 44 that corresponds to the scene image falling on the lens of camera 20 that encompasses that portion of chute 12 as illustrated in the reconstructed image of FIG. 3B. A vertical line, 104, is then superimposed upon this reconstructed image and camera 20 is further adjusted such that vertical line 104 is positioned substantially parallel to a predetermined image representation of an edge, 107, of chute 12.

When both cameras 18 and 20 have been properly aligned, corresponding offset distances are entered or stored in data processing means 43 as represented by a block, 110. These offset distances include the horizontal offset distance in inches between the lens of camera 18 and the center longitudinal vertical plane of chute 12, represented herein as "HOD1"; the vertical offset distance in inches from a point in passageway 16 above the floor of chute 12 that corresponds to a pixel or group of pixels on the reconstructed scene image of FIG. 2A essentially on a vertical centerline, 99, thereof, represented herein as "VOD1"; and the vertical offset distance between the lens of camera 20 perpendicular to the centerline of chute 12 in inches, represented herein as "VOD2".

In addition to the aforementioned offset distances, additional system parameters are also entered or stored in data processing means 43. These system parameters include the focal length of camera 18 in millimeters, represented herein as "FL1"; the focal length of camera 20 in millimeters, represented herein as "FL2"; the ratio of a succession of vertical pixels on monitor 42 to a corresponding succession of light sensitive elements arrayed in a portion of the CCD of camera 18, represented herein as "VPR1"; the ratio of a succession of horizontal pixels on monitor 42 to a corresponding succession of light sensitive elements arrayed in a portion of the CCD of camera 18, represented herein as "HPR1"; the ratio of a succession of vertical pixels on monitor 44 to a corresponding succession of light sensitive elements arrayed in a portion of the CCD of camera 20, represented herein as "VPR2"; the ratio of a succession of horizontal pixels on monitor 44 to a corresponding succession of light sensitive elements arrayed in a portion of the CCD of camera 20, represented herein as "HPR2"; the number of successive vertical light sensitive elements per millimeter for the CCD of camera 18, represented herein as "VLR1"; the number of successive horizontal light sensitive elements per millimeter for the CCD of camera 18, represented herein as "HLR1"; the number of successive vertical light sensitive elements per millimeter for the CCD of camera 20, represented herein as "VLR2"; and the number of successive horizontal light sensitive elements per millimeter for the CCD of camera 20, represented herein as "HLR2". The aforementioned offset distances and system parameters are used to translate selected animal height and width distances calculated from the video data corresponding to these reconstructed scene images to corresponding physical dimensions of the animal.

With the offset distances and system parameters stored in data processing means 43, the operator directs the first animal 14 through chute 12 as represented by a block, 112, in FIG. 4A.

Figure 3B:
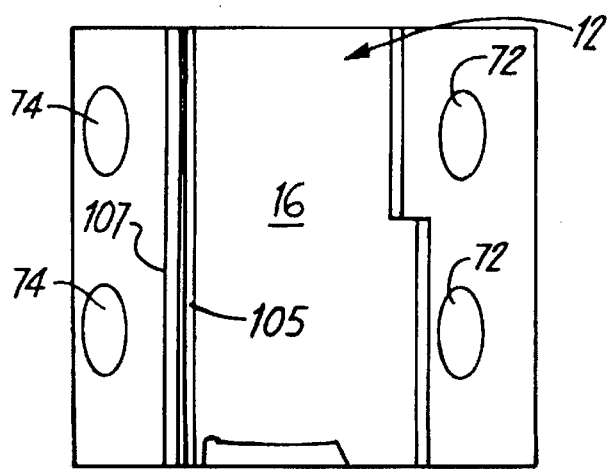
Figure 4B:
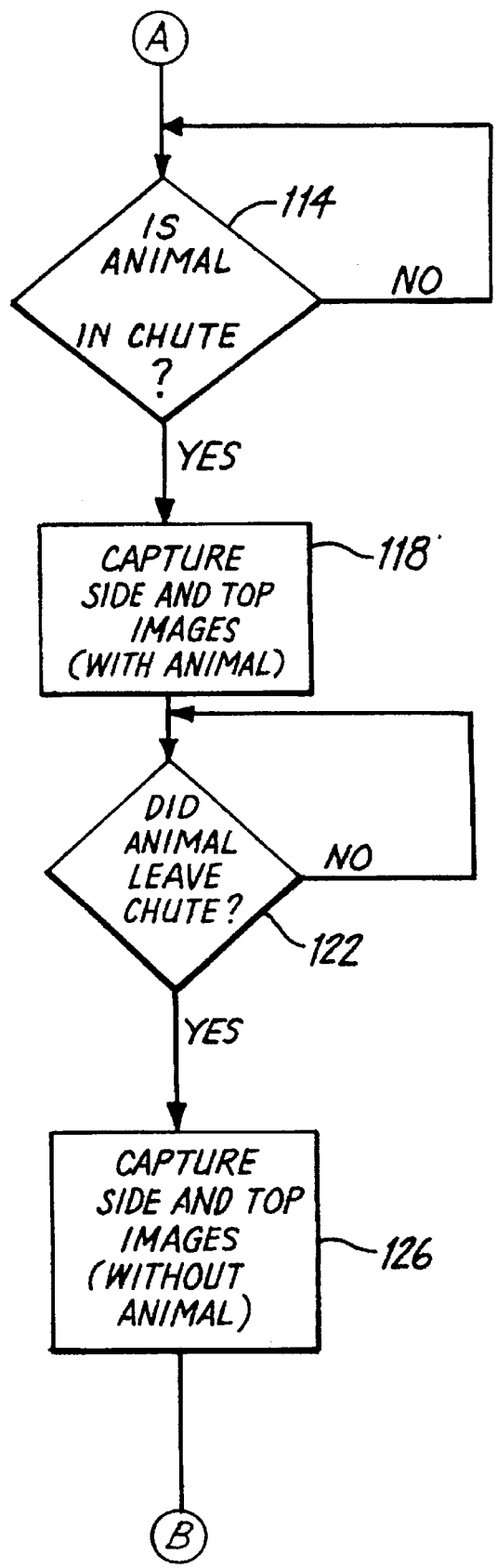
Figure 4C:
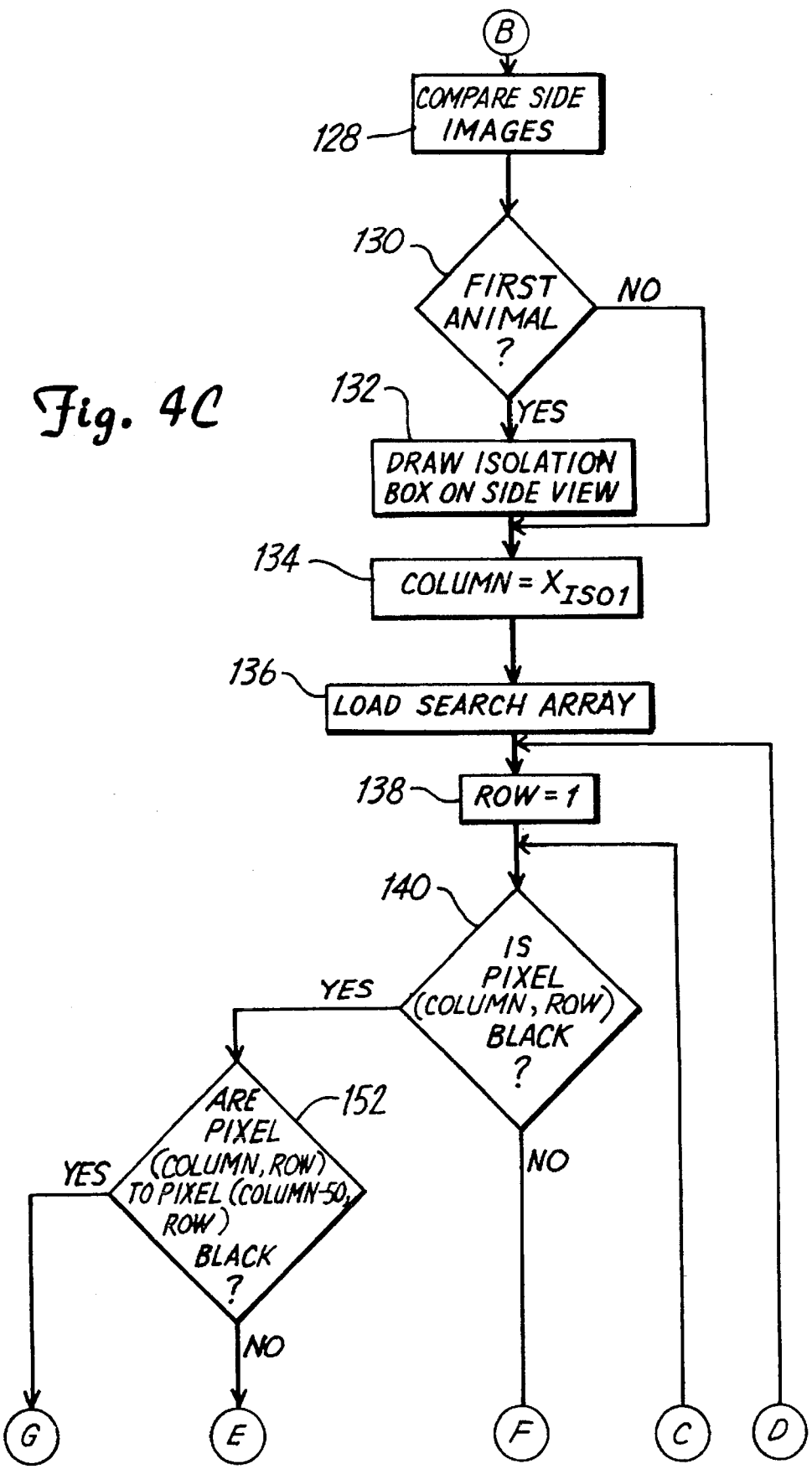

Next, referring to FIG. 4B, a decision diamond, 114, represents the step of detecting presence of animal 14 within the chute 12. As described above, ultrasonic transducer 86 detects the presence of animal 14 and provides an output signal that initiates image capture card 41 to direct the contemporaneous capture and storage of the video data provided by cameras 18 and 20 in the current sampling periods of each scene corresponding to the profile scene images falling on the lens of those cameras. A block, 118, represents the step of capturing the substantially simultaneous image representation profiles wherein the image capture card 41 of computer means 40 of FIG. 1, captures, during a selected sampling period, a side image representation corresponding to the scene falling upon the lens of camera 18 which is similar to that of the reconstructed image of FIG. 2A; and, approximately 1/60 of a second later or contemporaneously with that sampling period, after storage of the binary data corresponding to that side image representation in RAM, the image capture card then captures a top image representation corresponding to the scene falling upon the lens of camera 20 which is similar to that of the reconstructed image of FIG. 3A. The binary data corresponding to this top image representation is also stored in RAM.

A decision diamond, 122, then represents animal departure from chute 12 as monitored by the ultrasonic transducer 86. When the output signal from ultrasonic transducer 86 signifies that animal 14 has departed from chute 12, procedural flow continues to a block, 126. Block 126 represents the step of capturing the substantially simultaneous image representation profiles wherein the image capture card 41 of computer means 40 of FIG. 1, captures, during a selected sampling period, a second side image representation corresponding to the scene falling upon the lens of camera 18 which is similar to that of the reconstructed image of FIG. 2B, but without horizontal line 101; and, approximately 1/60 of a second later or contemporaneously with that sampling period, after storage of the binary data corresponding to that second side image representation in RAM, the image capture card then captures a second top image representation corresponding to the scene falling upon the lens of camera 20 which is similar to that of the reconstructed image of FIG. 3B, but without vertical line 105. The binary data corresponding to this second top image representation is also stored in RAM.

A block, 128, then represents the step of constructing from the first side image representation, a first side image segregation representation that segregates portions of the first side image representation into a portion that corresponds to at least a part of the image of the animal's hind quarter 56 as illustrated in the reconstructed image of FIG. 2A from portions that correspond to a side image remainder portion that does not include that image part of the animal's hind quarter 56. In the preferred embodiment, the step of constructing includes comparing the value (gray level) stored within each corresponding byte for each pixel of the first side image representation with the corresponding value stored within each corresponding byte for each corresponding pixel of the second side image representation. Under this processing operation, if the gray levels of a given pixel are substantially the same, as determined by a resultant value within a predetermined range of possible values, the corresponding pixel of the first side image representation is determined to be part of the remainder portion and assigned a gray level value corresponding to white in the side image segregation representation. If, however, the gray levels of a given pixel are substantially different, as determined by a resultant value exceeding the predetermined possible range of values, the corresponding pixel is considered part of the animal portion and assigned a gray level value corresponding to black in the side image segregation representation.

Alternative image processing techniques to segregate portions of the first side image representation into the corresponding animal image portion from the remainder image portion are herein included. For example using only the first side image representation, the gray level value stored within each corresponding byte for each pixel of the first side image representation can be compared to a preselected threshold value. Under this processing operation, if the gray level value of that corresponding pixel is greater than or equal to the threshold value, the corresponding pixel of the first side image representation is determined to be part of the remainder portion and assigned a gray level value corresponding to white in the side image segregation representation. If, however, the gray level value of that corresponding pixel is less than the threshold value, the corresponding pixel is considered part of the animal portion and assigned a gray level value corresponding to black in the side image segregation representation. Both of this technique and the previous one could be used even if the lighting was positioned on opposite sides of animal 14 from those on which cameras 18 and 20 are positioned in an attempt to improve contrast between animal and background, such light being directed, through translucent panels, for instance, toward the cameras in which that portion of it not blocked by animal 14 is to be received rather than being on the same side to be reflected to those cameras.

Another alternative which can provide good contrast between the background of animal 14 and both the chute rear side wall and the floor, or shelves above the floor, is to use color cameras for cameras 18 and 20 so that they also record the colors in the scene images captured therein. In this alternative, chute rear side wall 32, possibly front side wall 34, and the floor of chute 12 (or, more likely, installed spaced apart shelves above the floor like shelves 35 in FIG. 1B) in FIG. 1A are provided in a color that will always contrast well with the expected range of colors of animal 14. Thus, if the animals to be measured including animal 14 are to be cattle, an appropriate color for the chute rear wall and shelves would be green. Establishing sharp contrast differences between the image of animal 14 and other portions of the scene image is important because of the errors that can otherwise be introduced by changing shadows, dirt splattered on the background, and the like.

Even if just gray scale images are to be captured by cameras 18 and 20, the contrast between the background of the rear chute side wall 32' and an animal 14, and between shelves 35 (or floor 38' if shelves not used) and an animal 14, can be much enhanced by providing on these walls, floors and shelves periodically repeated spatial patterns such as has been introduced in horizontal facing optical background pattern 33 and the pattern on substantially vertical facing optical background pattern shelves 35 in scanning chute 12" in FIG. 1B. Such patterns could alternatively repeat horizontally rather than vertically as shown for that chute, or could be periodic in both directions. Such periodicity eases the detection of background versus animal since the patterns do not occur in the animals to be scanned to thereby improve accuracy of the segregation in the subsequent digital signal processing. This technique will be described more fully below.

Continuing with the image segregation technique first described above for segmenting the image portion of animal 14 from the remainder of the first side image representation provided from the image captured by camera 18, the next step is represented by a decision diamond, 130. If this is the first animal for a successive run of animals through the evaluation system, the operator at the processing and analysis station 22 then superimposes, as represented by a block, 132, an isolation box, 131, illustrated in the reconstructed image of FIG. 2C, to isolate the rear top portion 58 of animal 14. Utilization of isolation box 131 increases the efficiency of system 10 by reducing the computational operations necessary to obtain physical measurements of animal 14 in that all further processing upon the segregated side image representation is confined within isolation box 131. Isolation box 131 is also used by processing and analysis station 22 in successive runs of animals through the chute 12 thereby eliminating further operator interaction with successive segregated side image representations. As such, isolation box 131 is made sufficiently large to encompass minor variations between animals of successive runs.

FIGS. 2C through 2E illustrate a portion of the resultant binary, black, (illustrated with hatching), or white, segregated image representation contained within isolation box 131 superimposed upon the background or second image representation of FIG. 2B but excluding the horizontal line 101. These Figures are provided as illustrative aids in describing the location of selected points and calculation therefrom of selected parameters from the segregated representation data that corresponds to the animal image portion. Reconstruction of these images after defining isolation box 131 is not necessary given that selected parameters are based on the corresponding stored segregated representation data.

Referring to FIG. 2C, the segregated image representation portion of isolation box 131, herein also referred as "isolation box 131", has $X_{ISO1}$ columns and $Y_{ISO1}$ rows wherein an upper left corner, 135, has pixel coordinates (1, 1) and a lower right corner, 137, has pixel coordinates ($X_{ISO1}, Y_{ISO1}$). Isolation box 131 is used by data processing means 43 according to the steps described below to locate selected portions of the corresponding animal image portion to determine selected parameters.

Referring back to FIG. 4C and beginning with a block, 134, a counter labeled "column" is initialized with the corresponding value of the right most column, $X_{ISO1}$, of isolation box 131. A one dimensional search array is then loaded with the gray level values of each pixel contained within the column designated by the column counter as represented by a block, 136.

A counter labeled "row" is then initialized at a value of one as represented by a block, 138, and the corresponding element value indexed by the row counter in the search array which also corresponds to the pixel having as coordinates (column, row) is examined for a gray level equal to zero which denotes the occurrence of a black pixel. A decision diamond, 140, represents examination of the pixel and if this pixel is not black, the row counter value is incremented by one as represented by a block, 142, in FIG. 4D. Provided that the row counter value does not exceed $Y_{ISO1}$, the row corresponding to a lower edge, 139, of the isolation box 131 shown in FIG. 2C, as represented by a decision diamond, 144, procedural control is returned to block 140 with continued searching progression through the one dimensional array corresponding to the current column of pixels.

If, however, the row counter value does exceed the lower edge 139 of isolation box 131, as signified by the row counter value greater than $Y_{ISO1}$, the column counter value is then decremented by one as represented by a block, 146. If the column counter obtains a value less than one, indicating that the first column or a left border edge, 145, of isolation box 131 shown in FIG. 2C has been searched and that isolation box 131 has been completely examined without a determination of the "tail point", as represented by a decision diamond 148, the search procedure would then be halted at a block, 150, labeled "STOP", and an appropriate warning or indication would be initiated by processing and analysis station 22. In the event the column counter value is not less than one or beyond left border edge 145 of isolation box 131, control is returned to block 138 wherein the row counter is reinitiated to a value of one.

Downward and leftward pixel examination through isolation box 131 is continued according to the process described above until a black pixel, as represented by decision diamond 140, has been detected. To verify that this pixel corresponds to a point on the animal image portion, the gray level values of 50 pixels to the left of the detected black pixel are added together, as represented by a decision diamond, 152. If the sum of these values equals zero, indicating a continuous black image, a tail point, 147 of animal 14, illustrated in FIG. 2C, has been located and the corresponding values of the column and row counters are stored as the "tail point" coordinates, as represented by a block, 154, in FIG. 4D. If in the event that the sum of gray level values to the left of the detected black pixel does not equal zero, the search process continues searching for another black pixel by incrementing the row counter value by one as represented by block 142.

Figure 4D:
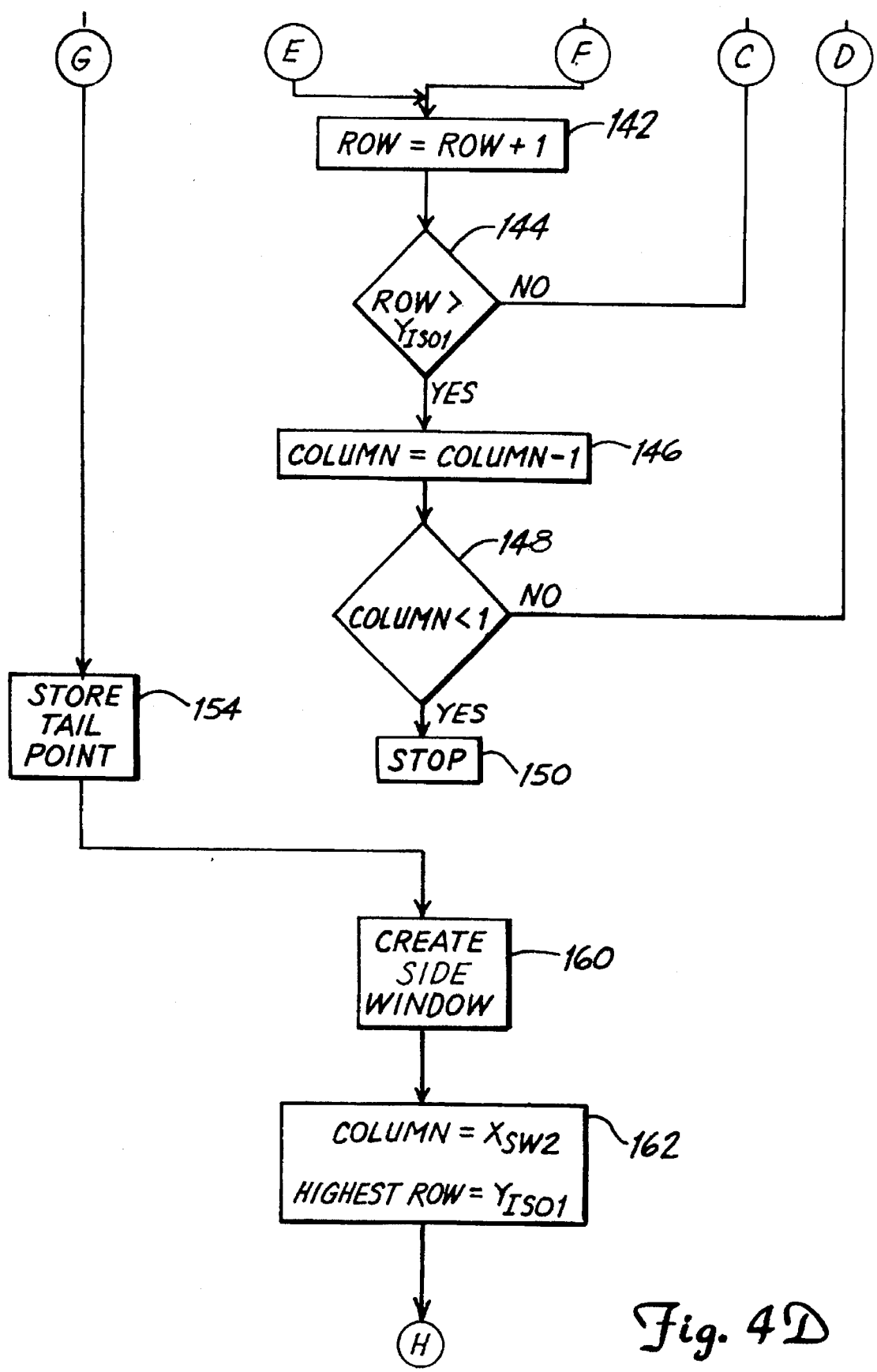

To calculate the animal's rump height, a side window, 151, shown in FIG. 2D, is defined from a portion of isolation box 131. A block, 160, in FIG. 4D represents the creation of the side window 151 from isolation box 131. The side window 151 comprises a pixel matrix having $Y_{ISO1}$ rows and $X_1$ columns wherein an upper left corner, 159, has coordinates ($X_{SW1}$, 1) and a lower right corner, 149, has coordinates ($X_{SW2}, Y_{ISO1}$) and wherein $X_1$ equals the number of successive columns or pixels between $X_{SW1}$, a left border edge, 153, and $X_{SW2}$, a right border edge, 155, to be determined below. Side window 151 has upper and lower border edges, 141, and 139 respectively, equal to that of isolation box 131.

Left border edge 153 and right border edge 155 extend forwardly on animal 14 from the rear tail point 147, 24 inches and 12 inches, respectively. The location and dimension of side window 151 have been determined from prior research which has indicated the location of the highest rear point of the animal relative to the tail point 147. Left border edge 153 and right border edge 155 each are determined from the following equation:

$$A=(B*FL1/HOD1)*HLR1*HPR1 \quad \text{Equation 1}$$

where A represents the number of successive pixels on the segregated side image representation to be subtracted from the column coordinate of the stored tail point 147 to determine the corresponding value of $X_{SW1}$ and $X_{SW2}$; B represents the actual length in inches to be converted, i.e. 12 or 24 inches; and FL1, HLR1, HPR1 and HOD1 represent system parameters described above. The quantity (B*FL1/HOD1) represents the distance in millimeters on the CCD of camera 18 that is proportional to distance B while HLR1 and HRP1 are system parameters needed to convert that proportional distance to a succession of pixels.

Figure 4E:
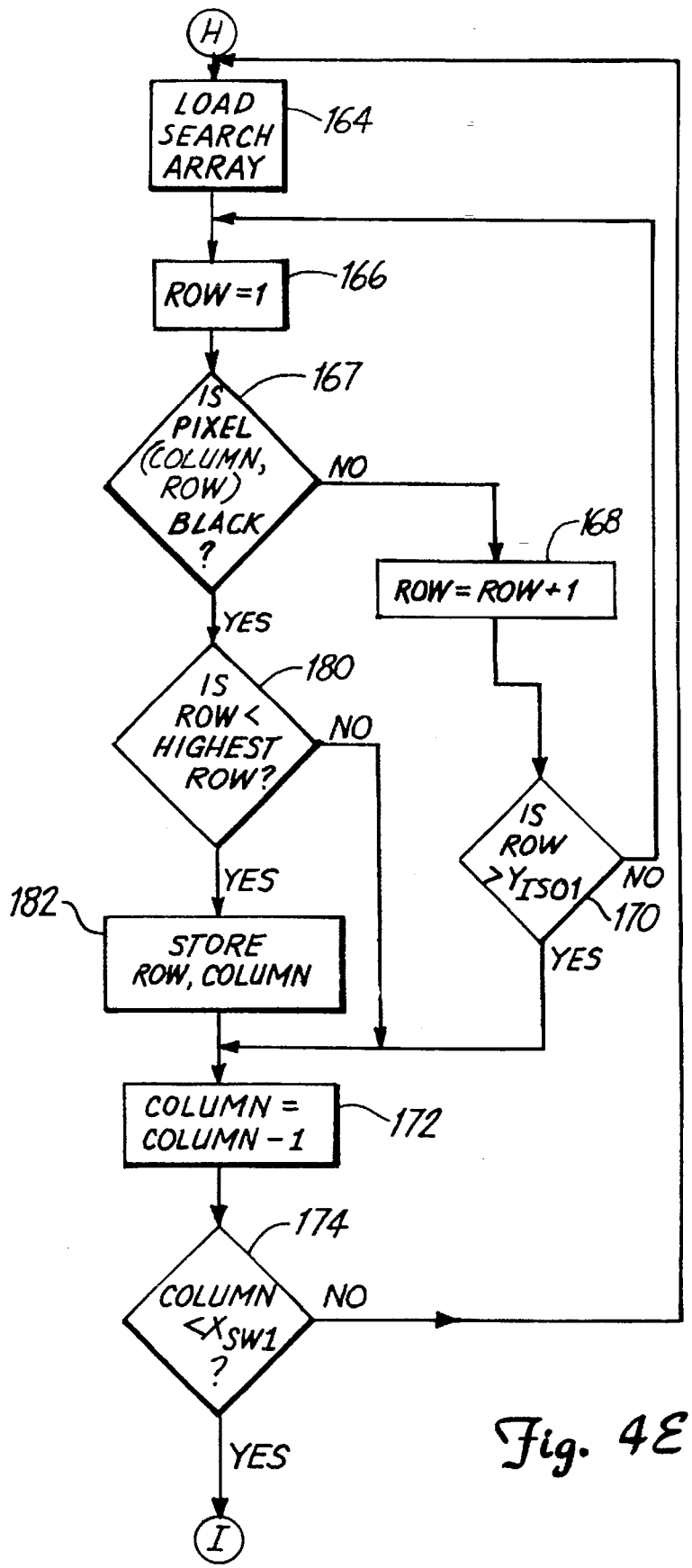

Next, referring to FIGS. 2D and 4D, a block, 162, represents initialization of a counter labeled "column" with the right most column $X_{SW2}$ of side window 151 and a variable labeled "highest row" at $Y_{ISO1}$, the lower border edge 139. Referring next to FIG. 4E, a one dimensional search array is then loaded with the gray level values of each pixel contained within the column designated by the column counter value, as represented by a block, 164.

A counter labeled "row" is then initialized at a value of one as represented by a block, 166, and the corresponding element value indexed by the row counter in the search array which also corresponds to the pixel having as coordinates (column, row) is examined for a gray level value equal to zero which denotes the occurrence of a black pixel. A decision diamond, 167, represents examination of the pixel and if this pixel is not black, the row counter value is incremented by one as represented by a block, 168. Provided that the row counter value does not exceed $Y_{ISO1}$, the row corresponding to the lower border edge 139, as represented by a decision diamond, 170, procedural control is returned to block 166 with continued searching progression through the search array corresponding to the current column of pixels.

If, however, the row counter value exceeds the lower border edge 139, as denoted by a row counter value greater than $Y_{ISO1}$, the column counter value is decremented by one as represented by a block, 172. If the column counter value does not obtain a value less than $X_{SW1}$, representing left border edge 153, as represented by a decision diamond, 174, procedural control is returned to block 164 where the search array is then loaded with the gray level values of the next column to be searched.

As described above, the step of detecting a black pixel within a given column is represented by decision diamond 167. Upon detection of a black pixel, the corresponding row coordinate for that pixel is compared with the value stored in the variable highest row. If the row counter value is less than the value stored in the highest row variable, signifying that the present black pixel is higher than any previous black pixel so far encountered, as represented by a decision diamond, 180, the coordinates (column, row) for the current pixel are stored in memory wherein the row counter value is also stored as the highest row variable, as represented by a block, 182. The column counter value is then again decremented by one in block 172 with its value compared to $X_{SW1}$, representing the left border edge 153, in decision diamond 174. When the column counter value is less than $X_{SW1}$, indicating that each column of window 151 has been searched, then the stored coordinates (column, row) correspond to the highest point, 157, on animal 14 shown in FIG. 2E and as represented by block, 184, in FIG. 4F.

The coordinates of the highest point 157, which corresponds to the rump height point, serve as input to a block, 186. Block 186 represents calculation of the "rump height" and "tail-rump height" distances of animal 14. The rump height distance, herein also referred as "RH", is the distance in inches of the rump height point 157 of the animal from the ground and is determined from the following equation:

$$RH=VOD1+C \quad \text{Equation 2}$$

where VOD1 represents the vertical offset distance described above which also corresponds to the center row 99 illustrated in FIG. 2B, and C represents the length in inches between VOD1 and the actual rump height of the animal; and where C is determined from the following equation:

$$C=(D/VLR1/VPR1)*(HOD1/FL1) \quad \text{Equation 3}$$

where D represents the number of successive vertical pixels on the segregated side image representation between the center row of pixels and the row coordinate of the stored rump height point 157, D being positive if the row coordinate of the stored rump height point is above the center row 99 of pixels illustrated in FIG. 2B and negative if the row coordinate of the stored rump height point 157 is below the center row 99 of pixels. VPR1, VLR1, FL1 and HOD1 represent system parameters described above. The quantity (D/VLR1/VPR1) represents the distance in millimeters on the CCD of camera 18 that is proportional to the succession of pixels denoted by D while the quantity (HOD1/FL1) is used to convert that proportional distance to a corresponding distance in inches.

The tail-rump height distance, herein also referred as "TR", is the corresponding horizontal distance in inches between the column coordinate of the tail point 147 and the column coordinate of the rump height point 157 on the segregated side image representation and is determined from the following equation:

$$TR=(E/HLR1/HPR1)*(HOD1/FL1) \quad \text{Equation 4}$$

where E represents the number of successive horizontal pixels on the segregated side image representation between the column coordinate of the tail point 147 and the column coordinate of the rump height point 157. HPR1, HLR1, FL1 and HOD1 represent system parameters described above. The quantity (E/HLR1/HPR1) represents the distance in millimeters on the CCD of camera 18 that is proportional to the succession of pixels denoted by E while the quantity (HOD1/FL1) is used to convert that proportional distance to a corresponding distance in inches.

Physical measurements obtained from the top image representations are calculated from the procedure shown in FIG. 4F beginning with a block, 188. Block 188 represents the step of constructing from the first top image representation, a top image segregation representation that segregates portions of the first top image representation into a portion that corresponds to at least a part of the image of the animal's main body 64 illustrated in the reconstructed image of FIG. 3A from portions that correspond to a top image remainder portion that does not include that image part of the animal's main body 64. In the preferred embodiment, the step of constructing includes comparing the gray level value stored within each corresponding byte for each pixel of the first top image representation with the corresponding value stored within each corresponding byte for each corresponding pixel of the second top image representation. Under this processing operation, if the gray level values for a given pixel are substantially the same, as determined by a resultant value between a predetermined range of possible values, the corresponding pixel of the first top image representation is determined to be part of the remainder portion and assigned a gray level value corresponding to white in the top image segregation representation. If, however, the gray level values of a given pixel are substantially different, as determined by a resultant value exceeding the predetermined range of possible values, the corresponding pixel is considered to be part of animal portion 14 and assigned a gray level value corresponding to black in the top image segregation representation.

As stated above with reference to processing of the side image representations, alternative image processing techniques to segregate the top image animal portion from the remainder image portion are herein included.

Figure 3C:
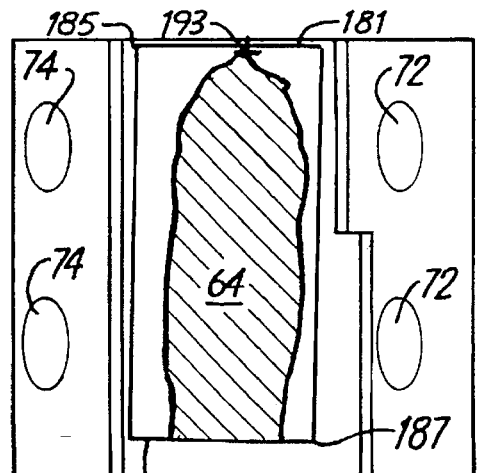

Next, as represented by a decision diamond, 190, if this is the first animal for a successive run of animals through the evaluation system, the operator at processing and analysis station 22 then superimposes, as represented by a block, 192, an isolation box 181, illustrated in reconstructed image of FIG. 3C, to isolate the top portion 64 of the animal. Like isolation box 131 of FIG. 2C, utilization of isolation box 181 increases the efficiency of system 10 by reducing the computational operations necessary to obtain physical measurements of animal 14 in that all further processing upon the segregated top image representations is confined within isolation box 181. Isolation box 181 is also used by the processing and analysis station 22 in successive runs of animals through the chute 12 thereby eliminating further operator interaction with successive top image representations. As such, isolation box 181 is made sufficiently large to encompass minor variations between animals of successive runs.

FIGS. 3C through 3I illustrate the resultant binary, black (illustrated with hatching) or white, segregated image representation contained within isolation box 181 superimposed upon the background or second top image representation of FIG. 3B but excluding the vertical line 105. These Figures are provided as illustrative aids in describing the location of selected points and calculation therefrom of selected parameters from the segregated representation data that corresponds to the animal image portion. Reconstruction of these images after defining isolation box 181 is not necessary given that selected parameters are based on the corresponding stored segregated representation data.

Referring to FIG. 3C, the segregated image representation portion of isolation box 181, herein also referred as "isolation box 181", has $X_{ISO2}$ columns and $Y_{ISO2}$ rows wherein an upper left corner, 185, has pixel coordinates (1, 1) and a lower right corner, 187, has pixel coordinates ($X_{ISO2}$, $Y_{ISO2}$). Isolation box 181 is used by data processing means 43 according to the steps described below to locate selected portions of the corresponding animal image portion to determine selected parameters.

Figure 4J:
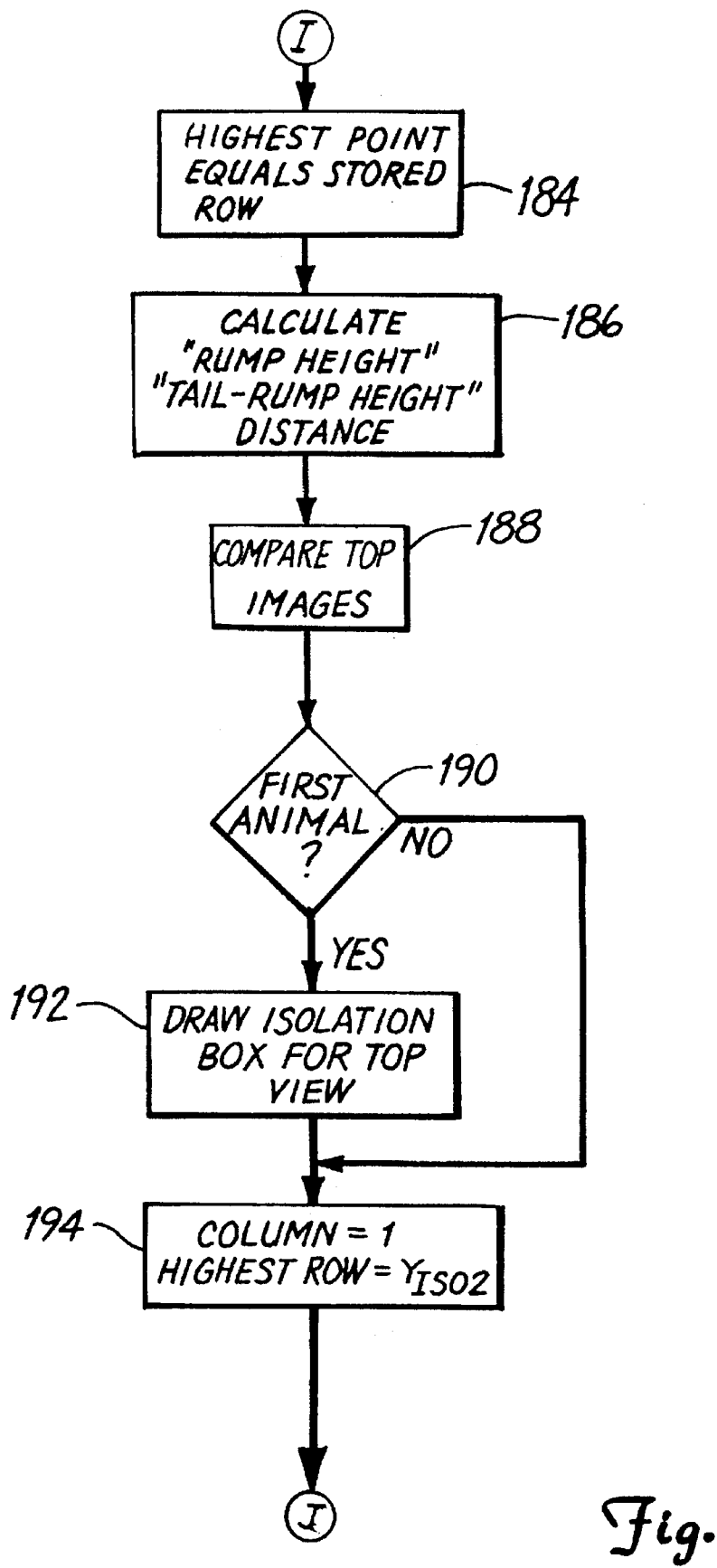
Figure 4G:
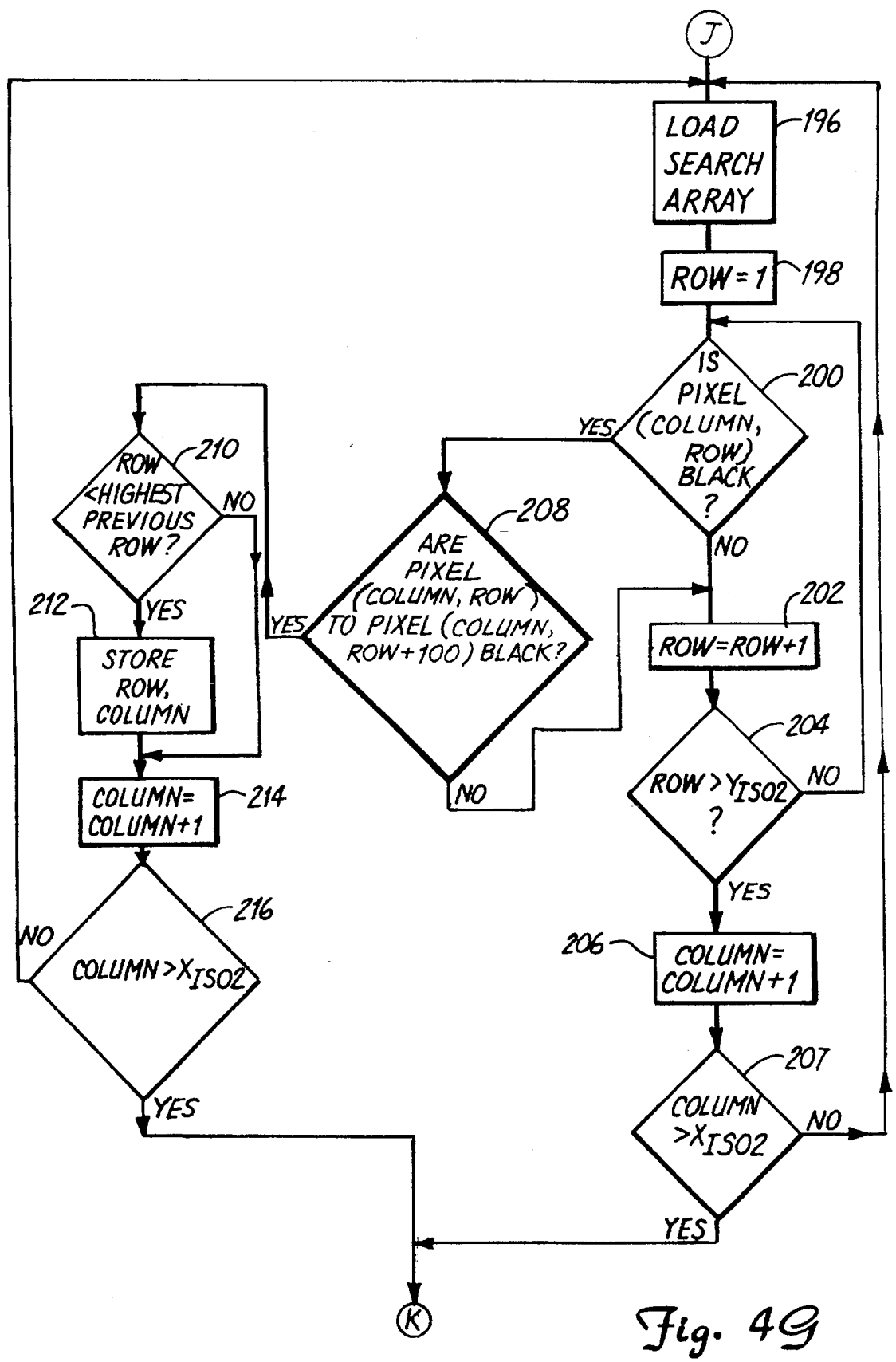

Referring back to FIG. 4F and beginning with a block, 194, a counter labeled "column" is initialized with a value of one and a variable "highest row" is initialized with a value of $Y_{ISO2}$, a row value corresponding to a lower border edge, 189, of isolation box 181. Referring to FIG. 4G, a one-dimensional search array is then loaded with the gray level values of each pixel contained within the column designated by the column counter value as represented by a block, 196.

A counter labeled "row" is then initialized at a value of one as represented by a block, 198, and the corresponding element value indexed by the row counter in the search array which also corresponds to the pixel having as coordinates (column, row) is examined for a gray level equal to zero which denotes the occurrence of a black pixel. A decision diamond, 200, represents examination of the pixel and if this pixel is not black, the row counter value is incremented by one as represented by a block, 202. Provided that the row counter value does not exceed $Y_{ISO2}$, the lower border edge 189, as represented by a decision diamond, 204, procedural control is returned to block 200 with continued searching through the one dimensional array that corresponds to the current column of pixels.

If, however, the row counter value exceeds the lower border edge 189 of isolation box 181, as signified by the row counter value greater than $Y_{ISO2}$, the column counter value is then incremented by one as represented by a block, 206. If the column counter does not obtain a value greater than a right border edge, 191, as determined from a value not exceeding $X_{ISO2}$, and as represented by a decision diamond, 207, procedural control returns to block 196 wherein the search array is loaded with the gray level values of pixels corresponding to the next column.

Downward and rightward pixel examination through isolation box 181 is continued according to the procedure described above until a black pixel as represented by decision diamond 200 has been detected. To verify that the pixel corresponds to a point on the animal image portion, the gray level values of 100 pixels immediately below the detected pixel are added together. If the sum of these gray level values does not equal zero, as represented by a decision diamond, 208, indicating that the detected pixel is not part the corresponding animal image, procedural control is returned to block 202 wherein the row counter value is incremented by one to continue searching through the array corresponding to the current column. If in the event the sum of gray level values beneath the detected black pixel does equal zero, the row counter value is compared with the value stored in the variable highest row as represented by a decision diamond, 210. If the row counter has a value less than the value of the variable highest row, the coordinates of the detected black pixel (column, row) are saved in memory with the variable highest row set at the row counter value as illustrated in a block, 212.

Upon saving the coordinates of the detected highest black pixel as represented in block 212 or, in the alternative, the detected black pixel does not have a row coordinate value less than the value stored in the variable highest row, as illustrated in decision diamond 210, the column counter value is incremented by one in a block, 214, and compared with the right border edge 191, as denoted by the value of $X_{ISO2}$, and as represented in a decision diamond, 216. Procedural control will return to block 196 if the column counter value does not exceed $X_{ISO2}$; otherwise, the coordinates stored in memory indicate the tail point, 193, as illustrated in FIG. 3C.

Figure 3D:
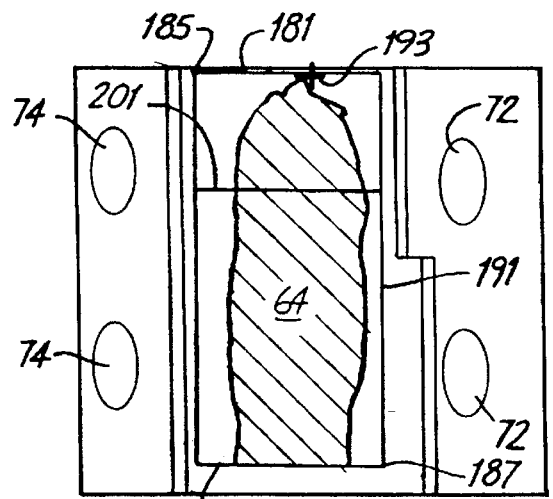

With tail point 193 located on the top image segregation representation, the "tail-rump height" distance, TR, previously calculated in block 186 is converted into the corresponding number of pixels for the top image segregation representation in order to locate a rump height row, 201, shown in FIG. 3D, that corresponds to the highest point 157 on the corresponding animal image portion illustrated in FIG. 2E. Rump height row 201 is determined from the following equation:

$$F=(TR*FL2/VOD2)*VLR2*VPR2 \qquad \text{Equation 5}$$

where F represents the number of successive pixels on the segregated top image representation to be added to the column coordinate of the stored tail point 193; TR represents the tail-rump height distance calculated according to Equation 4 above; and FL2, VLR2, VPR2 and VOD2 represent system parameters described above. The quantity (TR*FL2/VOD2) represents the distance in millimeters on the CCD of camera 20 that is proportional to distance TR while VLR2 and VPR2 are system parameters needed to convert that proportional distance to a succession of pixels.

Figure 3E:
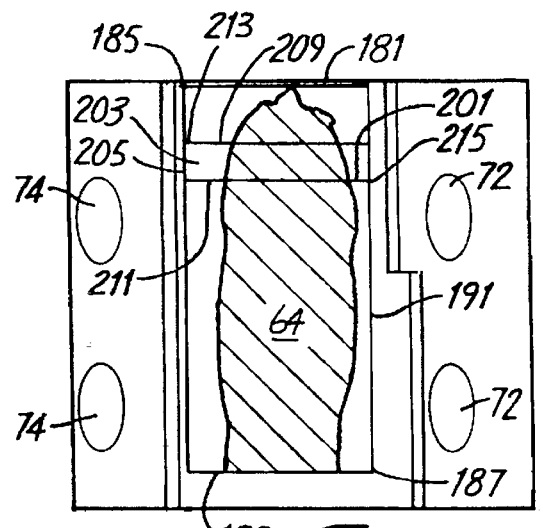
Figure 3F:
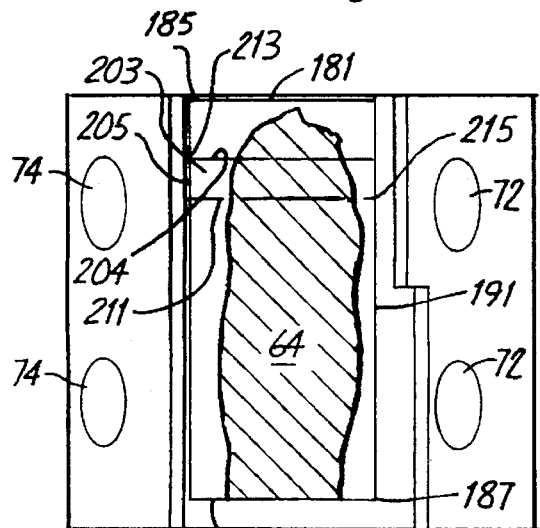

Next, a block, 222, represents the step of creating a top window, 203, as shown in FIG. 3E, from a portion of isolation box 181. Top window 203 includes a left and right border edges, 205, and 191, respectively, equal to that of isolation box 181 whereas upper and right border edges, 209, and, 211, extend rearwardly on the corresponding animal image portion from rump height row 201, three inches and nine inches, respectively. The location and dimension of top window 203 have been determined from prior research which has indicated the location of the widest point of the animal relative to the tail point 193. Upper border edge 209 and lower border edge 211 each are determined from the following equation:

$$G=(H*FL2/VOD2)*VLR2*VPR2 \qquad \text{Equation 6}$$

where G represents the number of successive pixels on the segregated top image representation to be subtracted from the value of the rump height row 201; H represents the actual length in inches to be converted, i.e. 3 or 9 inches; and FL2, VLR2, VPR2 and VOD2 represent system parameters described above. The quantity (H*FL2/VOD2) represents the distance in millimeters on the CCD of camera 20 that is proportional to distance H while VLR2 and VPR2 are system parameters needed to convert that proportional distance to a succession of pixels.

Top window 203 comprises a pixel matrix having $X_{ISO2}$ columns and $Y_{TW1}$ rows wherein $Y_{TW1}$ equals the number of successive pixels between the upper and lower border edges 209 and 211, respectively, calculated above. An upper left corner, 213, has pixel coordinates (1, upper border edge row) and a lower right corner, 215, has pixel coordinates ($X_{ISO2}$, rump height row). Each pixel row of top window 203 is then examined, as represented in FIGS. 5A and 5B to locate the pixel row corresponding to the animal's greatest rump width, herein also referred as "RW".

Figure 5A:
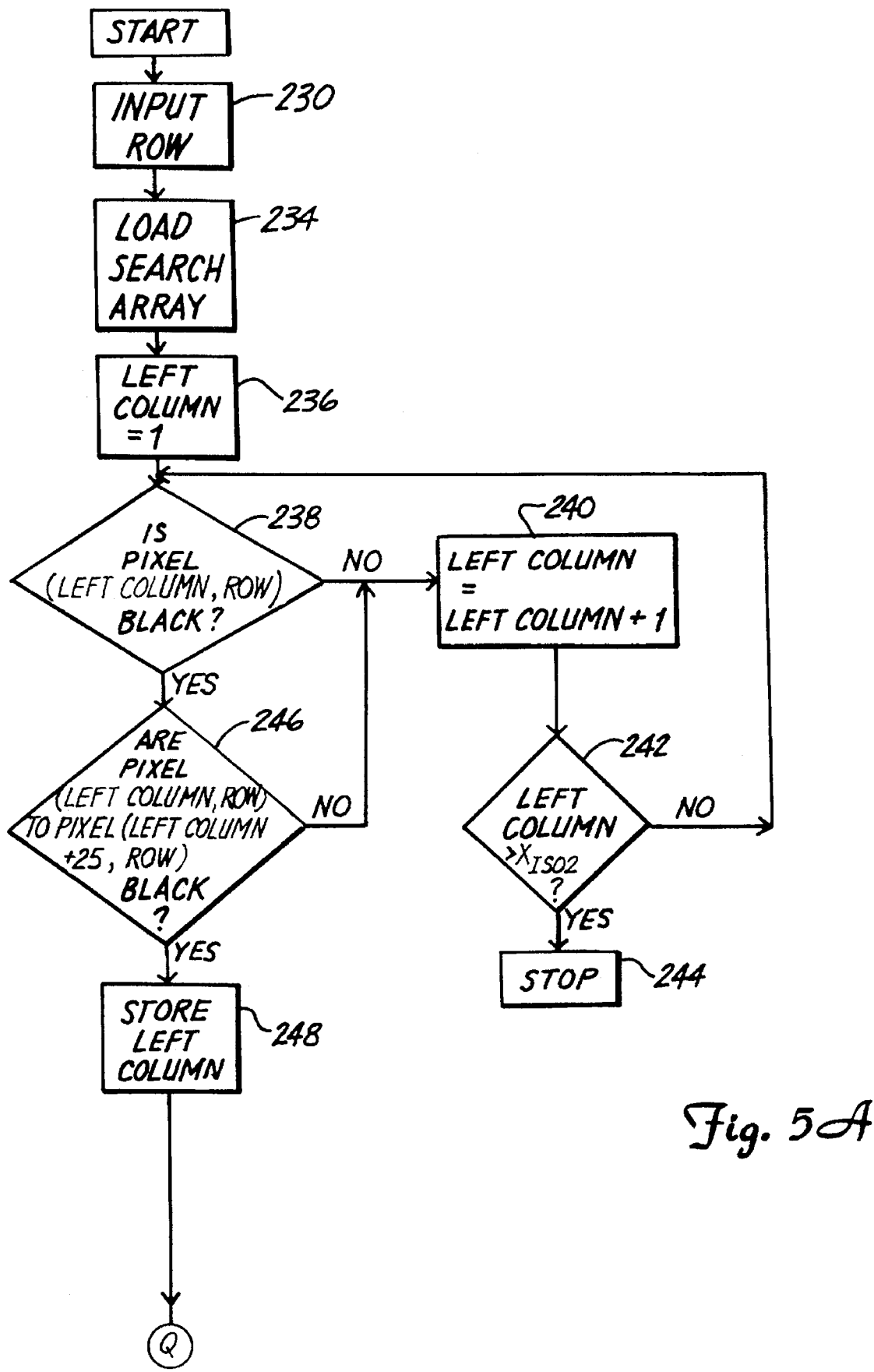
Figure 5B:
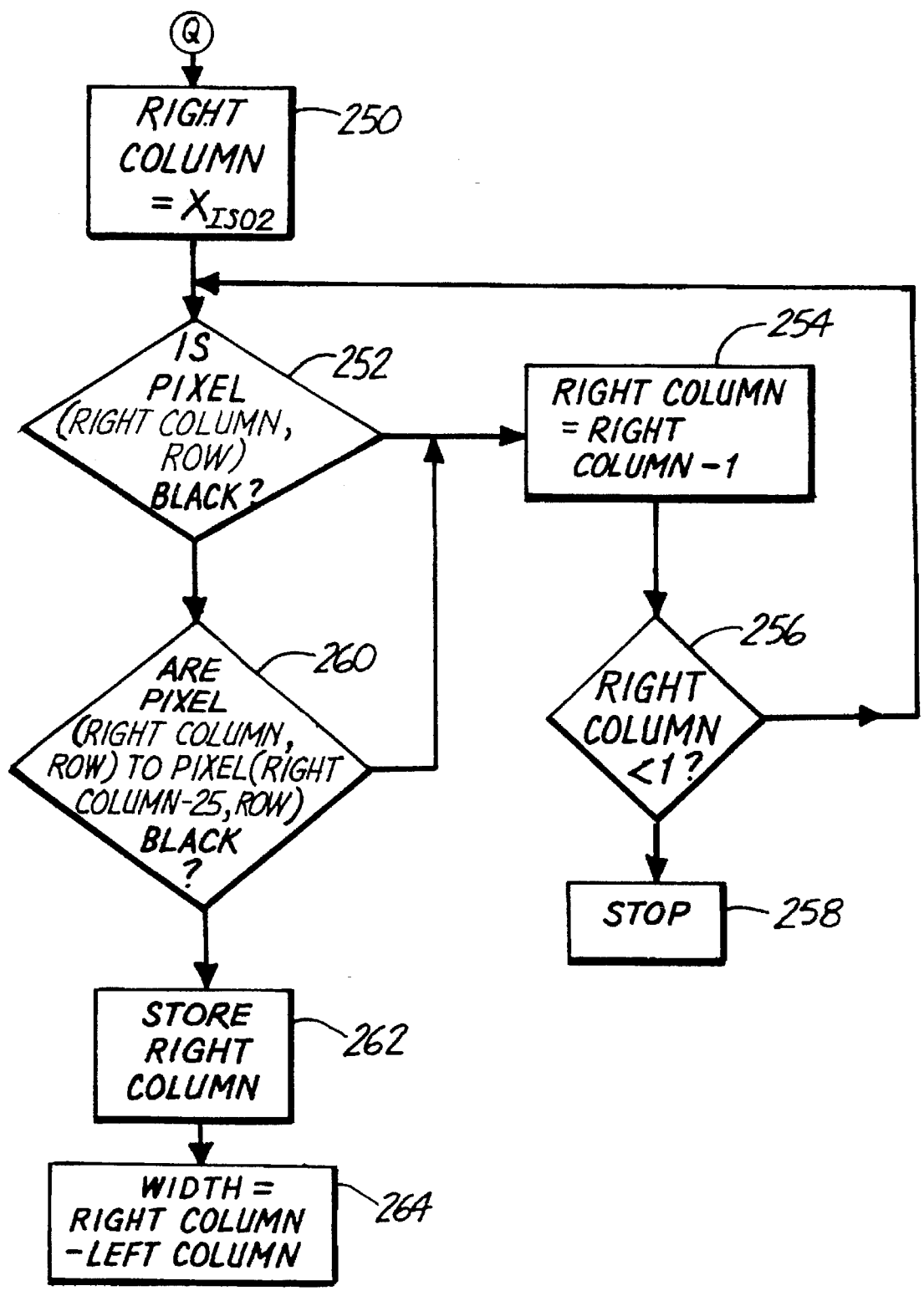

Referring to FIG. 5A, a block, 230, represents initialization of a counter "row" with the corresponding row to be searched. A one dimensional search array is then loaded with the gray level values of each pixel contained within the row designated by the row counter value as represented by a block, 234.

A counter "left column" is then initialized at a value of one as represented by a block, 236, and the corresponding element value indexed by the left column counter which also corresponds to the pixel (left column, row) is examined for a gray level value equal to zero which denotes the occurrence of a black pixel. A decision diamond, 238, represents examination of the pixel and if this pixel is not black, the left column counter value is incremented by one as represented by a block, 240. Provided that the left column counter value does not exceed $X_{ISO2}$, the right border edge 191, as represented by a decision diamond, 242, procedural control is returned to block 238 with continued searching progression through the one dimensional array corresponding to the current row. If, however, the left column counter value exceeds the right border edge 191, as signified by the left column counter value greater than $X_{ISO2}$, searching is stopped at a block, 244, and an appropriate warning or indication is initiated by processing and analysis station 22.

Rightward pixel examination through the one dimensional array corresponding to the current row is continued according to the procedure described above until a black pixel, as represented by decision diamond 238, has been detected. To verify that the pixel corresponds to a point on the left edge of the animal image portion, the gray level values of 25 pixels immediately to the right of the detected pixel are added together as represented by a decision diamond, 246. If the sum of these gray level values does not equal zero, indicating that the detected pixel is not part of the left edge of the animal image portion, procedural control is returned to block 240 wherein the left column counter value is incremented by one to continue searching through the one dimensional array corresponding to rightward progression through the current row. If in the event the sum of gray level values to the right of the detected pixel does equal zero, the left column counter value is stored in memory as represented by a block, 248.

Referring to FIG. 5B, the right edge of the animal image portion is located with a similar procedure. A counter "right column" is initialized at a value of $X_{ISO2}$ as represented by a block, 250, and the corresponding element value indexed by the right column counter which also corresponds to the pixel having as coordinates (right column, row) is examined for a gray level equal to zero which denotes the occurrence of a black pixel. A decision diamond, 252, represents examination of the pixel and if this pixel is not black, the right column counter value is decremented by one as represented by a block, 254. Provided that the right column counter value is not less than 1, the left border edge 205, as represented by a decision diamond, 256, procedural control is returned to decision diamond 252 with continued searching through the one dimensional array corresponding to leftward progression through the current row of pixels. If, however, the right column counter value is left of the left border edge 205, as signified by the right column counter value less than one, searching is stopped at a block, 258, and an appropriate warning or indication is initiated by processing and analysis station 22.

Leftward pixel examination through the current row is continued according to the procedure described above until a black pixel as represented by decision diamond 252 has been detected. To verify that the pixel corresponds to the right edge of the animal image portion, the gray level values of 25 pixels immediately to the left of the detected pixel are added together as represented by a decision diamond, 260. If the sum of these gray level values does not equal zero, indicating that the detected pixel is not part of the right edge of the animal, procedural control is returned to block 254 wherein the right column counter value is decremented by one to continue searching through the one dimensional array corresponding to leftward progression through the current row of pixels. If in the event the sum of gray level values to the left of the detected pixel does equal zero, the right column counter value is stored in memory as represented by a block, 262. The width of the animal at this particular row is calculated by subtracting the stored left column counter value from the stored right column counter value as represented by a block, 264.

Using the procedure illustrated in FIGS. 5A and 5B and described above, the width of the animal is calculated for each row of the top window 203. The greatest width, is determined to be the "rump width", herein also referred as "RW", as represented by a block, 280, in FIG. 4H. A block, 282, then represents determination of a corresponding value in inches using the following equation:

$$RW=(I/HPR2/HLR2)*(VOD2/FL2) \qquad \text{Equation 7}$$

where I represents the number of successive horizontal pixels comprising the rump width. HPR2, HLR2, FL2 and VOD2 represent system parameters described above. The quantity (I/HPR2/HLR2) represents the distance in millimeters on the CCD of camera 20 that is proportional to the succession of pixels denoted by I while the quantity (VOD2/FL2) is used to convert that proportional distance to a corresponding distance in inches.

It should be noted that when a particular muscle is indicated as a site for recording of muscle width such as rump width and other muscle widths to be located below, it is done for the purpose of denoting an anatomical area of interest and not for the purpose of measurement of one particular muscle. Research has indicated that when the musculoskeletal development of an animal, such as cattle, is used for an indication of specific traits or performance characteristics, which are influenced by the animal's hormonal activity, it is better to group muscle systems into anatomical regions rather than consider individual muscle systems in the region of interest because the musculoskeletal development of an anatomical area of interest is a superior indicator of hormonal activity within the animal.

Figure 3G:
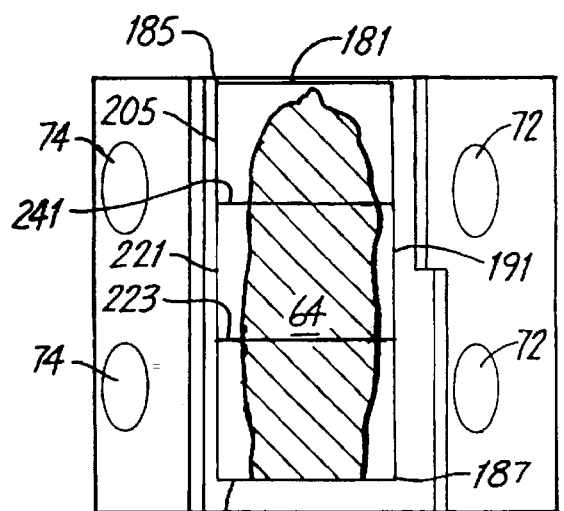
Figure 4H:
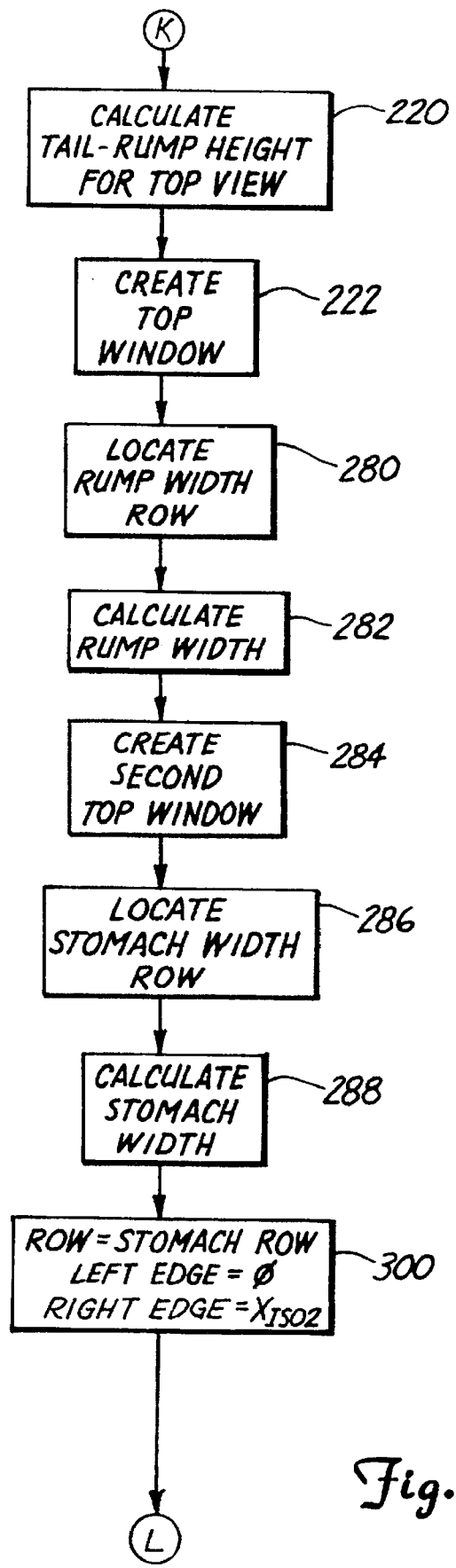
Figure 4J:
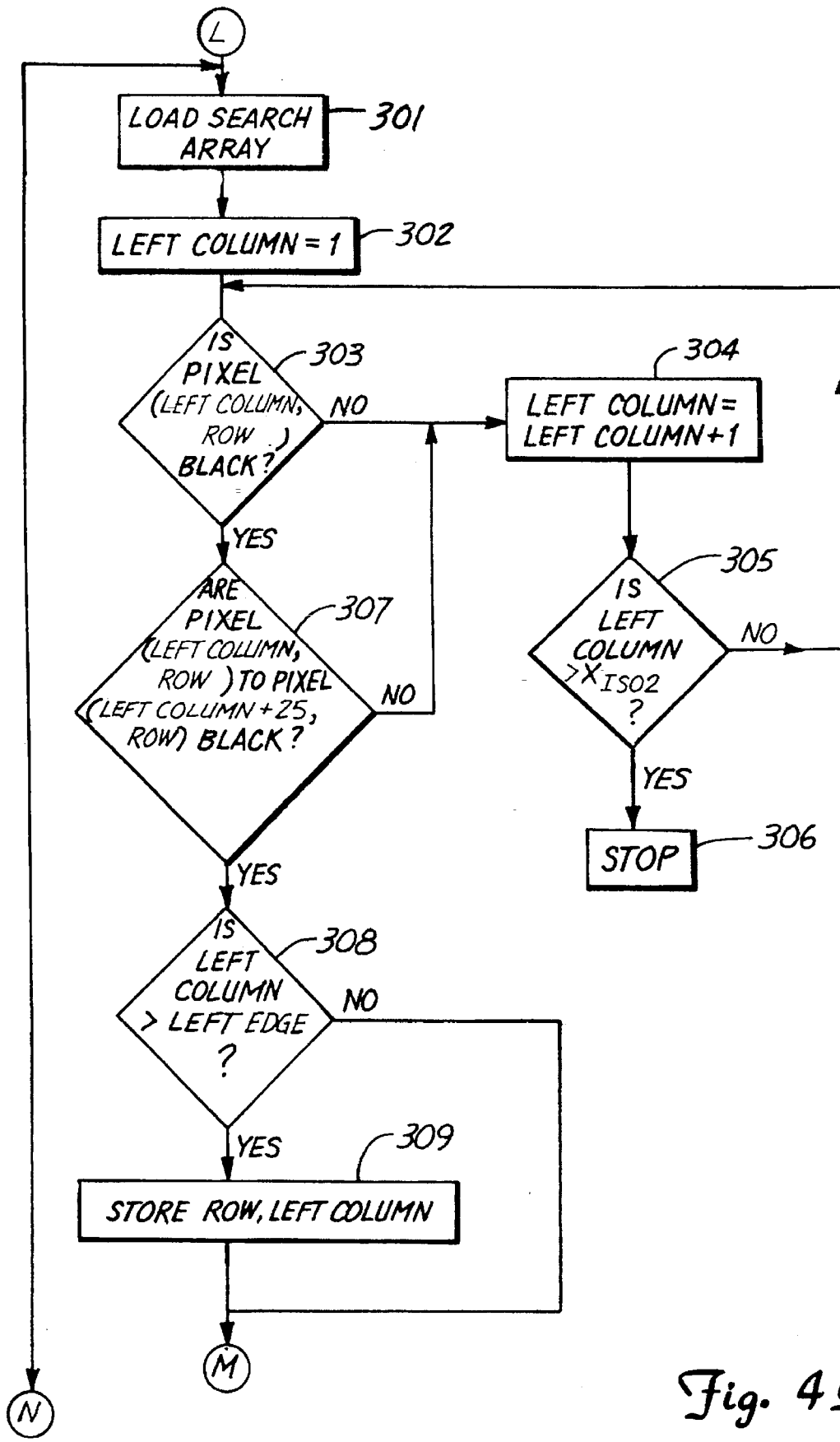
Figure 4J:
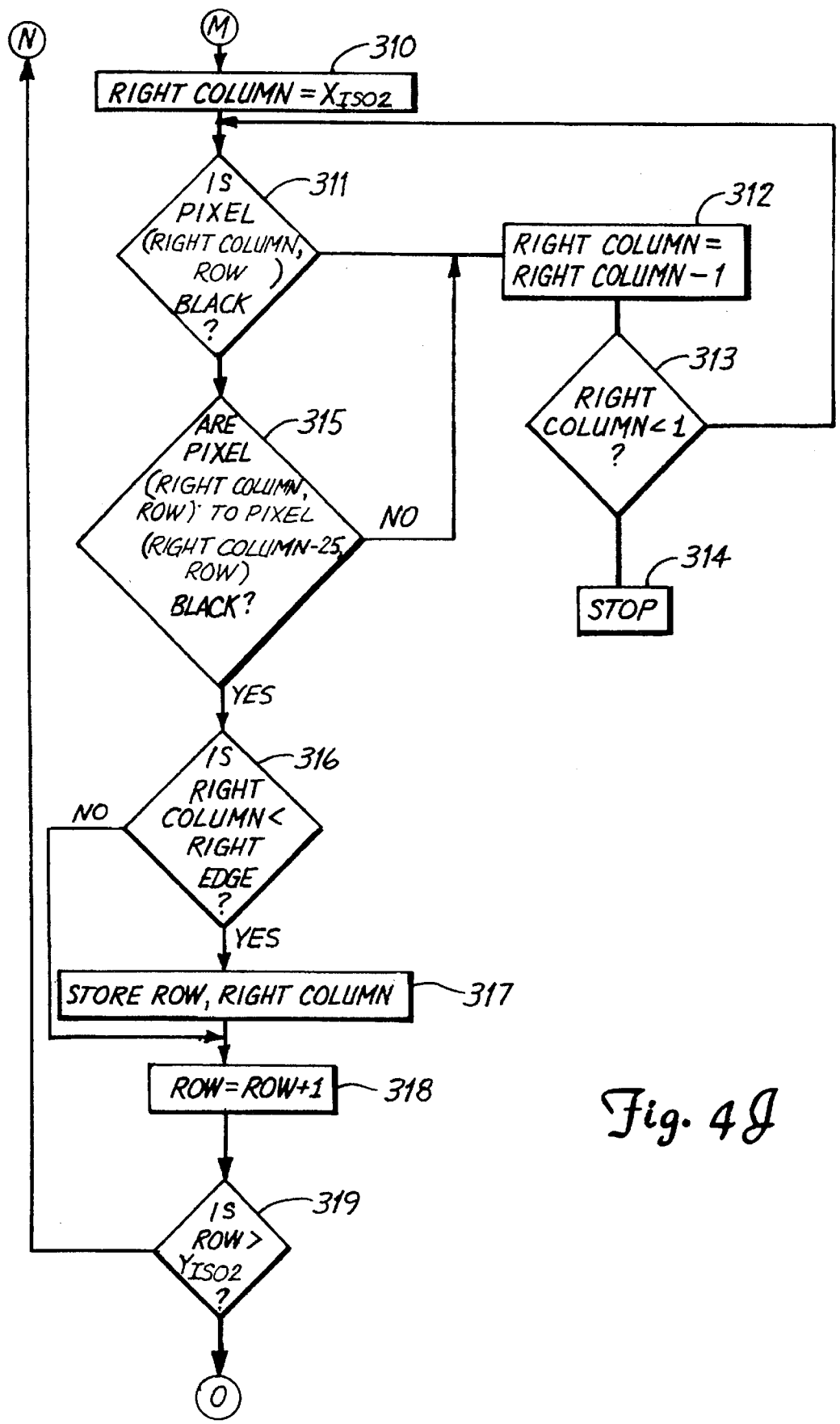

Referring to FIG. 3G, a second top window, 221, is then defined from a portion of isolation box 181 as represented by a block, 284, in FIG. 4H. Second top window 221 comprises a pixel matrix having $X_{ISO2}$ columns and $Y_{TW2}$ rows wherein $Y_{TW2}$ equals the number of pixels between rump height row 201 and lower border edge 189. An upper left corner, 241, has pixel coordinates (1, rump height row) and the lower right corner 187 has coordinates ($X_{ISO2}$, $Y_{ISO2}$).

Referring to FIG. 4H, a block, 286, represents examination of each row of second top window 221 according to the procedure described above and illustrated in FIGS. 5A and 5B to locate the row having the greatest width which is determined to be the animal's "stomach width", herein also referred as "STW". A block, 288, represents conversion of the stomach width to inches as determined from the following equation:

$$STW = (J/HPR2/HLR2) * (VOD2/FL2) \quad \text{Equation 8}$$

where J represents the number of successive horizontal pixels comprising the stomach width. HPR2, HLR2, FL2 and VOD2 represent system parameters described above. The quantity (J/HPR2/HLR2) represents the distance in millimeters on the CCD of camera 20 that is proportional to the succession of pixels denoted by J while the quantity (VOD2/FL2) is used to convert that proportional distance to a corresponding distance in inches.

Once a stomach row, 223, illustrated in FIG. 3G, has been located within the second top window 221, the narrowest portion of the animal between stomach row 223 and the lower border edge 189 is then located. This reference location is called the "indent row" and indicates the start of the shoulder region of the animal.

A block, 300, illustrated in Figure 4H represents initialization of a counter "row" with the value corresponding to the stomach row 223, located above; variable "left edge" with a value of zero which represents left border edge 205; and variable "right edge" with $X_{ISO2}$ which represents right border edge 191. Referring next to FIG. 4I, a one dimensional search array is then loaded with the gray level values of each pixel contained within the row designated by the row counter value as represented by a block, 301.

A counter "left column" is then initialized at a value of one as represented by a block, 302, and the corresponding element value indexed by the left column counter in the search array which also corresponds to the pixel (left column, row) is examined for a gray level value equal to zero which denotes the occurrence of a black pixel. A decision diamond, 303, represents examination of the pixel and if this pixel is not black, the left counter value is incremented by one as represented by a block, 304. Provided that the left counter value does not exceed $X_{ISO2}$, the right border edge 191, as represented by a decision diamond, 305, procedural control is returned to decision diamond 303 with continued searching progression through the one dimensional array corresponding to rightward progression through the current row of pixels. If, however, the left column counter value exceeds the right border 191, as signified by the left column counter value greater than $X_{ISO2}$, searching is stopped at a block, 306, and an appropriate warning or indication is initiated by processing and analysis station 22.

Rightward pixel examination through the current row is continued according to the procedure described above until a black pixel as represented by decision diamond 303 has been detected. To verify that the pixel corresponds to the left edge of the animal image portion, the gray level values of 25 pixels immediately to the right of the detected pixel are added together as represented by a decision diamond, 307. If the sum of these gray level values does not equal zero, indicating that the detected pixel is not part of the left edge of the animal, procedural control is returned to block 304 wherein the left column counter value is incremented by one to continue searching through the one dimensional array corresponding to rightward progression through the current row of pixels. If in the event the sum of gray level values to the right of the detected pixel does equal zero, the left column counter value is compared to the value stored in the left edge variable as represented by a block, 308. If the left column counter value exceeds the value stored in the left edge variable, indicating that the current pixel is to the right of any previously detected left edge pixel, a block, 309, represents storing the coordinates of the current pixel wherein the left edge variable value is also set to the value of left column counter.

Next, location of the right edge pixel is determined. Referring to FIG. 4J, a counter "right column" is initialized at a value of $X_{ISO2}$ as represented by a block, 310, and the corresponding element value indexed by the right column counter in the search array which corresponds to the pixel (right column, row) is examined for a gray level value equal to zero which denotes the occurrence of a black pixel. A decision diamond, 311, represents examination of the pixel and if this pixel is not black, the right counter value is decremented by one as represented by a block, 312. Provided that the right counter value is not less than 1, or left of the left border edge 205, as represented by a decision diamond, 313, procedural control is returned to decision diamond 311 with continued searching through the one dimensional array corresponding to leftward progression through the current row of pixels. If, however, the right column counter value is left of the left border edge 205, as signified by the right column counter value less than 1, searching is stopped at a block, 314, and an appropriate warning or indication is initiated by processing and analysis station 22.

Leftward pixel examination through the current row is continued according to the procedure described above until a black pixel as represented by decision diamond 311 has been detected. To verify that the pixel corresponds to the right edge of the animal image portion, the gray level values of 25 pixels immediately to the left of the detected pixel are added together as represented by a decision diamond, 315. If the sum of these gray level values does not equal zero, indicating that the detected pixel is not part of the right edge of the animal image portion, procedural control is returned to block 312 wherein the right column counter value is decremented by one to continue searching through the one dimensional array corresponding to leftward progression through the current row of pixels. If in the event the sum of gray level values to the left of the detected pixel does equal zero, the right column counter value is compared to the value stored in the right edge variable as represented by a block, 316. If the right column counter value is less than the value of the right edge variable, indicating that the current pixel is to the left of any previously detected left edge pixel, a block, 317, represents storing the coordinates of the current pixel wherein the right edge variable value is set to value of the right column counter.

Figure 3H:
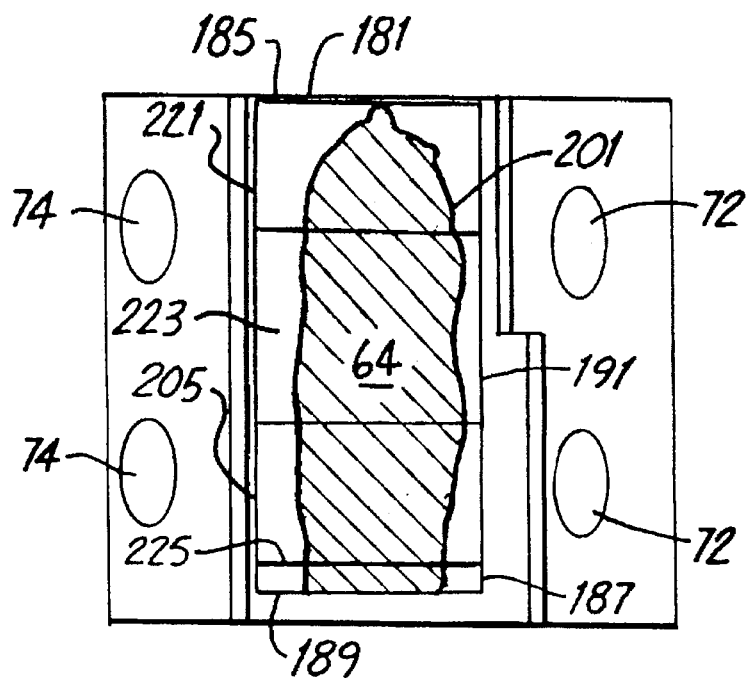
Figure 3I:
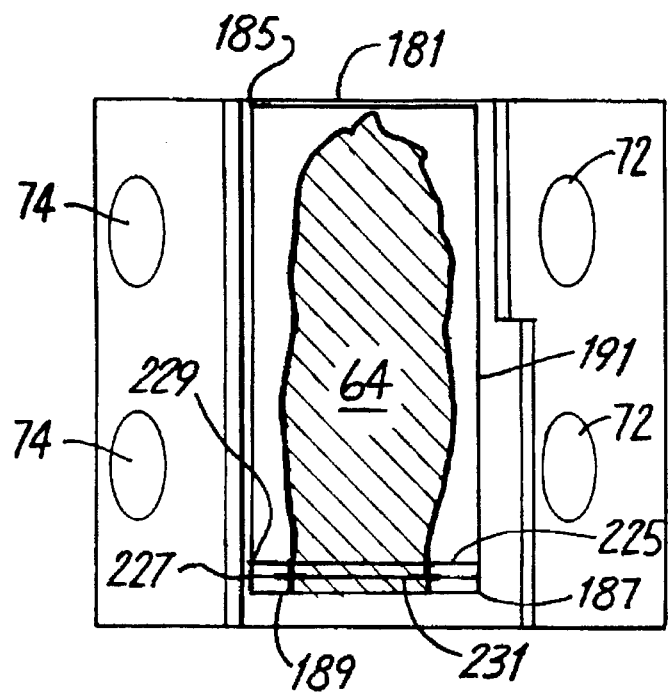

Next, the row counter value is incremented by one, as represented by a block, 318. If the row counter does not exceed $Y_{ISO2}$, the lower border edge 189, as represented by a decision diamond, 319, the remaining rows of second top window 221 are examined. If, however, the row counter value does exceed $Y_{ISO2}$, indicating that all rows have been examined, then an indent row variable is set, as represented by a block, 320 in FIG. 4K, with the corresponding row coordinate of the left or right edge stored coordinates that is farthest away from lower border edge 189. In other words, the indent row variable is set equal to the lowest row value of either the left edge variable or the right edge variable. The above described procedure compensates for situations in which the backbone of the animal is not arranged parallel to the longitudinal axis of the chute, or in other words when the animal is slightly bent in the chute. FIG. 3H illustrates location of an indent row, 225, located according to the above prescribed procedure.

The indent row 225 is used as the upper boundary edge of a third window defined from a portion of isolation box 181 that extends forwardly upon the animal to lower edge 189.

Figure 4K:
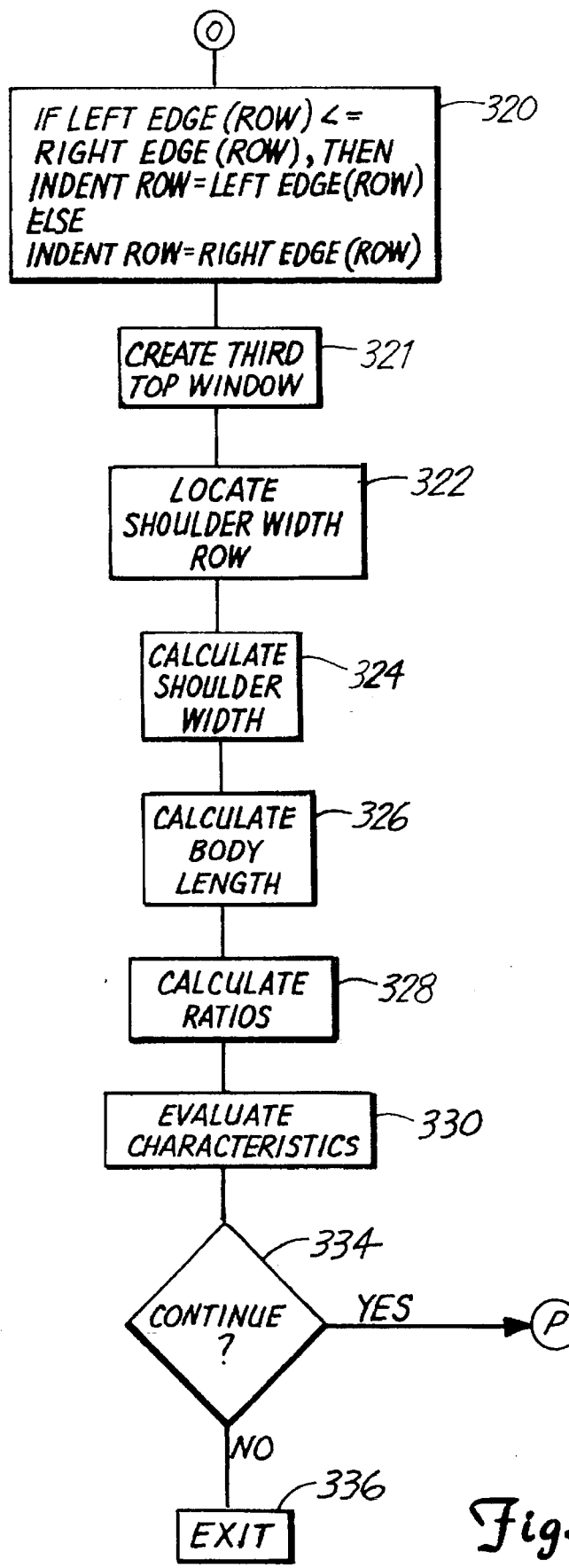

The value of the variable indent row is provided as input to a block, 321, that represents the step of creating a third top window, 227. Third top window 227 comprises a pixel matrix having $X_{ISO2}$ columns and $Y_{TW3}$ rows wherein $Y_{TW3}$ equals the number of pixels between indent row 225, located above, and lower border edge 189. An upper left corner, 229, has pixel coordinates (1, indent row) and the lower right corner 187 has pixel coordinates ($X_{ISO2}$, $Y_{ISO2}$). A block, 322, in FIG. 4K represents examination of each row of third top window 227 according to the procedure described above and illustrated in FIGS. 5A and 5B. The row corresponding to the widest portion of the animal is determined to be the "shoulder width", herein also referred as "SHW", of the animal. A block, 324, in FIG. 4K represents conversion of the shoulder width to inches as determined from the following equation:

$$SHW=(K/HPR2/HLR2)*(VOD2/FL2) \qquad \text{Equation 9}$$

where K represents the number of successive horizontal pixels comprising the shoulder width. HPR2, HLR2, FL2 and VOD2 represent system parameters described above. The quantity (K/HPR2/HLR2) represents the distance in millimeters on the CCD of camera 20 that is proportional to the succession of pixels denoted by K while the quantity (VOD2/FL2) is used to convert that proportional distance to a corresponding distance in inches.

Next, a block, 326, represents the step of calculating the animal's "body length", herein also referred as "BL". The body length is calculated by subtracting the rump height row 201 value from the shoulder width row 231 value. The body length, BL, is converted to inches with the following equation:

$$BL=(L/VPR2/VLR2)*(VOD2/FL2) \qquad \text{Equation 10}$$

where L represents the number of successive vertical pixels comprising the body length. VPR2, VLR2, FL2 and VOD2 represent system parameters described above. The quantity (L/VPR2/VLR2) represents the distance in millimeters on the CCD of camera 20 that is proportional to the succession of pixels denoted by L while the quantity (VOD2/FL2) is used to convert that proportional distance to a corresponding distance in inches.

As indicated above, there are alternative techniques to establish a satisfactory contrast between the background portion and the animal portion of images captured by cameras 18 and 20 to aid in the segregation of these image portions by data processing means 43. One such alternative, the provision of periodic spatial patterns in the background portions to aid in distinguishing them from the nonperiodic spatial patterns displayed on the skin and fur of animal 14, has the basis for its use provided in alternative chute arrangement 12' shown in FIG. 1B. There, in scanning chute 12", repeating alternations of black and white lines parallel to passageway 16' are provided in horizontal facing optical background pattern 33 and in the pattern on substantially vertically facing optical background pattern shelves 35 so that cameras 18 and 20 capture scenes leading to reconstructed images scenes like those shown in FIGS. 1E and 1F.

Such periodic spatial patterns in these background portions introduce significant spatial frequencies into optical images of these backgrounds at spatial frequencies near the pattern repetition frequency, or at least do so in those portions of these images in which these backgrounds appear. Such spatial frequencies are highly unlikely to appear in portions of these images in which animal 14 appears as seen in FIGS. 1E and 1F. Thus, an appropriate spectral decomposition of such optical images captured by cameras 18 and 20, and computer 40, will reveal large differences in spatial frequencies in image background portions versus animal 14 portions which can be used to distinguish between such kinds of portions.

Suitable spectral decompositions of optical images are known to be provided by unitary transformations of the optical image, or portions thereof, such transformations being linear transformations satisfying certain conditions. These transformations turn out to be just multidimensional coordinate rotations leaving signal energies preserved so that mean-square energy differences between images portions are equal to the mean-square energy differences between the transforms of these image portions. Thus, differences between portions of the transform of an optical image will represent differences between corresponding portions of that image so that spatial frequency differences between image transform portions will correspond to differences between the corresponding images portions.

Spectral decompositions leading to finding spatial frequencies in sampled optical images, such sampled optical images being stored in a computer memory, are typically obtained by the computer through transforming such stored sampled images using the discrete two-dimensional Fourier transform, or appropriate variants of that transform. However, since the alternating white and black bands in background 33 and the background on shelves 35 resemble a spatial square wave in the vertical direction much more closely than a spatial sine or cosine wave, a spectral decomposition based on spatial square waves rather than spatial sine waves or cosine waves can save considerable computation. Such a transform will have significant values only for that spatial square wave having a spatial square wave repetition rate equal to, or approximately equal to, that of the background bands spatial alternation rate in the background portions of the image (ignoring the zero frequency spatial square wave which is just the pixel column portion average intensity value). The alternating background stripes, or bands, spatial alternation rate is represented in the rate of alternations across the stored optical image pixels from relatively high intensity values to relatively low intensity values, and back, in the vertical columns of pixels forming the images of those bands as stored in image capture card 41. Thus, the other spatial square wave repetition rates can be ignored insofar as having any significant values in the background portions if the image.

Such a spatial square wave based spectral decomposition is provided by the Hadamard transform. This transform is based on the Hadamard matrix, represented by H, which is square and of a dimension corresponding to the size of the portion of the stored sampled optical image to be transformed. This square array has elements that have values equal to either 1 or −1 suggesting its relationship to spatial square waves, a typical array being the following having dimension eight:

Equation 11:

$$H_8 = \frac{1}{2\sqrt{2}} \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix}.$$

Since spatial frequencies are usually understood to mean spatial sine or cosine waves (many of which are needed to approximately represent a spatial square wave), the periodic frequency interpretation for this matrix has instead been termed the "sequency" thereof and is taken to be the number of algebraic sign changes along a row. This example matrix would be used to transform, into corresponding square wave spatial frequency rates, stored image column portions eight pixels long which, if written as a matrix column vector p, allows the transformation to be written as $\rho = H_8 p$ following the well known basic role for matrix multiplication.

As indicated above, the transform values will be significant only for the row in H with the sequency corresponding to the background bands vertical spatial alternation rate in the background portions of the image (and significant at zero sequency which, as indicated, is to be ignored) so that the whole of the transform for a selected optical image portion need not be computed to determine if such alternating bands are present in the optical image portion being considered. Thus, if the optical sensing arrangement is configured to result in each such background stripe or band being two pixels wide, the only rows of $H_8$ that can yield a significant transform value are the third and fourth rows thereof in both of which two low element values alternate with two high element values. The one of these rows which yields a significant transform value will depend on whether the column vector p starts representing a band at an edge or in the middle thereof, that is, these two rows represent two different phases corresponding to the same spatial alternation rate.

Consider as an example a column vector representing eight pixels in a stored column of pixels taken from entirely within a background part of an optical image stored by one of cameras 18 or 20 (FIG. 1E or 1F, respectively) in image capture card 41. Following every two pixels in that stored optical image the pixel intensity values change from relatively high to relatively low, or vice versa, as a result of the alternations between white and black background stripes or bands in the background part of the scene that is the source of the stored image. Typical pixel intensity values for a pixel column portion in this background part might be 95, 103, 45, 44, 107, 90, 40, 47 to thus provide a column vector p of Equation 12:

$$p = \begin{bmatrix} 95 \\ 103 \\ 45 \\ 44 \\ 107 \\ 90 \\ 40 \\ 47 \end{bmatrix},$$

where the higher intensity values represent relatively brighter image portions and the lower values represent relatively darker image portions. This yields Equation 13:

$$H_8 p = \begin{bmatrix} 71.375 \\ .375 \\ 27.375 \\ 1.875 \\ .375 \\ -2.125 \\ -.125 \\ -4.125 \end{bmatrix}.$$

The uppermost element in this resulting column vector is the zero frequency square wave result corresponding to the first row of $H_8$ which is ignored as being merely the column vector average intensity value. The only other element having a significant absolute value is the third element down corresponding to the third row of $H_8$, a row having elements which alternate in magnitude every two elements therealong just as the pixel column vector alternates in magnitude every two elements therealong.

Thus, the transformation written above for the appropriate pixel column vector from the background portion of the stored image can be modified if the only information of interest is whether a pixel portion from a column is in the alternating stripe or band background portion of the stored optical image, and instead be written $\rho = r_{sel} H_8 p$. Here, $r_{sel}$ is a row selection matrix formed as eight element matrix row vector having all zero value elements, except for the element having the same column position in this row vector as the row position of the row in $H_8$ to be selected which element has the value of one. In effect, $r_{sel} H_8$ forms a limited Hadamard transform matrix. For this last example, the one value would be in the third element, or column, position in the row selection matrix row vector to select the third row of $H_8$, i.e. $r_{sel-3} = [0\ 0\ 1\ 0\ 0\ 0\ 0\ 0]$. Such zero element values permit a significant reduction in computation.

Furthermore, the resulting limited transformation using this limited matrix will give low values for pixel column vectors which are not representative of background alternating bands portions of an a stored optical image. If these same pixel values are reordered to give twice the band alternation rate, $p^T$=[95 45 103 44 107 40 90 47], the limited transform value is $r_{sel-3}H_8p$=[3]. A reordering to provide one-half the band alternation rate, $p^T$=[45 44 40 47 95 103 107 90], yields $r_{sel-3}H_8p$=[3] again. If these pixel values are ordered randomly, $p^T$=[103 47 45 107 95 44 90 40], the result is $r_{sel-3}H_8p$=[7]. Thus, the value of the limited transform serves rather well as a discriminant of whether pixel column vectors from a portion of a stored optical image are from a background portion with alternating black and white horizontal stripes or from a portion representing an animal or chute structure.

There is one situation, however, in which the limited transform does not serve as well as a discriminant, that being where the pixel column vector crosses a sharp, single boundary between a relatively darker image region of a substantial extent and a relatively lighter image region also of a substantial extent for some locations of the boundary position occurrence among the elements of that vector. Such a situation could arise, for instance, in a part of a storm optical image of some portion of a Holstein cow. If, for example, $p^T$=[140 140 40 40 40 40 40 40], the limited transform corresponding to the background alternation rate gives the result $r_{sel-3}H_8p$=[200]. Such a large value could very well be taken as indicating that the pixel column vector came from an alternating stripe or band background portion of the image, an erroneous result.

As a countermeasure, a second limited transform is taken which is limited to one row of H at a sequency that corresponds to half the background bands alternation rate, i.e. using the fifth line of $H_8$. Obtaining a limited transform on this basis gives the result $r_{sel-5}H_8p$=[200] which is a value like that found for the limited transform corresponding to the background stripe alternation rate. However, as indicated above, the limited transform based on sequencies corresponding to half the background bands alternation rate is quite small in a true alternating bands background portion of a stored image thus indicating that this last pixel column vector does not come from such a background portion of the stored image. Hence, a subtraction process can be used having the limited transform based on a sequency corresponding to half the background bands alternation rate as the subtrahend, and the limited transform based on a sequency corresponding to the background alternation rate as the minuend, to thereby provide a check on whether the finding of a substantial value for the limited transform based on the sequency corresponding to the background alternation rate is due to the pixel column vector coming from a background portion of the stored image, or instead coming from elsewhere in the image. This is accomplished by noting whether the result of the subtraction process has a substantial positive value, indicating a background portion is involved, or has, instead, a small or negative value indicating that a pair of substantial light and dark areas are involved.

However, in selecting portions of pixel columns to transform for purposes of detecting the presence of transform values to determine whether the portion came from an alternating stripe or band background portion of the scene, the phasing of the pixel column vector will typically be uncertain. That is, the first pixel in such a pixel column portion taken from a background part of the scene could occur on either a black or white stripe or band from the scene, and could occur at different points in such a stripe or band. If such a pixel column portion is subjected to being transformed by a limited transform based on a sequency, i.e. a row of the Hadamard matrix being used, which does not correspond to the phase of that portion, a transform result which is much too small could result leading to an incorrect decision about where that pixel column portion was taken in the stored optical image. Such a result is avoided by obtaining limited transform values for each sequency, or phase, corresponding to each of the two background stripe alternation rates for which transform values are being found, and those transform phase results corresponding to each alternation rate are root-summed-squared together (or the absolute values of each combined) for that rate to form the above-indicated minuend and to form the above-indicated subtrahend prior to performing the foregoing subtraction process. Since only one of the sequencies, or phases, corresponding to each of the two alternation rates for which transform values are being obtained can have a substantial value for a pixel column vector from a background portion of the stored image, the above described checking process for background portion versus changeover between substantial light and dark areas will remain valid.

Turning now to the use of these bands in the actual optical arrangement in FIG. 1B, cameras 18 and 20 each, as indicated above, have a CCD light sensor which sense intensities of light in an optical image form thereon at each of the pixel locations in a 512 column by 480 row sensor array. The light intensity falling on each sensor to form an image pixel is resolved into 256 intensity levels numbered 0 to 255. The focal lengths of each of the camera lenses for cameras 18 and 20 is 6 millimeters, and these lenses are located at a distance of about 8 feet 7 inches to give a resolution of about 0.17 in. per pixel in the vertical direction in the optical field of view for camera 18 in FIG. 1B, and in the optical field of view direction perpendicular to the lengths of chute side walls 32' and 34' for camera 20 in FIG. 1B. Since the alternating black and white strips in background 33 and in the backgrounds on shelves 35 are each a half-inch wide along the vertical alternation path, there are about three pixels per stripe provided in the memory on image capture board 41 for stored optical images from either of cameras 18 or 20. This is a good choice of pixel count per stripe, as it places one pixel clearly in the middle of the stripe separated from edge effects occurring at the transition point between adjacent stripes such as some blending effects of the white and black near the common border between such adjacent stripes thus reducing the sharpness of the intensity transition at such edge locations. Asymmetries between the optical paths in these directions in the fields of view of cameras 18 and 20 and those in the directions perpendicular thereto result in a resolution of about 0.22 in. per pixel in these latter directions.

Since the movement of an animal 14 will cause its outer dimensions to continually change during such motion (dimensional changes of one-half inch to one inch being common in the case of cattle), higher resolution in the pixel array representing the image of a portion of such an animal will not produce much improvement in the accuracy of the measured result of that animal's dimensions. Resolutions around or greater than one inch per pixel would be a significant limit to the accuracy of the system, however, so that accuracy within an inch is desirable. An increase in one inch in the rump height of cattle will typically mean an increase of one-half in frame size, 50 pounds higher end weight, and will lead to three additional weeks on feed.

Because the stored image has been arranged to have three pixels provided per each of the alternating stripes in background pattern 33 and on the pattern on shelves 35 in FIG. 1B, the Hadamard transform of portions of the stored optical image to be provided in the system in connection with FIG. 1B has been chosen to be based on the Hadamard matrix of dimension 12, $H_{12}$, rather than the Hadamard matrix of dimension 8 used in the examples above. However, the same principles apply, and so only those rows of that matrix having sequencies which corresponds to the background stripe alternation rate, and those rows having sequencies corresponding to half that rate, are needed from that matrix to thereby form corresponding limited transforms based on those square wave period frequencies. Because of the use of three pixels per each of the alternating stripes in the background section, three different phases are checked for their contribution to the limited transform value corresponding to the background stripe or band alternation rate. At half that rate, only two phases which are one half cycle apart need to be checked for contributions to the limited transform corresponding to that alternation rate. As a result, the following 5 row, 12 column reduced matrix is used as a basis for the limited transforms used in detecting the background alternating stripe pattern in the system of FIG. 1B:

Equation 14:

$$r_{sel\text{-}5\,rows}H_{12} = \begin{bmatrix} 1 & 1 & 1 & 1 & 1 & 1 & -1 & -1 & -1 & -1 & -1 & -1 \\ -1 & -1 & -1 & 1 & 1 & 1 & 1 & 1 & 1 & -1 & -1 & -1 \\ 1 & 1 & 1 & -1 & -1 & -1 & 1 & 1 & 1 & -1 & -1 & -1 \\ 1 & 1 & -1 & -1 & -1 & 1 & 1 & 1 & -1 & -1 & -1 & 1 \\ 1 & -1 & -1 & -1 & 1 & 1 & 1 & -1 & -1 & -1 & 1 & 1 \end{bmatrix}$$

This partial Hadamard matrix is not, however, the one actually used in connection with the system of FIG. 1B as this result can be further modified to eliminate another possible source of error in the stored optical image. Cameras 18 and 20 both capture images of the scene occurring on the CCD sensor therein by sensing the light intensity on the sensors of those arrays on an "interlaced" basis, that is, by first extracting the data from all of either the even or odd rows of sensors in the CCD array and thereafter obtaining the data from the remaining rows of sensors. Since cameras 18 and 20 acquire the light intensity from a scene falling on the CCD array devices therein in approximately twenty to thirty milliseconds, there is a possibility of some movement of an animal being viewed by the camera during the time the first set of sensor row data is acquired and the subsequent time the second set of sensor row data is acquired. As a result, a pixel column vector can effectively have an erroneous spatial periodic frequency introduced therein such that every other pixel, obtained at the first acquisition of sensor row data, is at a somewhat different intensity due to animal movement from that of the adjacent pixels acquired during the second acquisition of sensor row data some milliseconds later. This series of row sensor data suffers alternating intensity effects in the animal image portions of the rows due to the animal's movement, and so the cumulatively forming column vectors with these effects are primarily located in an animal portion of the stored optical image.

Thus, a pixel column vector taken from an animal portion of the stored optical image that was captured during the time that the animal in the scene was moving may, for example, be $p^T = [80\ 100\ 80\ 100\ 80\ 100\ 80\ 100\ 80\ 100\ 80\ 100]$. This kind of periodic change frequency due to successive interlaced acquisitions of light intensity data from a scene occurring on the camera CCD array can be removed by substituting a zero in each three of the relatively same value elements that occur for each of the background stripe alternation rate phase rows in the partial Hadamard matrix just set out to provide the following matrix used in the operation of the system of FIG. 1B:

Equation 15:

$$r_{sel\text{-}5\,rows}H_{12\text{-}mod} = \begin{bmatrix} 1 & 1 & 1 & 1 & 1 & 1 & -1 & -1 & -1 & -1 & -1 & -1 \\ -1 & -1 & -1 & 1 & 1 & 1 & 1 & 1 & 1 & -1 & -1 & -1 \\ 1 & 1 & 0 & -1 & -1 & 0 & 1 & 1 & 0 & -1 & -1 & 0 \\ 1 & 0 & -1 & -1 & 0 & 1 & 1 & 0 & -1 & -1 & 0 & 1 \\ 0 & -1 & -1 & 0 & 1 & 1 & 0 & -1 & -1 & 0 & 1 & 1 \\ -1 & -1 & -1 & 1 & 1 & 1 & 1 & 1 & 1 & -1 & -1 & -1 \end{bmatrix}.$$

This matrix assures that successive pairs of values in the preceding pixel column vector cancel to thereby eliminate this interlace periodic frequency from affecting the limited transform values in the animal portion of a stored optical image due to any movement thereof. In other situations such as no movement of the animal or transforms of pixel columns obtained in a portion of the image representation due to the stationary background, this matrix has the effect of merely reducing the magnitude of the limited transform values at the background stripe alternation rate. Because of the pairing of successive values being sufficient to substantially eliminate this interlace-scene item motion effect, the use of an even number of pixels per background stripe can be seen to also be effective to substantially eliminate the effect. A further alternative would be to find the transform value at the interlace frquency and subtract that value from the transform value at the background stripe alternation rate.

Some representative pixel column vectors from a stored optical image that was captured in image capture card 41 provide the basis of an example of the principles described above using the Hadamard dimension 8 matrix. Here, though, instead of using the Hadamard dimension 8 matrix, the modified Hadamard matrix of dimension 12, $H_{12\text{-}mod}$, is used. The column vectors chosen are parts of pixel columns in the stored optical image that occur near the boundary between an animal portion of the image and the background portion of the image. These column vectors were chosen to each contain 12 elements with values equal to the pixel light intensity values for pixels that in these columns have Y coordinate values 268 through 279. The first pixel column vector has the pixel light intensity values therein for pixels having a X coordinate of 272, or $p^T_{X=272} = [48\ 46\ 43\ 44\ 44\ 42\ 41\ 46\ 41\ 43\ 45\ 44]$, and this pixel column vector is contained entirely within the animal portion of the stored optical image. That is, this pixel column vector is located entirely on the animal side of the border separating the animal image portion from the background image portion in the stored optical image.

The next pixel column vector is taken at X coordinate 274, $p^T_{X=274} = [48\ 98\ 46\ 62\ 45\ 45\ 44\ 95\ 44\ 61\ 43\ 46]$, and straddles the border between the animal portion of the stored optical image and the background portion so as to be mostly pixel values from the animal image portion of the stored optical image but not all. The following pixel column vector also straddles the border but is mostly in the background alternating stripe pattern portion of the image at X coordinate 276, $p^T_{X=276} = [74\ 125\ 85\ 72\ 42\ 46\ 74\ 132\ 85\ 73\ 42\ 47]$. The last pixel column vector is entirely in the background portion of the image on the background alternating stripe side of the border between the animal portion of the image and the background portion at X coordinate 278, $p^T_{X=278} = [97\ 125\ 113\ 74\ 34\ 43\ 84\ 124\ 119\ 73\ 50\ 38]$. Although not taken as values from an actual stored optical image as the preceding pixel column vectors are, a further pixel column vector is provided as an example having a single transition between substantial extent light and dark intensity regions in the stored optical image as $p^T_{trans} = [40\ 40\ 40\ 40\ 140\ 140\ 140\ 140\ 140\ 140\ 140\ 140]$.

Applying the modified Hadamard transform of dimension 12 to these pixel column vectors gives the following results:

Equation 16:

$$r_{sel-5\ rows}H_{12\text{-}mod}PX=272 = \begin{bmatrix} 7 \\ -11 \\ 5 \\ 4 \\ -1 \end{bmatrix}$$

$_{BAR/2\text{-}eff} = 18$
$_{BAR\text{-}eff} = 10$
$_{BAR\text{-}eff} - {}_{BAR/2\text{-}eff} = -8$ Equation 17:

$$r_{sel-5\ rows}H_{12\text{-}mod}PX=274 = \begin{bmatrix} 11 \\ -7 \\ 74 \\ -30 \\ -104 \end{bmatrix}$$

$_{BAR/2\text{-}eff} = 18$
$_{BAR\text{-}eff} = 208$
$_{BAR\text{-}eff} - {}_{BAR/2\text{-}eff} = 190$ Equation 18:

$$r_{sel-5\ rows}H_{12\text{-}mod}PX=276 = \begin{bmatrix} -9 \\ 5 \\ 176 \\ -74 \\ -250 \end{bmatrix}$$

$_{BAR/2\text{-}eff} = 14$
$_{BAR\text{-}eff} = 500$
$_{BAR\text{-}eff} - {}_{BAR/2\text{-}eff} = 486$ Equation 19:

$_{BAR/2\text{-}eff} = 20$
$_{BAR\text{-}eff} = 632$
$_{BAR\text{-}eff} - {}_{BAR/2\text{-}eff} = 612$ $$r_{sel-5\ rows}H_{12\text{-}mod}PX=278 = \begin{bmatrix} -2 \\ -18 \\ 199 \\ -117 \\ -316 \end{bmatrix}$$

Equation 20:

$$r_{sel-5\ rows}H_{12\text{-}mod}P_{trans} = \begin{bmatrix} -400 \\ 200 \\ -100 \\ 100 \\ 200 \end{bmatrix}$$

$_{BAR/2\text{-}eff} = 600$
$_{BAR\text{-}eff} = 400$
$_{BAR\text{-}eff} - {}_{BAR/2\text{-}eff} = -200$ In the column vectors above, the first two elements represent the transform values for the two phases corresponding to half the background stripe alternation rate, and the remaining three elements represent the transform value for the three phases corresponding to the background stripe alternation rate. The transform values for the two phases at half the background stripe alternation rate have had their absolute values combined to provide the effective transform value corresponding to half the background stripe alternation rate which has been denoted as $\rho_{BAR/2\text{-}eff}$. Similarly, the transform values for the three phases at the background alternation rate have the absolute values thereof combined to provide the effective transform value corresponding to the background stripe alternation rate which has been denoted $\rho_{BAR\text{-}eff}$. As can been seen, as the pixel column vectors move from the X coordinate within the animal image portion to crossing the border between that portion and the background image portion, and then to being within this latter portion, the values of $\rho_{BAR\text{-}eff}$ corresponding to the background alternation rate rise sharply as does the difference between $\rho_{BAR\text{-}eff}$ and $\rho_{BAR/2\text{-}eff}$. On the other hand, a single transition from a substantial dark region to a substantial light region leads to $\rho_{BAR\text{-}eff}$ and $\rho_{BAR/2\text{-}eff}$ to become negative, as was stated above in describing the check for this situation.

In the system of FIG. 1B in actual practice, the first four column vectors above, each representing five transform values for a corresponding pixel column vector, would be determined in a single matrix multiplication operation. This is because the limited and modified Hadamard matrix is typically applied to a twelve by twelve array of pixels, i.e. a dozen successive pixel column vectors. Thus, if the pixel Y coordinates remain the same, the X coordinates might, for example, range from X=270 to X=281 to include the four pixel column vectors given above. That is, if x is used to denote the unknown elements in the other pixel column vectors included in this twelve by twelve array or block of pixels, $B_{PX=270 \rightarrow 281}$, the result can be written:

Equation 21:

$$B_{PX=270-281} = \begin{bmatrix} x & x & 48 & x & 48 & x & 74 & x & 97 & x & x & x \\ x & x & 46 & x & 98 & x & 125 & x & 125 & x & x & x \\ x & x & 43 & x & 46 & x & 85 & x & 113 & x & x & x \\ x & x & 44 & x & 62 & x & 72 & x & 74 & x & x & x \\ x & x & 44 & x & 45 & x & 42 & x & 34 & x & x & x \\ x & x & 42 & x & 45 & x & 46 & x & 43 & x & x & x \\ x & x & 41 & x & 44 & x & 74 & x & 84 & x & x & x \\ x & x & 46 & x & 95 & x & 132 & x & 124 & x & x & x \\ x & x & 41 & x & 44 & x & 85 & x & 119 & x & x & x \\ x & x & 43 & x & 61 & x & 73 & x & 73 & x & x & x \\ x & x & 45 & x & 43 & x & 42 & x & 50 & x & x & x \\ x & x & 44 & x & 46 & x & 47 & x & 38 & x & x & x \end{bmatrix}.$$

The result of matrix multiplying the reduced Hadamard matrix with this twelve by twelve block of pixels from the stored optical image, representing the transform due to the missing data by $\rho$, is:

Equation 22:

$r_{sel-5\ rows}H_{12\text{-}mod}B_{PX=270-281} =$ $$\begin{bmatrix} \pi\pi & 7\pi & 11\pi & -9\pi & -2\pi\pi\pi \\ \pi\pi -11\pi & -7\pi & 5\pi & -18\pi\pi\pi \\ \pi\pi & 5\pi & 74\pi & 176\pi & 199\pi\pi\pi \\ \pi\pi & 4\pi & -30\pi & -74\pi & -117\pi\pi\pi \\ \pi\pi & -1\pi & -104\pi & -250\pi & -316\pi\pi\pi \end{bmatrix}.$$

From this last result, the effective transform values from the phases corresponding to the background stripe alternation rate and half the background stripe alternation rate can be found by standard matrix methods, and the difference between the transform values of these two rates can thereafter be found also using standard matrix methods. The result is, using the letter d for the elements in which the pixel data was not provided in the twelve by twelve pixel array block, is:

$[\rho_{BAR} - \rho_{BAR/2}] = [d\ d\ -8\ d\ 190\ d\ 486\ d\ 612\ d\ d\ d]$. Equation 23

These difference values in this last row vector can be considered representative of the situation at or near the center of the pixel column vector on the average. Thus, one when can view a row vector such as the last and determine at which X coordinate there is substantial increase in the transform difference value to indicate the edge or boundary occurring between an animal portion and a background portion in the stored optical image. If no such increase in transform difference values occurs in the transform difference row vector, a new twelve by twelve block of pixel intensity values can be chosen to the right of the present block assuming the stored optical image is like that shown in FIG. 1E, and the process for obtaining the transform value is repeated. This can be continued until a block of pixels chosen includes the more or less vertical boundary between the animal portion of the stored optical image near the rear of the animal in FIG. 1E and the background image portion. Similarly, successively selecting higher blocks of pixels and repeating the matrix methods shown above until a significant rise in the transform differences occurs allows determining the more or less horizontal boundary between the animal portion of the stored optical image near the top of its back and the background image portion.

Figure 6A:
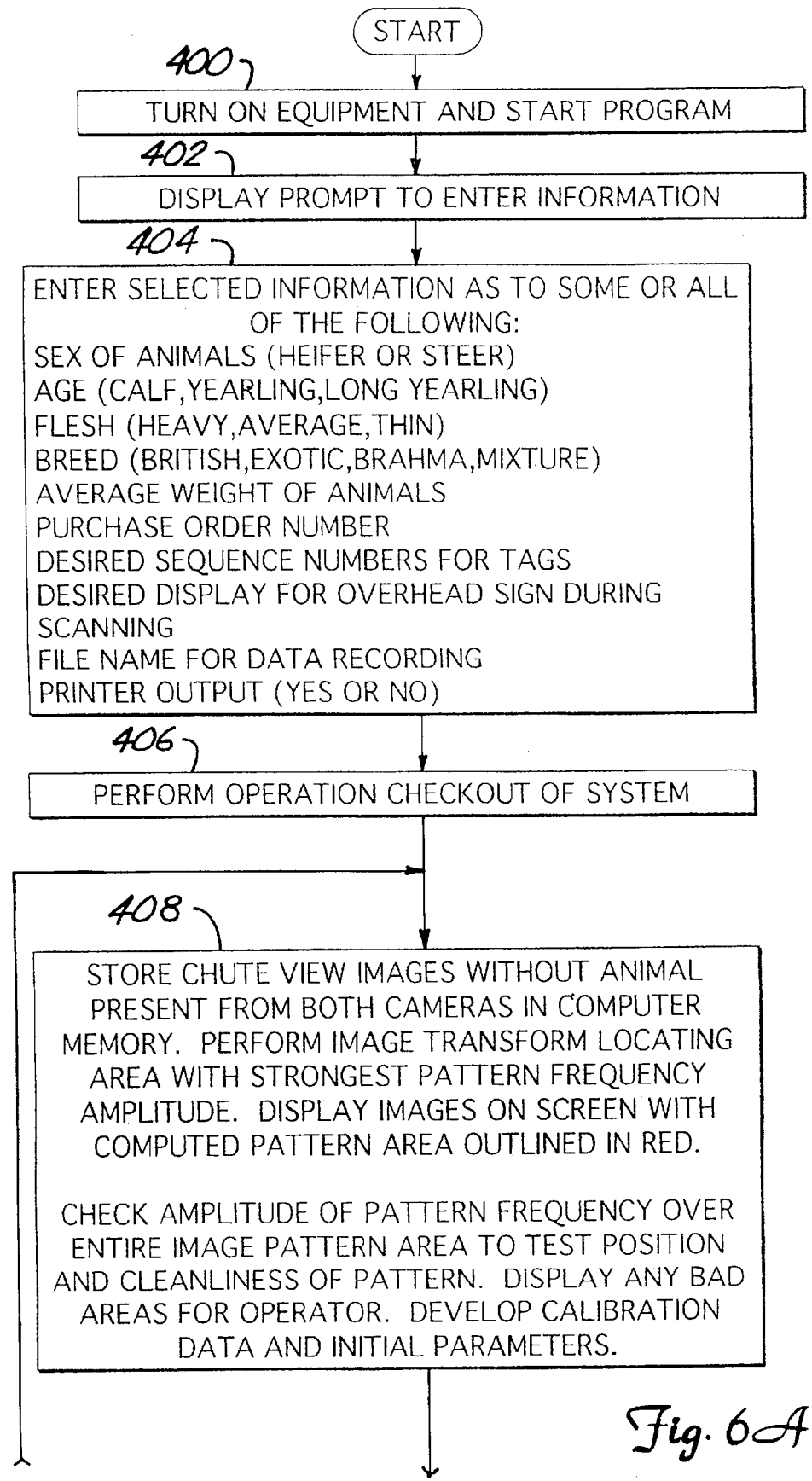
FIGS. 6A through 6G together show the evaluation process for a subject animal using the animal evaluation system of FIGS. 1B and 1D.
Figure 6B:
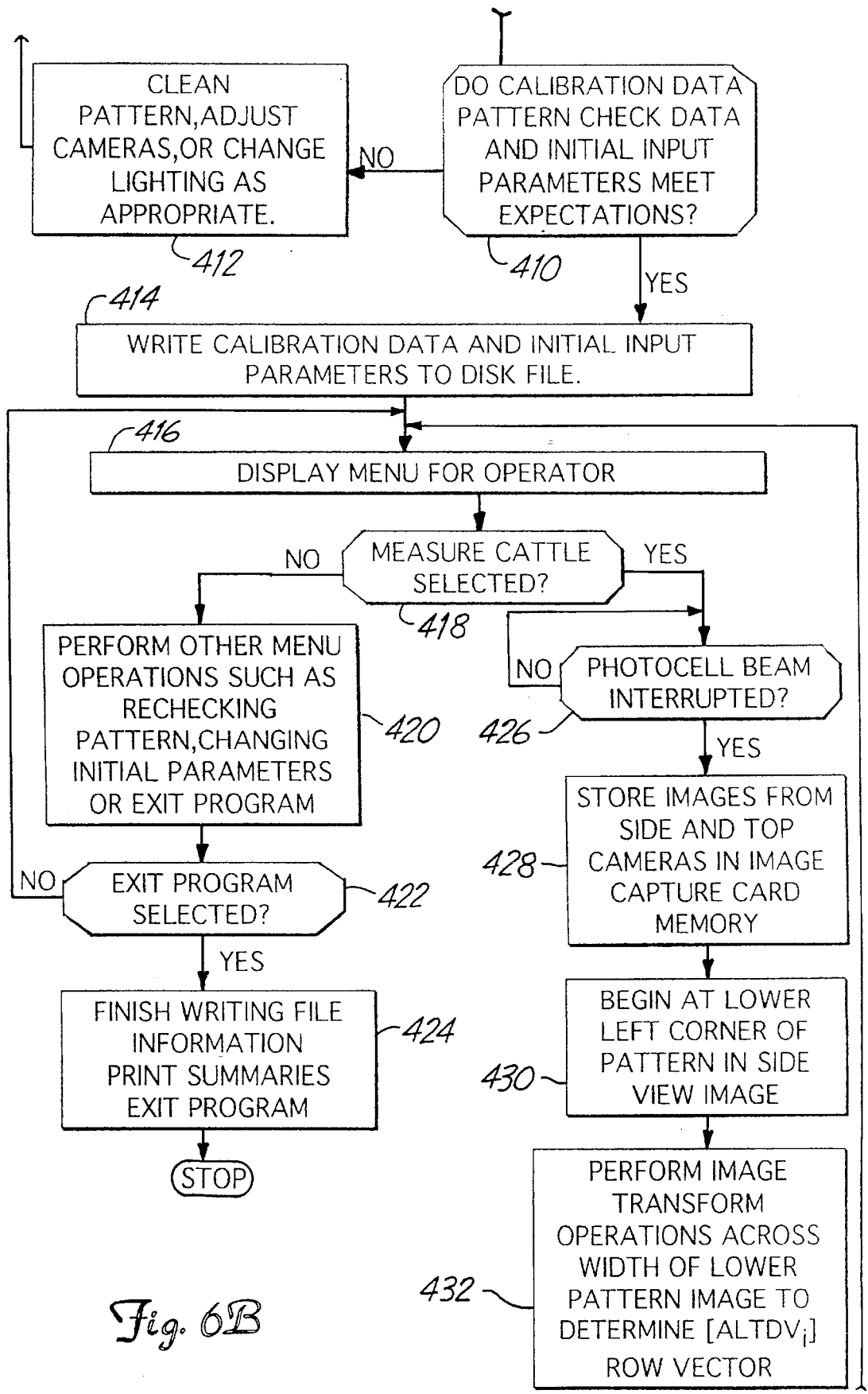
Figure 6C:
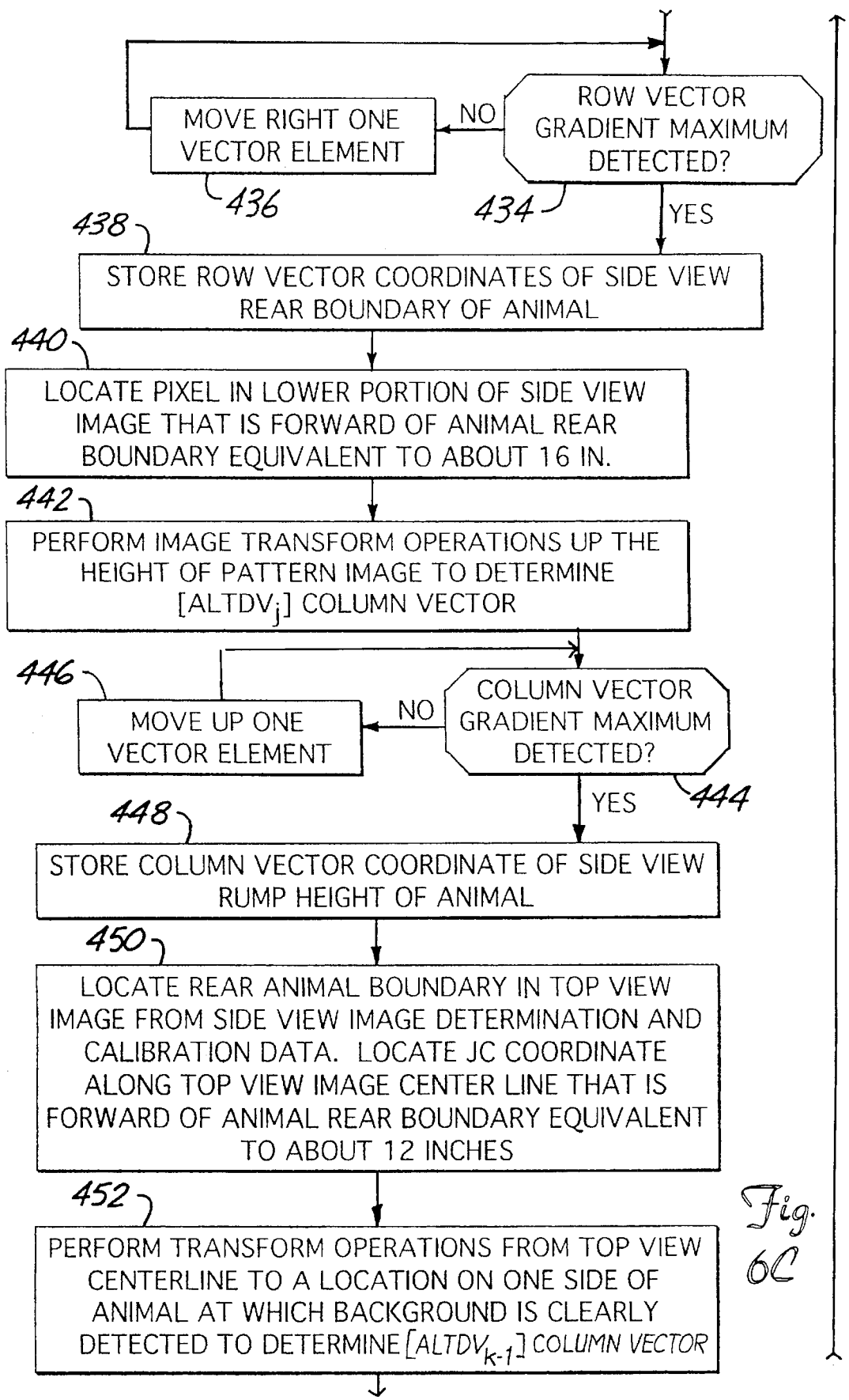

The operation of the evaluation system shown in FIG. 1B and 1D is indicated generally in the flow chart of FIGS. 6A, 6B and 6C which presents the operation in somewhat less detail than the operation of the evaluation system of FIGS. 1A and 1C is shown in FIGS. 4 and 5, but makes use of similar methods. An animal to be measured interrupts the beam of light established by the photocell system 86' to initiate acquisition and storage of the scenes viewed by cameras 18 and 20. These cameras are, of course, synchronized so that these scene images are acquired from each more or less simultaneously so that again various measurement ratios can be formed that are consistent with one another in view of the changes in the animal's widths and heights as it walks through scanner chute 12". Since an animal could move as fast as twenty feet/second through scanning chute 12", the desired accuracy of one inch requires that the images be taken within about four milliseconds of one another. Normal acquisition of the data in the camera CCD array and storing in image capture card 41 typically takes from 17 to 33 milliseconds, thus eliminating the possibility of operating the cameras one after the other if such accuracy is to be maintained. Furthermore, the substantially simultaneous acquisition of the scene images by cameras 18 and 20 is required for accurate computation of position on the animal for measurement purposes. This is because camera 18 providin a side view stored optical image is used to calculate the expected position of various parts of an animal's body for camera 20 providing a top view stored optical image. If the images are not acquired from each camera substantially simultaneously, the distance moved by the animal between the acquisition of the images would be two errors in position determination in the top view image using such methods.

As shown in FIG. 1B, scale sensors 39 and controller 39' provide weight information of an animal to computer 40. Althouh the weight can be estimated from the body measurements of the animal so that the use of a scale is optional, the scale does furnish useful additional information for the classification process and provides a check on the quality of the information obtained by the body measurement methods. Barrel gate 31", in controlling the passage of cattle out of weighing chute 12''', is used to keep an animal in the scale location long enough for the weight data to stabilize which is typically five to ten seconds.

The methodology followed in using the system of FIGS. 1B and 1D is indicated in the flow chart of FIG. 6. Upon switching on the system of FIG. 1D in an initial block, 400, in FIG. 6A at the start, the system through computer 40 provides a prompt on one or the other, or both, of displays 42 and 44 to enter information at the discretion of the operator as indicated in another block, 402. Some of the possible information that can be entered is indicated in an entry block, 404, including animal gender, age, estimated fleshiness, breed, average weight of animals in the group, purchase order number, desired number sequence for numerical identifier tags, display type to be used in remotely located sign, file name for data record, whether a hard copy is desired, etc.

Once this is accomplished, the system moves onto initiate an automatic checking and calibration process for the system of FIGS. 1B and 1D as indicated in a first operations block, 406. The computer program in computer 40 directs cameras 18 and 20 to each acquire a corresponding image of scanning chute 12" absent any animal therein as indicated in a further block, 408. As a result, the position of the alternating background stripe or band pattern in the field of view of each of these cameras is located in the data captured in image capture card 41 of the scene images impinging on the camera CCD arrays assuming they are properly aligned, lens cap is off, backgrounds are visible from the camera lens, etc. The position of these background patterns in the stored optical images is found as indicated above by locating the positions in each image from the edges thereof where the results of the limited Hadamard transform of these stored images have transitions to higher amplitude values in the manner decribed above.

The transition positions in the limited Hadamard transform values found for the background alternating stripe patterns viewed by each camera are compared in a cut-corner decision box, 410, in FIG. 6B to data stored in computer 40 to determine whether cameras 18 and 20 are at correct distances and pointed in the correct direction, and whether an acceptable optical path exists between the CCD array in each camera and the background alternating stripe patterns corresponding thereto. If this pattern is not found to be in the right position, the camera optical access may be misaligned with the direction desired therefor. If limited Hadamard transform amplitudes are low, this may indicate problems of insufficient lighting, dirt or other matter covering the background alternating stripe patterns, or that the camera lens cover has not been removed, or the like. Such problem are indicated to the operator as a basis to initiate proper corrective measures as indicated in a corrective measures block, 412, seen in FIG. 6B.

After any needed corrective measures are taken, the system feedback loop through box 412 brings the operator back to the beginning of the calibration procedure ahead of box 408 for the operator to restart the calibration process. Once any corrective measures taken are found satisfactory by the program in computer 40, or if none were ever indicated to be needed, the program automatically moves ahead with the calibration procedure and calibrates the system of FIGS. 1B and 1D by noting the position of the background alternating stripe patterns in the stored optical images for each of cameras 18 and 20. For example, the distance to the lowest black line in background pattern 33 in the side of scanning chute 12" facing camera 18 is measured manually above floor 38' of that chute prior to beginning operation, and the result of that measurement, typically thirty-four inches above the floor, is entered and stored in computer 40 as an initial parameter. If, in the stored optical image of the empty chute taken by camera 18, this lowest black line corresponds to Y coordinate 280, the spatial distance corresponding to the pixel distance between a subsequently scanned animal's back Y coordinate and that line is determined, and the result added to the thirty-four inches to obtain the height of that animal's back.

In detail, if the animal's back is found at Y coordinate 220, the height of the back must be forty-four inches since the animal's height is equal to the thirty-four inches of the lowest black line in background pattern 30 plus the difference in Y coordinate values, or pixels, which is 60 (280–220) multiplied by the number of inches per pixel vertically which was previously indicated to be 0.17. Thus, 34 plus 60·0.17=44. Just the overall gist of the calculation is given for this example since an actual calculation must also include corrections for camera angle and for shortened distances since a measured animal is located between camera 18 and background pattern 33. Once such calibration data and the initial system input parameters have been developed, this information is stored in computer 40 as indicated in a storage block, 414.

The program moves on after the calibration procedure to the next block, 416, to display the program main menu to the operator to thereby permit the operator to decide in a cut-corner decision box, 418, whether to measure cattle, or another kind of animal if scanning chute 12" is adapted for such other animal (cattle being assumed here), or to choose other menu options such a rechecking the pattern or changing initial parameters after a camera readjustment, for instance. Such other choices, or the choice to stop the operation of the system of FIGS. 1B and 1D is made in a further block, 420. A cut-corner decision box, 422, determines whether terminating operation of the system of FIGS. 1B and 1D has been selected and, if not, returns the operator to the main menu in the rest of a feedback loop as indicated in the arrow carrying back to a point ahead of block 416 from decision box 422. If termination has been selected in decision box 422, any project data accumulated in active memory is stored, and any desired reports printed as indicated in a termination block, 424, after which system operation terminates.

If, instead, measuring cattle has been selected in decision box 418, the system of FIGS. 1B and 1D is placed in a waiting mode by a further cut-corner decision box, 426. This waiting mode is established through a feedback loop about decision box 426 that is entered into in the event of no signal change being indicated by photocell arrangement 86' of position sensor means 84, the system awaiting the interruption of the light beam established by photocell arrangement 86' across passageway 16' at a height that is interceptable by legs of cattle. Once such a photocell beam interruption occurs, cameras 18 and 20, along with image capture card 41, substantially simultaneously acquire and store a chute side, or elevation, scene optical image representation and a chute overhead (top), or plan, scene optical image representation, respectively, as indicated in a further block, 428, based on the scene image light intensities impinging on the camera CCD arrays. Once acquired and stored, digital image processing techniques based on the limited Hadamard transform, as described above, are used on the stored optical image representation data to obtain, first, the position of the rear of the animal, and then the height of the animal, using the side scene optical image representation captured by camera 18 with image capture card 41, this processing being directed and undertaken by computer 40 in accord with the program provided therein.

The digital processing begins with the pixel intensity information in the lower left corner of the stored scene optical image representation of background 33 established in the calibration procedure as indicated in a further block, 430. The 12 pixel by 12 pixel square block of 144 pixels, having the pixel in the lower left-hand corner thereof coinciding with the location of the lower left-hand corner pixel in the calibration scene image representation of the alternating stripe pattern forming background 33, has limited Hadamard transform values computed by the program of computer 40 for the twelve pixel column vectors in that 12 by 12 pixel block as indicated in a further block, 432, in FIG. 6B. From this, in the manner shown above, the transform values for each of the phases at the background alternating stripe alternation rate are combined in absolute value for each such column vector, as above, as are the transform values for each of the phases at half the background alternating stripe alternation rate for each such column vector. The latter result is then subtracted from the first result for each of these pixel column vectors in this pixel block to provide 12 block pixel column vector results with each of these results being found as described above.

Going a step further than describe above, these 12 block pixel column vector results are additively combined into a single block result to provide an avenge value for the pixel block termed the avenge limited tranform difference value (ALTDF). Upon completion of this avenge two rate difference limitedly transformed block evaluation process through this obtaining of this last value, a new 12 by 12 pixel block is selected by moving horizontally to the right one pixel column from the original block as the basis for a repetition of this avenge two rate difference limitedly transformed block evaluation process, or block evaluation process, to determine a further ALTDF value. This repitition of the block evaluation process is continued rightward across all of the pixel columns over the width of the stored scene optical image representation with the result for each block stored as an element of a row vector in a register in computer 40. In actual practice, further avenging or other error removal techniques can be additionally used in this processing which will not be described here for purposes of maintaining relative simplicity.

This resulting row vector, [$ALTDV_i$], having its elements formed by the resulting average two rate difference limitedly transformed block evaluation process values ALTDV for each block in succession will have typically about 240 values for a background pattern 33 of the size described above, and the camera 18 spaced therefrom as described above. Thus, the "i" in the elements $ALTDV_i$ will range from approximately 0 to 239. This set of ordered elements forming the above-described row vector is reviewed by the program of computer 40 to find a transition location among the elements therein where the element values go from being relatively small, representing blocks contained in the animal image portion of the stored optical image representation, to being relatively large past the border separating this portion from the background 33 alternating strip or band portion of that representation as more and more of that background pattern is included in the pixel column vectors being subjected to the block evaluation process based on the limited Hadamard transform.

As moving to the right pixel column by pixel column, in forming the succesive 12 by 12 pixel blocks that are each evaluated in succession, results in crossing over the separation border, such a transition will occur over about 12 pixel column vectorss as first one, then two, and then finally all 12 pixel column vectors that are contained in the block currently being evaluated are obtained from background 33 alternating stripe portions of the stored optical image representation. The approximate center of this transition, as the actual location of the border, can be determined through using a first derivative, edge spatial gradient method along the ALTDV row vector that can be implemented by finding the maximum of the difference along the row vector over the expected pixel transition width as indicated in the feedback loop around a further cut-corner decision box, 434, through a row vector element position incrementing block, 436, both of which are shown in FIG. 6C.

Thus, the difference function $ALTDV_{i+6} - ALTDV_{i-6}$ should be a maximum when "i" represents the location along the row vector at the boundary between the rear of the animal portion of the stored optical image representation and the background alternating stripe portion of that representation. At such a point, the row vector element $ALTDV_{i-6}$ will represent a 12 by 12 pixel block which is completely in the animal portion of the stored optical image, and the row vector element $ALTDV_{i+6}$ will represent a 12 by 12 pixel block which is entirely within the background alternating stripe portion of that image. Thus, the value "i" indicates the intermediate location therebetween where such a boundary occurs at which the difference $ALTDV_{i+6} - ALTDV_{i-6}$ is a maximum, and which can be related to a pixel location in the original stored optical image. This pixel location is then stored as the identifier of the location of the rear boundary of the animal portion of the stored optical image as shown in a further data storage block, 438.

As indicated next in a further block, 440, the pixel which corresponds to a point about 16 inches left of the rear of the animal is located in the animal portion of the stored side view optical image representation. That is, the pixel column approximately 73 (16/0.22) horizontal pixels to the left of that pixel column found above as a rear boundary of the animal portion in the stored side view scene optical image representation is located, and the corresponding $ALTDV_i$ element found there is used to form the first element of a new column vector, $[ALTDV_j]$. A 12 by 12 pixel block one pixel row upward is then selected, and essentially the same steps used to determine the successive elements of the $[ALTDV_i]$ row vector are again used to determine the succesive elements of this $[ALTDV_j]$ column vector.

That is, the block evaluation process starts with the same 12 pixel column vectors used to form the 16 inch forward element in row vector $[ALTDV_i]$ that now also serves as the first element in the $[ALTDV_j]$ column vector, and the process in the program of computer 40 then forms a new block by moving upward one pixel row in the same 12 pixel columns to form this next block as the basis for determining the next element in column vector $[ALTDV_j]$. This process repeats, moving up one further pixel row in the same 12 pixel columns to obtain the next new block used as the basis for the next element in the column vector, until the top of that stored optical image representation is reached, as is known from the calibration data, this vertical block evaluation process being indicated in a further block, 442, in FIG. 6.

Again, a first derivative spatial edge gradient method is used on column vector $[ALTDV_j]$ to find the element thereof marking the boundary between the animal portion of the stored optical image representation and the alternating stripe background portion of that representation thereabove to provide the location of the top of the back of the animal as indicated in the feedback loop in FIG. 6C formed by a cut-corner decision box, 444, and an element position incrementing block, 446. Once the pixel coordinate is found indicating this boundary, which is the rump height of the animal, the coordinate is stored in computer system 40 as indicated in another block, 448.

The measurement process then continues by making use of the data in the top view scene optical image representation captured by overhead camera 20 which is begun a further block, 450, in FIG. 6C. The rear boundary location between the animal portion and the background alternating stripe portion to the right in the side view scene representation that was previously obtained therefrom and stored, as set out back in block 438, and the calibration data from the stored optical images obtained without an animal scanning chute 12", as set out back in block 414, are used to find a corresponding rear boundary pixel location in the stored optical image representation captured by camera 20 and image capture card 41. This determination must take into account any differences in location of the rear edge of background pattern 33 and the rear edge of the background pattern on shelves 35 in the direction along passageway 16' that is followed by an animal passing through scanning chute 12".

Thus, for example, if the rear of an animal being measured is indicated in block 438 to be 32 inches from the rear or right edge of background pattern 33 in the side view scene optical image representation, but the background pattern on shelves 35 begins 2 inches forward along passageway 16' from the rear edge of background pattern 33, i.e. 2 inches to the left of the rear edge of background pattern 33 in FIG. 1B, the rear boundary of the animal portion of the top view scene optical image representation captured by camera 20 will be 30 inches forward from the rear edge of the pattern on shelves 35. Since pixel width dimensions are approximately 0.22 inches per pixel, there are approximately 4.6 pixels per inch in the width dimension. If, for example, the rear end of the pattern on shelves 35 is determined in the calibration process to be at X coordinate 470 in the top view scene optical image representation captured by camera 20 and image card 41, the rear boundary of the animal portion of that stored optical image representation will be found at X coordinate 470 less 30 inches converted to pixels, or 30*4.6, that is, at approximately X coordinate 332 in the top view scene stored optical image representation.

Having found the X coordinate location for the rear boundary of the animal portion of the top view scene stored optical image representation, the rump width of the animal is then determined at a location in that animal portion image along the Y coordinate center line (parallel to the chute sides) by subtracting 55 pixels from this rear boundary X coordinate to find the X coordinate representing approximately 12 inches (55/4.6) into the animal portion of the image forward of the rear boundary location. At this location, further transform operations, of the kind described above, are again undertaken, as indicated in a further block, 452, from the center line of the top view scene image representation on pixel block after pixel block (each formed by an increment of one pixel row from the preceding block) across to a location on one or the other of the animal's sides at which the background pattern clearly occurs to form a column vector $[ALTDV_{k-1}]$. That is, the operations continue until a location is reached where average limited Hadamard transform difference values for block evaluations have increased substantially over values found at the center line. Such values indicate that the pixels in a 12 by 12 block are clearly coming from the background portion of the top view scene stored optical image representation corresponding to the pattern on the corresponding one of shelves 35.

Figure 6D:
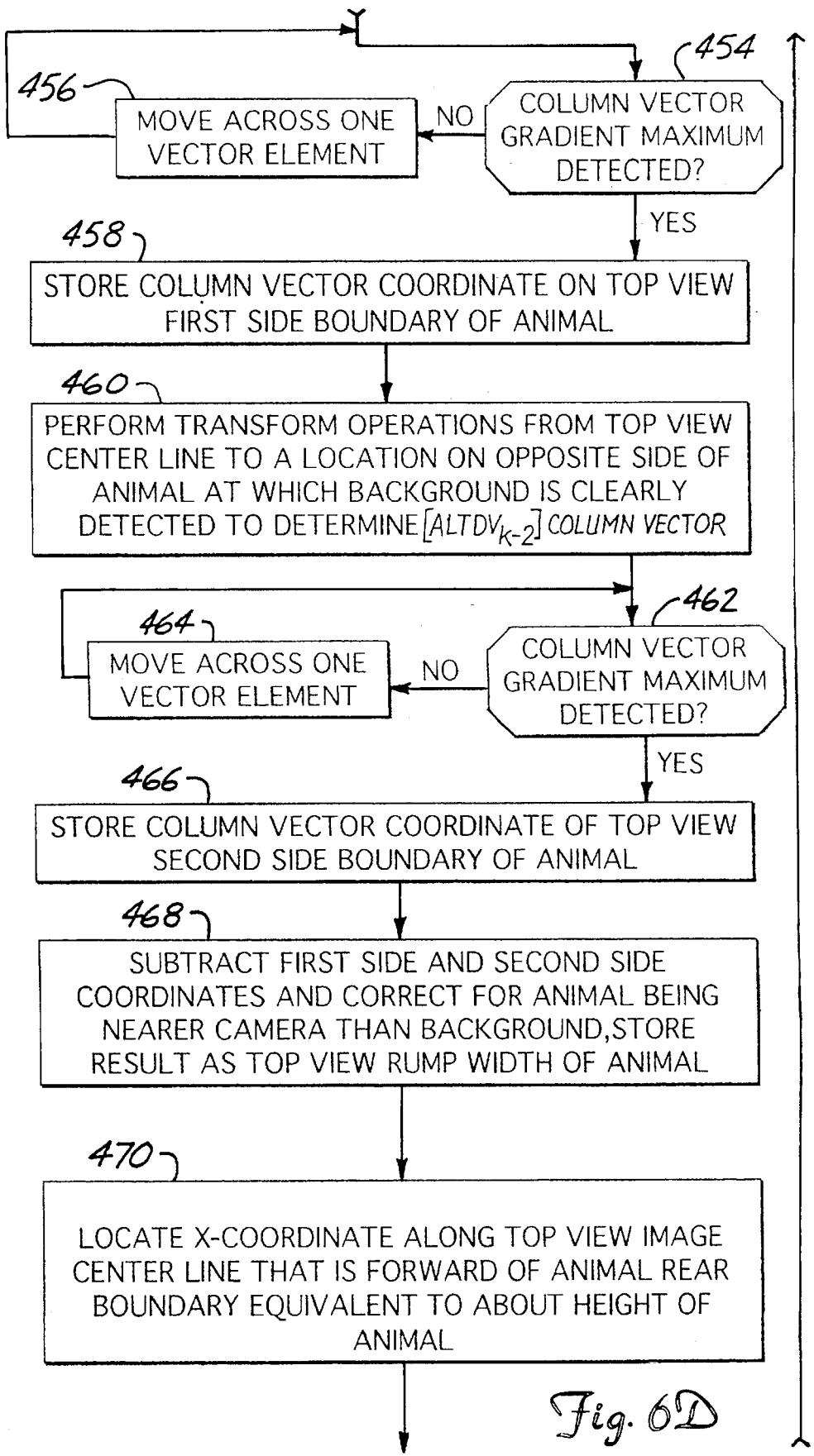
Figure 6E:
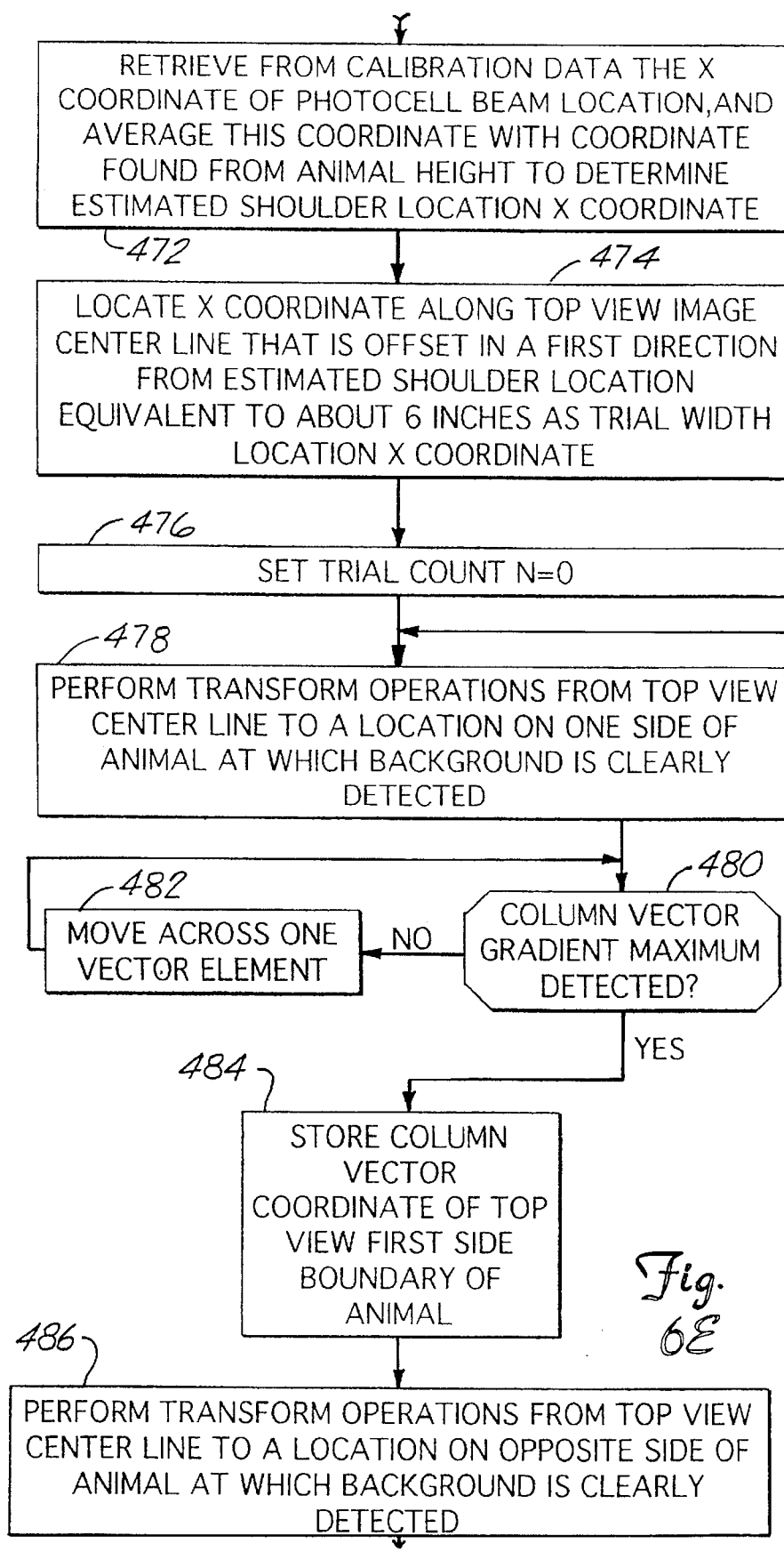
Figure 6F:
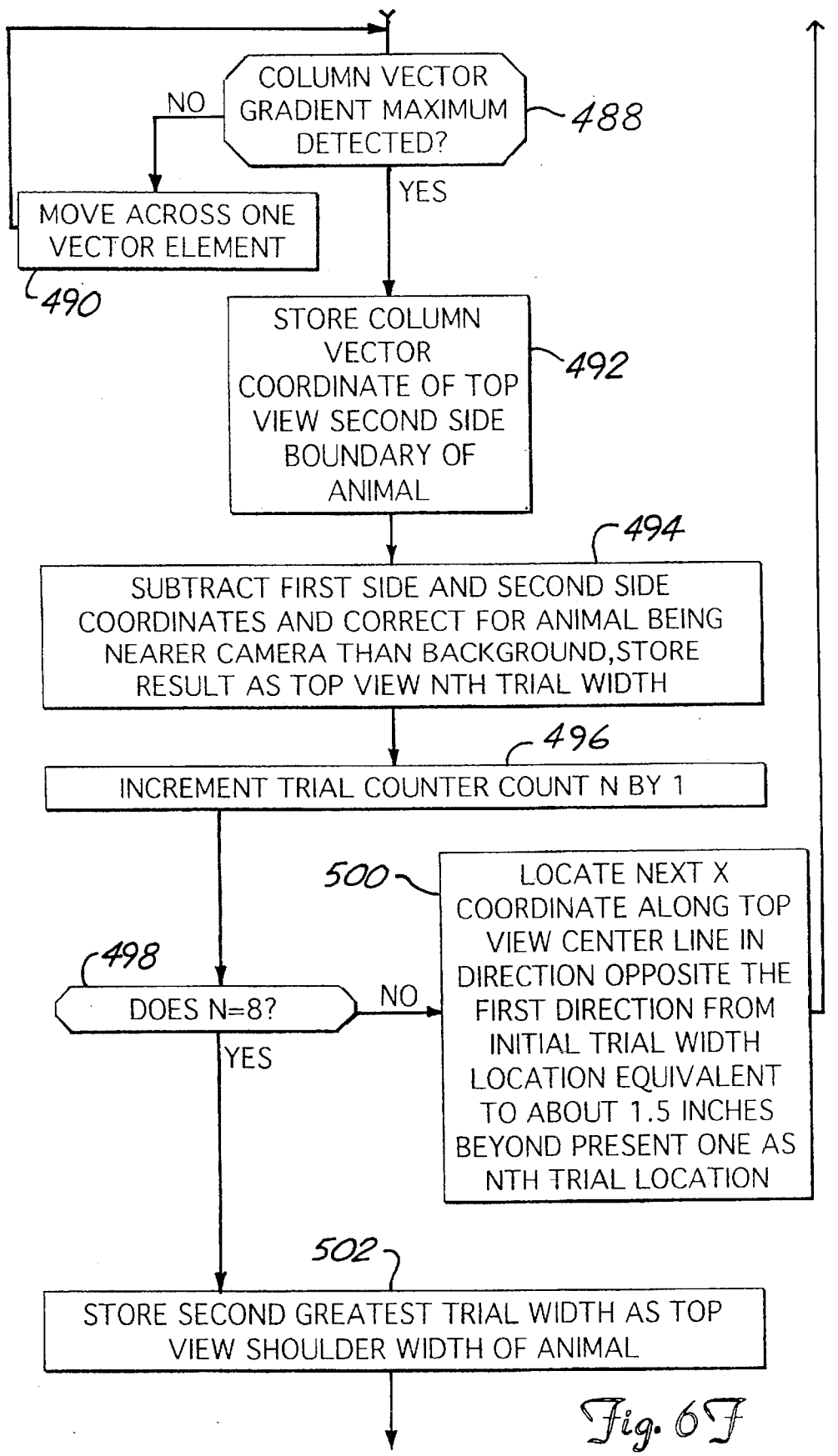

Once again, the resulting column vector $[ALTDV_{k-1}]$ is used with a first derivative spatial edge gradient method to find the maximum therein indicating the boundary separating the side of the animal portion of the image from the background image portion, this done in the feedback loop involving a cut-corner decision box, 454, and a subsequent vector element incrementing block, 456, shown in FIG. 6D. The boundary location coordinate found is then stored as a first side boundary coordinate as indicated in a further storage block, 458.

The same process steps are repeated to determine a corresponding opposite side column vector $[ALTDV_{k-2}]$ and, correspondingly, to find the opposite, or second, side boundary between the animal portion of the top view scene stored optical image representation and the background portion thereof provided by the pattern on the other of shelves 35. This process starts in a further block, 460, with transform operations performed on the series of pixel blocks that start at the center line and extend, through each being formed by a single pixel row increment over the preceding block, to be clearly in the background portion of the representation. The process continues by again using a first derivative, spatial edge gradient method to find the maximum of the resulting column vector $[ALTDV_{k-2}]$ to locate the boundary, and again is implemented in another feedback loop including a further cut-corner decision box, 462, and another vector element incrementing block, 464.

The resulting second side coordinate of the animal is also stored as indicated in another storage block, 466. The first side coordinate and the second side coordinates are subtracted as indicated in another block, 468, to determine the rump width of the animal being measured. Also, since an animal being measured is closer to the camera than the alternating stripe background on shelves 35, a correction factor is used to account for the geometrical shift between the background and the animal that in effect reduces the pixel dimensions over the animal portion of the image.

The shoulder width of the animal is next measured also using the top view scene stored optical image representation. This measurement is begun, as indicated in a following block, 470, in FIG. 6D, by first approximating the location of the animal's shoulders in this representation as that X coordinate value that is forward of the rear boundary between the animal and background portions of the representation by a distance equivalent to the height of the animal earlier found using the side view scene stored optical image. During the calibration procedure, the location of the photocell light beam is found in the top view calibration image taken in the absence of an animal in scanning chute 12", and that location is also stored as an X coordinate value in the calibration data. That X coordinate value, and the X coordinate value just found based on the apprximation provided by the previously determined height of the animal, are together averaged to provide the estimated X coordinate of the animal's shoulders in the top view scene stored optical image representation as indicated in a further block, 472, shown in FIG. 6E.

Using this estimated shoulder location X coordinate, an offset X coordinate is found along the Y coordinate center line which is offset from the estimated shoulder location X coordinate by a pixel columns distance equivalent to about 6 inches, and this offset location X coordinate forms the initial trial width location as indicated in a following block, 474. A trial location counter is reset to have its count, n, equal to 0, as indicated in a next block, 476.

After these preparations, the program in computer 40 determines nine different trial shoulder widths at nine locations arranged symmetrically at and about the earlier found X coordinate determined as the estimated shoulder location. This series determinations of trial shoulder widths begins first at the initial trial width location X coordinate, or the offset location X coordinate, and, after finding and storing the width between the sides of the animal portion of the representation there in the same manner as the rump width was found, the computer 40 program then continues from there to shift positions in pixel column distances equivalent to 1.5 inch shifts over these columns along the center line and, in doing so, crosses over the estimated shoulder width location X coordinate to four further trial shoulder width locations on the other side thereof. As at the first trial width location, the computer 40 program determines at each of these eight further trial width locations the corresponding width there between the sides of the animal portion of the representation in the same manner as was used to determine the rump width.

This series of trial width determinations is accomplished through the steps set out in the corresponding blocks and cut-corner decision boxes following block 476, these including a following first transform operations block, 478, to form an average limited transform two rate difference based column vector for a twelve pixel column band extending from the center line at a trial width location past the animal portion boundary. The formation of this column vector is followed by use of a first feedback loop to perform a maximum gradient search of that vector which includes a cut-corner decision box, 480, and a vector element incrementing block, 482, with the resulting boundary coordinate therefrom stored in a further block, 484. Thus, these blocks following block 478 determine the pixel distance from the center line to one side of the animal at the particular trial shoulder width location involved.

The distance from the center line to the other side of the animal at such a trial shoulder width location is obtained by further performing transform operations as indicated in a second operations block, 486, to again form another average limited transform two rate difference based column vector for a twelve pixel column band extending from the center line at a trial width location past the opposite animal portion boundary. Also again, a gradient maximum search of this last resulting column vector to find the animal portion boundary for this opposite side is provided by a second feedback arrangement established by a cut-corner decision box, 488, and another vector element incrementing block, 490, both shown in FIG. 6F. The resulting boundary coordinate is stored in another storage block, 492. As before, a further block, 494, indicates that the first side and second side coordinates found for a trial width location are subtracted to obtain the animal pixel width at that location with correction made for the animal being nearer the camera than the background. The result is the top view scene trial width at that trial shoulder width location after conversion to acutal distance which is stored, and thereafter the trial location counter is incremented by one as indicated in a subsequent block, 496.

After a trial width has been determined and stored at a trial shoulder width location, the computer 40 program operates to obtain a trial width at the next of the remaining trial shoulder width locations. A cut-corner decision box, 498, determines that the current iteration of the trial width determination is checked as to its number in the trials sequence and, if not the last one, the computer 40 program is led to a further block, 500, to locate the next trial width location X coordinate along the top view center line, and the trial width determination process is begun again following the feedback arrow to just before block 478. These determinations of trial widths at successive trial shoulder width locations continue until all nine trial widths have been obtained.

The second greatest trial width found in this procedure is selected as the top view scene shoulder width of the animal being measured which is then stored as indicated in a further block, 502. Choosing the second largest trial width is equivalent to throwing out the largest trial width which is the most likely one of the trial widths to be in error perhaps because that measurement may have occurred near the stomach bulge of the animal, or because some mud has caked on the animal or the like. At the same time, since the shoulder area of the animal is going to occur over at least two or three of the trial shoulder width locations, eliminating the largest trial width, even if accurate, will not lead to much difference in the determined shoulder width of the animal obtained by choosing the second largest trial width value.

Figure 6G:
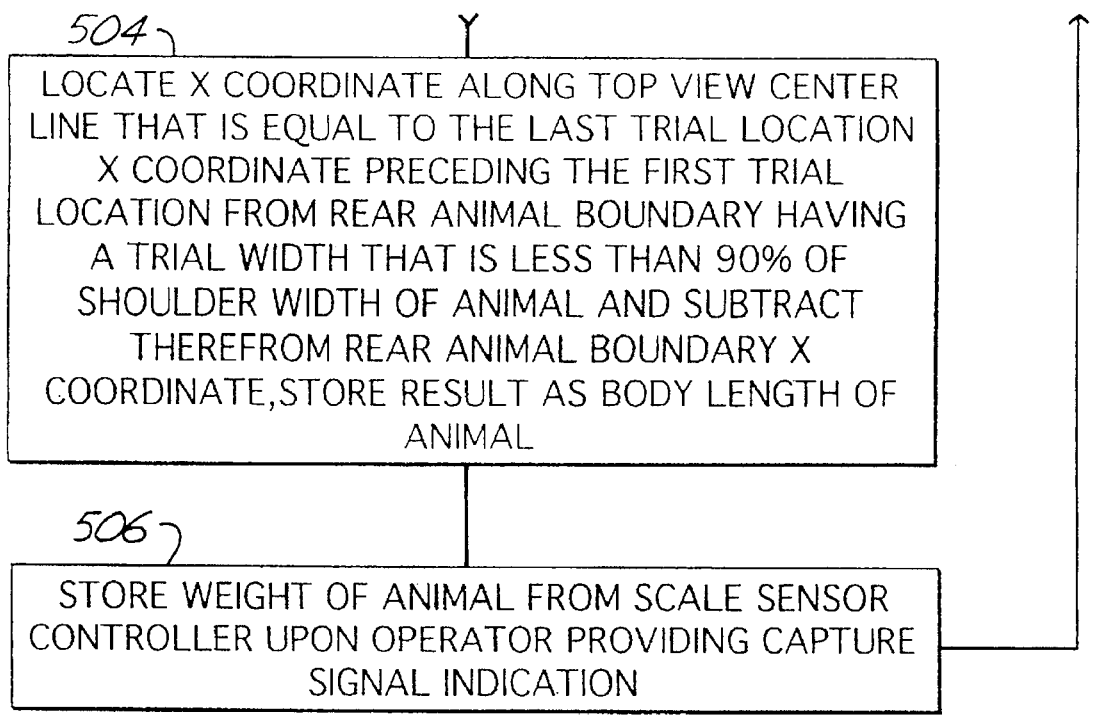

After determining the shoulder width of the animal being measured in the top view scene stored optical image representation, some of the same data used in that process is used to also determine the body length of that animal as indicated in a further block, 504, shown in FIG. 6G. The nine trial shoulder widths are reviewed starting from the trial location nearest the rear boundary of the animal portion of the top view stored optical image, and the first trial width encountered which is less than 90% of the previously determined shoulder width of the animal is found. The trial location previous in the sequence of trial locations to the one corresponding to this less than 90% trial shoulder width value is chosen as representing the front of the animal being measured. Subtracting from X coordinate of that trial location and the value of the X coordinate marking the rear boundary of the animal provides, after conversion to an actual distance, the basis for the body length of that animal which is then stored by computer 40.

Finally, an animal measured for dimensions is allowed to move from scanning chute 12" into weighing chute 12'" by opening "barrel" gate 31". The weight of that animal is sensed by scale sensors 39 and scale sensors controller 39', but the value determined thereby is not entered in the computer 40 until the operator has concluded that the animal is reasonably still in weighing chute 12'" with all four feet on the floor and the sensing arrangement has had sufficient time to stabilize after the animal has settled down in the chute. At that point, the operator enters a command on keyboard 76 and computer 40 captures the weight indication provided by controller 39' as indicated in a further block, 506.

This completes the measurement process for an animal based on using sharply contrasting backgrounds, including the body measures of rump height, rump width, shoulder width, body length and weight. At this point, the feedback path from block 506 leads back to display the main menu for the operator preparatory to either measuring a further animal or exiting the program.

The measurement data generated by the system of FIGS. 1A and 1C, specifically, the animal's: rump height (RH); rump width (RW); shoulder width (SHW); and body length (BL) are used to evaluate and predict characteristic traits of each animal. The characteristic traits of each animal are determined from animal indicia or characteristic indicating ratios formed from the above listed physical measurements. In the preferred embodiment, four such ratios are formed wherein a shoulder muscle to bone ratio, herein also referred as "SMB", represents structural development in the fore quarter region; a rump muscle to bone ratio, herein also referred as "RMB", represents structural development in the rear quarter region; a musculoskeletal development per unit length ratio, herein referred as "MSDL", represents structural development as related to the animal's body length; and a musculoskeletal development per unit height ratio, herein referred as "MSDH", represents structural development as related to the animal's rump height. The four characteristic indicating ratios are determined, as represented by a block, 328, in FIG. 4K, from the following equations:

$SMB=SHW/RH$            Equation 24

$RMB=RW/RH$            Equation 25

$MSDL=(SMB+RMB)/BL$            Equation 26

$MSDH=(SMB+RMB)/RH$            Equation 27

It is believed that at least two linear equations can be formed from the ratios listed above to define two functional characteristic equations. A first functional characteristic equation represented as follows:

$CV=(a*SMB)+(b*RMB)+(c*MSDL)+(d*MSDH)+e$     Equation 28 provides a numerical value representing carcass value, herein referred as "CV", which in turn is used to predict a carcass grade, or an indication for the quality of meat present on the animal; a yield grade, or an indication for the quantity of meat present on the animal; and a cutability factor, or an indication of lean to fat on the bone. Coefficients a, b, c, d are weighting factors used to emphasis one or more of the four characteristic indicating ratios. Coefficient e is used as an adjustment constant to provide a numerical value in a particular range of values, for example to create a range of values from one to ten.

In the preferred embodiment, two different sets of weighting coefficients are provided wherein one set is provided for each sex of the animal. A first set of carcass value coefficients ($a_M$, $b_M$, $c_M$, $d_M$, $e_M$) are provided for the male gender of the animal while a second set of carcass value coefficients ($a_F$, $b_F$, $c_F$, $d_F$, $e_F$) are provided for the female gender of the animal. Separate sets of carcass value coefficients are provided in order to isolate similar economically valuable characteristics of each particular gender of the animal such that animals of a particular sex can be accurately compared. For example, as stated above, characteristic indicating ratio SMB provides an indicative value that relates to the animal's shoulder muscles. In animals, such as cattle, this particular area is well developed in the male gender of those animals that have reached or surpassed the age of puberty due in part to the presence of both growth hormones and male sex hormones (testosterone). In contrast, the characteristic indicating ratio RMB provides an indicative value that relates to the animal's rump muscles. Using cattle again as an example, this particular area is well developed in the female gender of those animals that have reached or surpassed the age of puberty due in part to the presence of both growth hormones and female sex hormones (estrogen). Since each gender develops differently from the age of puberty, emphasizing different structural characteristics, separate sets of coefficients are provided in order to compare accurately like animals of a particular herd, or like animals of different herds.

In a further preferred embodiment, if processing and analysis is desired for animals that have not yet reached the age of puberty where the physical structures of both males and females are substantially equivalent, then a third set of carcass value coefficients ($a_{MF}$, $b_{MF}$, $c_{MF}$, $d_{MF}$, $e_{MF}$) can be used wherein the subscript "MF" represents both male and female animals that have not reached puberty.

As stated above, carcass value coefficients of the first set $(a_M, b_M, c_M, d_M, e_M)$, second set $(a_F, b_F, c_F, d_F, e_F)$ and third set $(a_{MF}, b_{MF}, c_{MF}, d_{MF}, e_{MF})$ have numerical values. The corresponding numerical values of each coefficient of each set of coefficients is determined by analyzing an appropriate number of animals that meet those age and gender requirements to obtain the measurements necessary to calculate the four characteristic indicating ratios, SMB, RMB, MSDL and MSDH. In other words, if the carcass value coefficients for male animals $(a_M, b_M, c_M, d_M, e_M)$ are desired, then an appropriate number of male animals that have reached or surpassed the age of puberty would be analyzed to obtain the four characteristic indicating ratios for each individual animal.

The numerical value of each coefficient can be determined from any suitable mathematical convergence technique. In the preferred embodiment, a multiple linear regression model using a least square estimator technique is used, as represented by the following equations:

Equation 29:

$$e*N + d*\sum_{i=1}^{N} MSDH_i + c*\sum_{i=1}^{N} MSDL_i + b*\sum_{i=1}^{N} RMB_i + a*\sum_{i=1}^{N} SMB_i = \sum_{i=1}^{N} CV_i$$

Equation 30:

$$e*\sum_{i=1}^{N} MSDH_i + d*\sum_{i=1}^{N}(MSDH_i)^2 + c*\sum_{i=1}^{N} MSDL_i * MSDH_i + b*\sum_{i=1}^{N} RMB_i * MSDH_i + a*\sum_{i=1}^{N} SMB_i * MSDH_i = \sum_{i=1}^{N} CV_i * MSDH_i$$

Equation 31:

$$e*\sum_{i=1}^{N} MSDL_i + d*\sum_{i=1}^{N} MSDH_i * MSDL_i + c*\sum_{i=1}^{N}(MSDL_i)^2 + b*\sum_{i=1}^{N} RMB_i * MSDL_i + a*\sum_{i=1}^{N} SMB_i * MSDL_i = \sum_{i=1}^{N} CV_i * MSDL_i$$

Equation 32:

$$e*\sum_{i=1}^{N} RMB_i + d*\sum_{i=1}^{N} MSDH_i * RMB_i + c*\sum_{i=1}^{N} MSDL_i * RMB_i + b*\sum_{i=1}^{N}(RMB_i)^2 + a*\sum_{i=1}^{N} SMB_i * RMB_i = \sum_{i=1}^{N} CV_i * RMB_i$$

Equation 33:

$$e*\sum_{i=1}^{N} SMB_i + d*\sum_{i=1}^{N} MSDH_i * SMB_i + c*\sum_{i=1}^{N} MSDL_i * SMB_i + b*\sum_{i=1}^{N} RMB_i * SMB_i + a*\sum_{i=1}^{N}(SMB_i)^2 = \sum_{i=1}^{N} CV_i * SMB_i$$

In these equations, coefficients a, b, c, d, e represent the set of carcass value coefficients to be determined, either $(a_M, b_M, c_M, d_M, e_M)$, $(a_F, b_F, c_F, d_F, e_F)$ or $(a_{MF}, b_{MF}, c_{MF}, d_{MF}, e_{MF})$; "N" represents the total number of individual animals that meet the age and gender requirements for the particular set of coefficients to be determined, for example, if numerical values are desired for the carcass value coefficients $(a_M, b_M, c_M, d_M, e_M)$, then N equals the total number of male animals that have at least reached the age of puberty; subscript "i" represents a particular individual of the total number of animals; $SMB_i$, $RMB_i$, $MSDL_i$ and $MSDH_i$ are the four characteristic indicating ratios for each particular animal determined from the above listed equations; and $CV_i$ is a gauged numerical value of carcass value, within a given range of values, for each particular animal. For example, if it is desired to analyze cattle using a range of values from one to ten wherein one represents an animal having a low overall carcass value and ten represents an animal having a high overall carcass value, then each animal would be analyzed to obtain the four characteristic indicating ratios listed above with $CV_i$ for that particular animal gauged or assigned a corresponding value from one to ten. After a value has been obtained for $SMB_i$, $RMB_i$, $MSDL_i$, $MSDH_i$ and $CV_i$ for each animal, then using known mathematical techniques, the equations listed above can be solved simultaneously for the coefficients (a, b, c, d, e).

Similarly, a second functional characteristic equation, herein referred as "PA", and represented as follows:

$$PA = (f*SMB) + (g*RMB) + (h*MSDL) + (j*MSDH) + k \qquad \text{Equation 34}$$

provides a numerical value representing production audit which in turn is used to predict feed conversion efficiency of the animal; a fertility rating, or how well the animal will reproduce; and when each individual result is combined with all animals of a particular herd, a herd health care score. Coefficients f, g, h, j are weighting factors used to emphasize one or more of the four characteristic indicating ratios. Coefficient k is used as an adjustment constant to provide a numerical value in a particular range of values, for example to create a range of values from one to ten.

As with the carcass value coefficients listed above, two different sets of production audit coefficients are provided in the preferred embodiment wherein one set is provided for each sex of the animal. A first set of production audit coefficients $(f_M, g_M, h_M, j_M, k_M)$ are provided for the male gender of the animal while a second set of production audit coefficients $(f_F, g_F, h_F, j_F, k_F)$ are provided for the female gender of the animal. As with the carcass value coefficients above, the separate sets of production audit coefficients are provided in order to isolate similar economically valuable characteristics of each particular gender of the animal such that animals of a particular sex can be accurately compared.

In a further preferred embodiment, if processing and analysis is desired for animals that have not yet reached the age of puberty wherein the physical structures of both males and females are substantially equivalent, then a third set of production audit coefficients $(f_{MF}, g_{MF}, h_{MF}, j_{MF}, k_{MF})$ can be used wherein the subscript "MF" represents both male and female animals that have not reached puberty.

As with the sets of carcass value coefficients listed above, the production audit coefficients of the first set $(f_M, g_M, h_M, j_M, k_M)$, second set $(f_F, g_F, h_F, j_F, k_F)$ and third set $(f_{MF}, g_{MF}, h_{MF}, j_{MF}, k_{MF})$ have numerical values. The corresponding numerical values of each coefficient of each set of coefficients is determined by analyzing an appropriate number of animals that meet the age and gender requirements to obtain the measurements necessary to calculate the four characteristic indicating ratios, SMB, RMB, MSDL and MSDH.

The numerical values of each coefficient can be determined from any suitable mathematical convergence technique. In the preferred embodiment, a multiple linear regression model using a least square estimator technique is used, as represented by the following equations:

Equation 35:

$$k*N + j*\sum_{i=1}^{N} MSDH_i + h*\sum_{i=1}^{N} MSDL_i + g*\sum_{i=1}^{N} RMB_i +$$

-continued $$f * \sum_{i=1}^{N} SMB_i = \sum_{i=1}^{N} PA_i$$

Equation 36:

$$k * \sum_{i=1}^{N} MSDH_i + j * \sum_{i=1}^{N} (MSDH_i)^2 + h * \sum_{i=1}^{N} MSDL_i * MSDH_i +$$

$$g * \sum_{i=1}^{N} RMB_i * MSDH_i + f * \sum_{i=1}^{N} SMB_i * MSDH_i = \sum_{i=1}^{N} PA_i * MSDH_i$$

Equation 37:

$$k * \sum_{i=1}^{N} MSDL_i + j * \sum_{i=1}^{N} MSDH_i * MSDL_i + h * \sum_{i=1}^{N} (MSDL_i)^2 +$$

$$g * \sum_{i=1}^{N} RMB_i * MSDL_i + f * \sum_{i=1}^{N} SMB_i * MSDL_i = \sum_{i=1}^{N} PA_i * MSDL_i$$

Equation 38:

$$k * \sum_{i=1}^{N} RMB_i + j * \sum_{i=1}^{N} MSDH_i * RMB_i + h * \sum_{i=1}^{N} MSDL_i * RMB_i +$$

$$g * \sum_{i=1}^{N} (RMB_i)^2 + f * \sum_{i=1}^{N} SMB_i * RMB_i = \sum_{i=1}^{N} PA_i * RMB_i$$

Equation 39:

$$k * \sum_{i=1}^{N} SMB_i + j * \sum_{i=1}^{N} MSDH_i * SMB_i + h * \sum_{i=1}^{N} MSDL_i * SMB_i +$$

$$g * \sum_{i=1}^{N} RMB_i * SMB_i + f * \sum_{i=1}^{N} (SMB_i)^2 = \sum_{i=1}^{N} PA_i * SMB_i$$

In these equations, coefficients f, g, h, j, k represent the set of production audit coefficients to be determined, either ($f_M$, $g_M$, $h_M$, $j_M$, $k_M$), ($f_F$, $g_F$, $h_F$, $j_F$, $k_F$) or ($f_{MF}$, $g_{MF}$, $h_{MF}$, $j_{MF}$, $k_{MF}$); "N" represents the total number of individual animals that meet the requirements for age and gender of the particular coefficients to be determined, for example, if numerical values are desired for the production audit coefficients ($f_M$, $g_M$, $h_M$, $j_M$, $k_M$), then N equals the total number of male animals that have at least reached the age of puberty; subscript "i" represents a particular individual of the total number of animals; $SMB_i$, $RMB_i$, $MSDL_i$ and $MSDH_i$ are the four characteristic indicating ratios for each particular animal used in determination of the corresponding set of production audit coefficients and determined from the above listed equations; and $PA_i$ is a gauged numerical production audit value, within a given range of values, for each particular animal. For example, if it is desired to analyze cattle using a range of values from one to ten wherein one represents an animal having a low overall production audit value and ten represents an animal having a high overall production audit value, then each animal would be analyzed to obtain the four characteristic indicating ratios listed above with $PA_i$ for that particular animal gauged or assigned a corresponding value from one to ten. After a value has been obtained for $SMB_i$, $RMB_i$, $MSDL_i$, $MSDH_i$ and $PA_i$ for each animal, then using known mathematical techniques, the equations listed above can be solved simultaneously for the coefficients (f, g, h, j, k).

Referring back to FIG. 4K, a block, 330, represents the step of evaluating the animal using Equations 15 and 21 for determination of the carcass value and production audit values, respectively, wherein given the age and gender of the animal, the appropriate set of carcass value and production audit coefficients are used. Calculated numerical values for carcass value and production audit are displayed on monitor 42 or monitor 44 and stored on any convenient storage device such as a portable magnetic memory disk, 332, on computer means 40 illustrated in FIG. 1A.

A decision diamond, 334, illustrated in FIG. 4K, represents continuing the analysis procedure for another animal. If another animal is to be analyzed, procedural control returns to decision diamond 104 in FIG. 4A; otherwise, the procedure 100 is stopped at a block, 336, labeled "EXIT".

The calculated numerical values for carcass value and production audit of each animal can be compared with corresponding values for other like animals from the same or a different herd. In addition, the calculated values can be grouped together to determine a herd carcass value or a herd production audit value. Use of the system of FIGS. 1A and 1C will thus provide efficient, accurate physical measurements which correlate to predictable characteristics of animals and their offspring.

Similar kinds of evaluations and predictions of characteristic traits of animals can be determined from the animal indicia or characteristic indicating ratios formed from the physical measurements provided by the system of FIGS. 1B and 1D. There are somewhat greater possibilities in this instance as this latter system provides a further physical measurement, weight, in addition to the measurements of rump height, rump width, shoulder width and body length. Of course, either of the system of FIGS. 1A and 1C or the system of FIGS. 1B and 1D can be directed to provide other physical measurements from the data captured in the side view and top view optical images stored therein if such other physical measurements would prove to have evaluative or predictive value as a result of further research relating such physical measurements to carcass characteristics such as marbeling and lean yield percentage, days needed on feed to reach certain goals, desirable end weights for particular biological types, etc. Such relationships between animal physical measurements and such characteristics is, as above, typically expressed in linear and nonlinear regression statistical relationships.

For instance, relationships which indicate the skeletal development of an animal and the degree of maturity in muscle development are quite useful. More mature animals at a given weight with more muscular development will complete their growth sooner and at a lighter final weight than will less mature, less muscular developed animals. Skeletal development and maturity can thus be used to estimate the best end weight for an animal which, having the current weight subtracted therefrom and the result divided by the expected average daily gain, provides an estimate of the total days of feeding required to result in the desired end weight.

Thus, evaluations of skeletal development and muscle maturity can be used to classify animals being measured into various groupings such as by "biological type", if desired. For instance, cattle could be divided into nine classes as follows:

1) Small frame, below average muscle development.
2) Small frame, normal muscle development.
3) Small frame, above average, more mature muscle development.
4) Medium frame, below average muscle development.
5) Medium frame, normal muscle development.
6) Medium frame, above average, more mature muscle development.
7) Large frame, below average muscle development.
8) Large frame, normal muscle development.
9) Large frame, above average, more mature muscle development.

Each of these nine classifications would contain animals having different production and carcass characteristics. Very large frame animals with below average muscle development are less likely to be graded Choice, and will have the highest end weight of any group. Small frame animals with above average, more mature muscle development will more likely be graded choice and finish at much lower end weight.

Other logical classification schemes are also possible such as by estimated days on a feed schedule to reach the desired end weight. A further alternative would be to classify animals for particular markets. A user's classification scheme can be selected by a user depending on the user's needs which may well change with the time of the year, price of feed, price of feeder cattle, changes in consumer demand, etc. Whatever classification scheme is chosen, further displays can be operated from computer 40 in the cattle segregating arrangements so that operators in those locations can tag the cattle, and implant them with such medicinal items as desired, read the correct pen indicator, etc. Of course, the data for each animal is stored by computer 40 and can be printed out or stored on a magnetic disk, and a summary for a group of animals can also be provided by the computer.

Although the present invention has been described with reference to preferred embodiments, workers skilled in the an will recognize that changes may be made in form and detail without departing from the spirit and scope of the invention.

What is claimed is:

1. A chute for an animal evaluation system for evaluating animals with each such animal during its evaluation moving through first and second scenes in said chute corresponding to differing first and second fields of view in a manner so as to partially cover first and second background surfaces provided in each of said first and second scenes, respectively, as viewed in said first and second fields of view, respectively, at a selected time, said chute comprising:

a first side wall supported in a substantially vertical position and supporting said first background surface;

a second side wall supported in a substantially vertical position spaced apart from said first side wall and further positioned so that said first field of view from outside that space between said first and second side walls, in extending past said second side wall, has said first background surface therein, said first field of view being of at least a portion of said first background surface when a said animal is undergoing evaluation at said selected time; and a first guide structure provided in that space between said first and second side walls and positioned in said space to provide a passageway for a said animal moving through said space in undergoing evaluation, said first guide structure supporting said second background surface in a position elevated above a bottom of at least one of said first and second side walls so that said second field of view, in extending between said first and second side walls into said space, has said second background surface therein, said second field of view being of at least a portion of said second background surface when a said animal is undergoing evaluation at said selected time.

2. The chute of claim 1 wherein said second side wall defines at least portions of a vertical limit and a horizontal limit to a portion of said first side wall present in said first field of view.

3. The chute of claim 1 further comprising a second guide structure provided in that space between said first and second side walls and positioned in said space to assist in providing said passageway for said animal moving through said space in undergoing evaluation, said second guide structure supporting a third background surface in a position elevated above a bottom of at least one of said first and second side walls so that said second field of view, in extending between said first and second side walls into said space, has said second and third background surfaces therein, said second field of view being of at least a portion of said second and third background surfaces when a said animal is undergoing evaluation at said selected time.

4. The chute of claim 1 wherein said first and second background surfaces each having a visual appearance which contrasts with a visual appearance of a said animal undergoing evaluation.

5. The chute of claim 4 wherein first background surface has a visual appearance which contrasts with those visual appearances of animals being evaluated by being of a color which differs from those colors of said animals.

6. The chute of claim 4 wherein first background surface has a visual appearance which contrasts with those visual appearances of animals being evaluated by having a periodic pattern thereon.

\* \* \* \* \*

UNITED STATES PATENT AND TRADEMARK OFFICE
CERTIFICATE OF CORRECTION

PATENT NO. : 5,644,643

DATED : JULY 1, 1997

INVENTOR(S) : WAYNE W. SCOFIELD, MARK A. ENGELSTAD

It is certified that error appears in the above-indentified patent and that said Letters Patent is hereby corrected as shown below:

Col. 8, line 43, delete "mobilizing", insert --immobilizing--

Col. 10, line 6, delete "rust", insert --first--

Signed and Sealed this

Seventh Day of April, 1998

*Attest:*

BRUCE LEHMAN

*Attesting Officer*   *Commissioner of Patents and Trademarks*